Nov. 28, 1950 E. L. ERWIN 2,531,615

TELEPHONE SYSTEM

Filed Oct. 29, 1948 32 Sheets-Sheet 1

INVENTOR
E. L. ERWIN
BY P. C. Smith
ATTORNEY

Nov. 28, 1950 E. L. ERWIN 2,531,615

TELEPHONE SYSTEM

Filed Oct. 29, 1948 32 Sheets-Sheet 2

INVENTOR
E. L. ERWIN
BY P. C. Smith
ATTORNEY

Nov. 28, 1950 E. L. ERWIN 2,531,615

TELEPHONE SYSTEM

Filed Oct. 29, 1948 32 Sheets-Sheet 3

INVENTOR
E. L. ERWIN
BY P. C. Smith
ATTORNEY

INVENTOR
E. L. ERWIN
BY P. C. Smith
ATTORNEY

INVENTOR
E. L. ERWIN
BY P. C. Smith
ATTORNEY

INVENTOR
E. L. ERWIN
BY P. C. Smith
ATTORNEY

Nov. 28, 1950    E. L. ERWIN    2,531,615

TELEPHONE SYSTEM

Filed Oct. 29, 1948    32 Sheets-Sheet 7

INVENTOR
E. L. ERWIN
BY
P. C. Smith
ATTORNEY

Nov. 28, 1950 E. L. ERWIN 2,531,615

TELEPHONE SYSTEM

Filed Oct. 29, 1948 32 Sheets-Sheet 8

INVENTOR
E. L. ERWIN
BY
P. C. Smith
ATTORNEY

Nov. 28, 1950 E. L. ERWIN 2,531,615

TELEPHONE SYSTEM

Filed Oct. 29, 1948 32 Sheets-Sheet 9

INVENTOR
E. L. ERWIN
BY P. C. Smith
ATTORNEY

Nov. 28, 1950 E. L. ERWIN 2,531,615

TELEPHONE SYSTEM

Filed Oct. 29, 1948 32 Sheets-Sheet 10

INVENTOR
E. L. ERWIN
BY P. C. Smith
ATTORNEY

Nov. 28, 1950

E. L. ERWIN

TELEPHONE SYSTEM 2,531,615

Filed Oct. 29, 1948

32 Sheets-Sheet 11

INVENTOR
E. L. ERWIN
BY
P. C. Smith
ATTORNEY

Nov. 28, 1950 E. L. ERWIN 2,531,615

TELEPHONE SYSTEM

Filed Oct. 29, 1948 32 Sheets-Sheet 12

INVENTOR
E. L. ERWIN
BY P. C. Smith
ATTORNEY

Nov. 28, 1950 E. L. ERWIN 2,531,615

TELEPHONE SYSTEM

Filed Oct. 29, 1948 32 Sheets-Sheet 13

INVENTOR
E. L. ERWIN
BY
P. C. Smith
ATTORNEY

Nov. 28, 1950 E. L. ERWIN 2,531,615

TELEPHONE SYSTEM

Filed Oct. 29, 1948 32 Sheets-Sheet 14

INVENTOR
E. L. ERWIN
BY P. C. Smith
ATTORNEY

INVENTOR
E. L. ERWIN
BY
P. C. Smith
ATTORNEY

Nov. 28, 1950

E. L. ERWIN 2,531,615

TELEPHONE SYSTEM

Filed Oct. 29, 1948

32 Sheets-Sheet 16

INVENTOR
E. L. ERWIN
BY
P. C. Smith
ATTORNEY

Nov. 28, 1950 E. L. ERWIN 2,531,615

TELEPHONE SYSTEM

Filed Oct. 29, 1948 32 Sheets-Sheet 17

INVENTOR
E. L. ERWIN
BY
P. C. Smith
ATTORNEY

Nov. 28, 1950

E. L. ERWIN 2,531,615

TELEPHONE SYSTEM

Filed Oct. 29, 1948

32 Sheets-Sheet 18

INVENTOR
E. L. ERWIN
BY P. C. Smith
ATTORNEY

Nov. 28, 1950 E. L. ERWIN 2,531,615

TELEPHONE SYSTEM

Filed Oct. 29, 1948 32 Sheets-Sheet 19

INVENTOR
E. L. ERWIN
BY
P. C. Smith
ATTORNEY

Nov. 28, 1950 E. L. ERWIN 2,531,615

TELEPHONE SYSTEM

Filed Oct. 29, 1948 32 Sheets-Sheet 20

INVENTOR
E. L. ERWIN
BY
P. C. Smith
ATTORNEY

Nov. 28, 1950 E. L. ERWIN 2,531,615

TELEPHONE SYSTEM

Filed Oct. 29, 1948 32 Sheets-Sheet 21

INVENTOR
E. L. ERWIN
BY
P. C. Smith
ATTORNEY

Nov. 28, 1950 E. L. ERWIN 2,531,615

TELEPHONE SYSTEM

Filed Oct. 29, 1948 32 Sheets-Sheet 22

INVENTOR
E. L. ERWIN

BY P. C. Smith

ATTORNEY

INVENTOR
E. L. ERWIN
BY
P. C. Smith
ATTORNEY

INVENTOR
E. L. ERWIN
BY P. C. Smith
ATTORNEY

Nov. 28, 1950 E. L. ERWIN 2,531,615

TELEPHONE SYSTEM

Filed Oct. 29, 1948 32 Sheets-Sheet 25

INVENTOR
E. L. ERWIN
BY
P. C. Smith
ATTORNEY

INVENTOR
E. L. ERWIN
BY P. C. Smith
ATTORNEY

INVENTOR
E. L. ERWIN
BY P. C. Smith
ATTORNEY

Nov. 28, 1950 E. L. ERWIN 2,531,615

TELEPHONE SYSTEM

Filed Oct. 29, 1948 32 Sheets-Sheet 28

INVENTOR
E. L. ERWIN
BY
P. C. Smith
ATTORNEY

Nov. 28, 1950 E. L. ERWIN 2,531,615

TELEPHONE SYSTEM

Filed Oct. 29, 1948 32 Sheets-Sheet 29

INVENTOR
E. L. ERWIN
BY P. C. Smith
ATTORNEY

Nov. 28, 1950 E. L. ERWIN 2,531,615

TELEPHONE SYSTEM

Filed Oct. 29, 1948 32 Sheets-Sheet 30

INVENTOR
E. L. ERWIN
BY
P. C. Smith
ATTORNEY

Nov. 28, 1950 E. L. ERWIN 2,531,615

TELEPHONE SYSTEM

Filed Oct. 29, 1948 32 Sheets-Sheet 31

INVENTOR
E. L. ERWIN
BY
P. C. Smith
ATTORNEY

Nov. 28, 1950 E. L. ERWIN 2,531,615

TELEPHONE SYSTEM

Filed Oct. 29, 1948 32 Sheets-Sheet 32

INVENTOR
E. L. ERWIN
BY
P. C. Smith
ATTORNEY

Patented Nov. 28, 1950 2,531,615

UNITED STATES PATENT OFFICE 2,531,615

TELEPHONE SYSTEM

Edson L. Erwin, Towaco, N. J., assignor to Bell Telephone Laboratories, Incorporated, New York, N. Y., a corporation of New York Application October 29, 1948, Serial No. 57,389

21 Claims. (Cl. 179—18)

This invention relates in general to telephone systems and in particular to such systems wherein automatic switching equipment is employed under the control of common control circuits for the establishment of conversational and control connections.

The main object of the present invention is to improve the speed of operation, the flexibility, and the efficiency of such telephone systems.

The main feature of the invention is the provision of two separate types of connector circuits for establishing connections to and from the common control circuits from and to subscribers' lines and other such controlled equipment.

Another feature is the provision of such connector circuits whereby for certain control functions of the common control circuits, both connector circuits are used jointly and singly with the same or different common control circuits simultaneously.

Another feature is the provision of such connector circuits such that for certain other control functions of the common control circuit only one of the connector circuits is employed.

Other features of the present invention will be apparent from the subsequent description of an exemplary embodiment thereof.

An automatic telephone system with which the present invention is suited for use is disclosed in detail in an application of A. J. Busch, Serial No. 57,394, filed October 29, 1948. In the Busch system a common control circuit called a marker is employed to establish various control and conversational connections over cross-bar switches. Subscribers' lines terminate on line link frames; various outgoing, incoming, intraoffice and special trunks terminate on trunk link frames; originating and incoming registers terminate on trunk link frames; junctor circuits terminate on both trunk link and line link frames; and, number group circuits terminate on number group frames.

For various types of connections various of the above-named equipments are interconnected under the control of the marker circuits. Whenever the marker requires a connection between itself and another piece of equipment, it connects thereto over a "primary connector," or "frame connector," as it may be referred to. Whenever a piece of equipment desires a connection to a marker, it connects to the marker over a "secondary connector," or "marker connector," depending upon what type of frame terminates said equipment.

For instance, a subscriber who initiates a call connects to a marker through a line link marker connector and the marker is informed that, for instance, a dial tone connection is required. The marker connects to an idle originating register over a trunk link frame connector. The marker then connects to the calling line through a line link frame connector and interconnects the calling subscriber and the originating register over cross-bar switches whereby the register transmits dial tone to the subscriber. The marker releases to serve other control and conversational connecting functions. After the subscriber has dialed a called number into register relays of the originating register, the latter connects to a marker (which may be the same or a different one) over an originating register marker connector to inform the marker of the called designation. The marker consults a number group circuit over a number group frame connector for the equipment location of the called line. The marker translates the office code and if this code indicates that the call is for the local office, the marker selects a trunk link frame and an idle intraoffice trunk thereon. After seizing the trunk link frame, the marker consults the number group for the translation of the four numerical digits. After the terminating, or called-end stage of the call has been set up by the marker, the latter again connects to the calling line over a line link frame connector and interconnects the calling line to the originating end of the intraoffice trunk to complete the originating, or calling-end stage connection.

The various marker or secondary connector circuits associated with the line link frames, the incoming registers, and the originating registers, etc. are arranged in preference circuits such that, for instance, line link marker connector circuits will have preference of markers over originating register marker connectors and the latter will have preference over incoming register marker connectors. Also, the various marker connectors for several equipments of the same type, say line link frames, would themselves be arranged in a preference order for the use of markers.

The frame or primary connectors, through which the marker connects to line link frames, trunk link frames, number group frames, etc. are arranged in a preference order also, such that a given frame connector is preferred by a marker for connection to the associated frame.

Furthermore, the various frame or primary connectors and the marker or secondary connectors are common to the equipment to which or from which connections are made from or to the marker. This provision enables an equipment to connect to an idle marker even though some of the marker or secondary connectors may be busy; but, prevents a marker from connecting to an equipment if the frame or primary connector is busy. However, it will be appreciated that equipment, such as line link frames, which may be interconnected with a marker over a frame connector or over a marker connector, can be connected to two different markers at the same time, over a frame and a marker connector.

The latter feature of the present invention, the accessibility of say a line link frame to or from markers simultaneously, is responsible for a marked increase in the speed of operation of such systems as the cross-bar system disclosed in the Busch application. One notable change from prior systems resides in the dual connector arrangement: marker connectors for the use of line link frames in calling in and connecting to markers; and, frame connectors for the use of markers in calling in and connecting to frames, such as line link frames. The dual connector arrangement, rather than merely duplicating connecting functions, permits a marker to terminate a call, for instance on line link frame switches, through the agency of a frame connector without requiring another marker, or the same marker, to wait for completion of that job before accepting an originating call on the same frame through a marker connector. Two originating calls cannot proceed through the same marker connector simultaneously, however, nor may two markers, or the same marker, terminate two connections to the same frame through the frame connector simultaneously. Nevertheless, as will be appreciated, the system is speeded up by permitting markers to accept originating call connections simultaneously with terminating connections on the same frames.

The above-outlined intraoffice call is used hereinafter as a detail example of the use in an automatic telephone system of the present invention. Only sufficient disclosure is made of the system disclosed in the application of A. J. Busch hereinbefore referred to as is necessary for a complete understanding of the present invention. Reference is made to the above-identified Busch application for details of the system, and particularly of the marker circuits thereof, not disclosed herein, and such details are to be considered as included in the present application by reference.

The detailed description of one embodiment of the present invention is set forth below in conjunction with the drawings forming a part of this disclosure, and which drawings may be described generally as follows.

Figure 3:
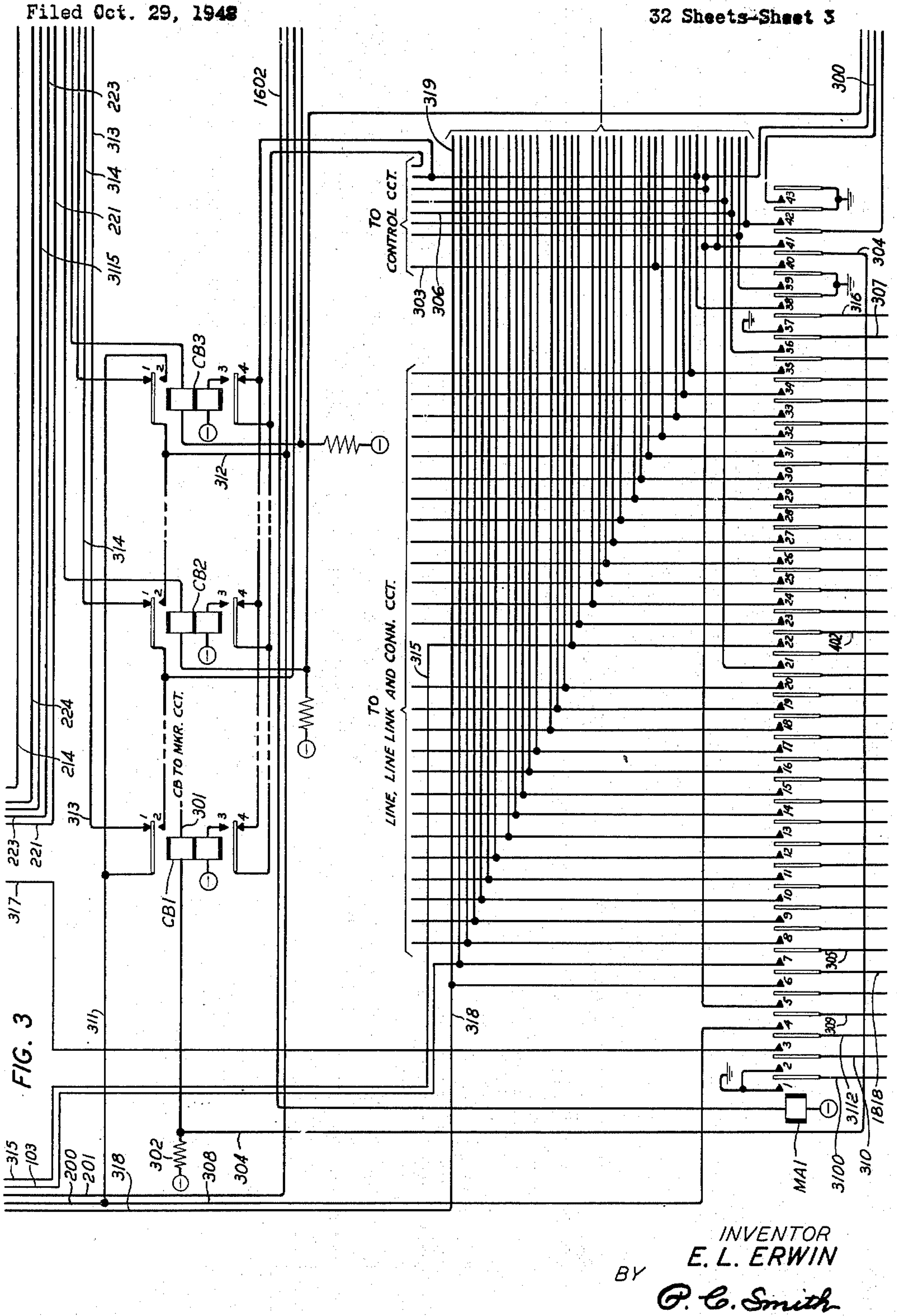
Figure 4:
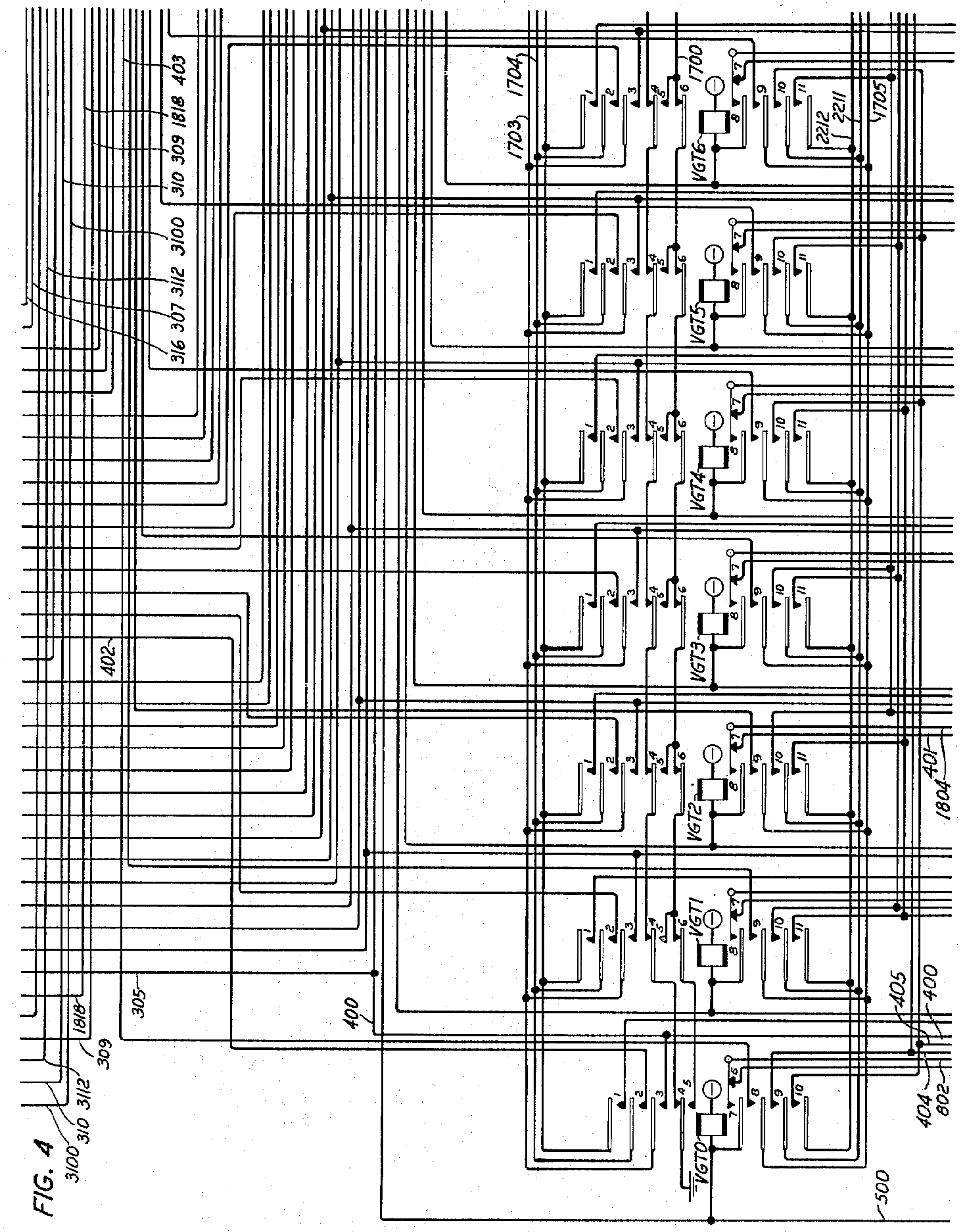
Figure 5:
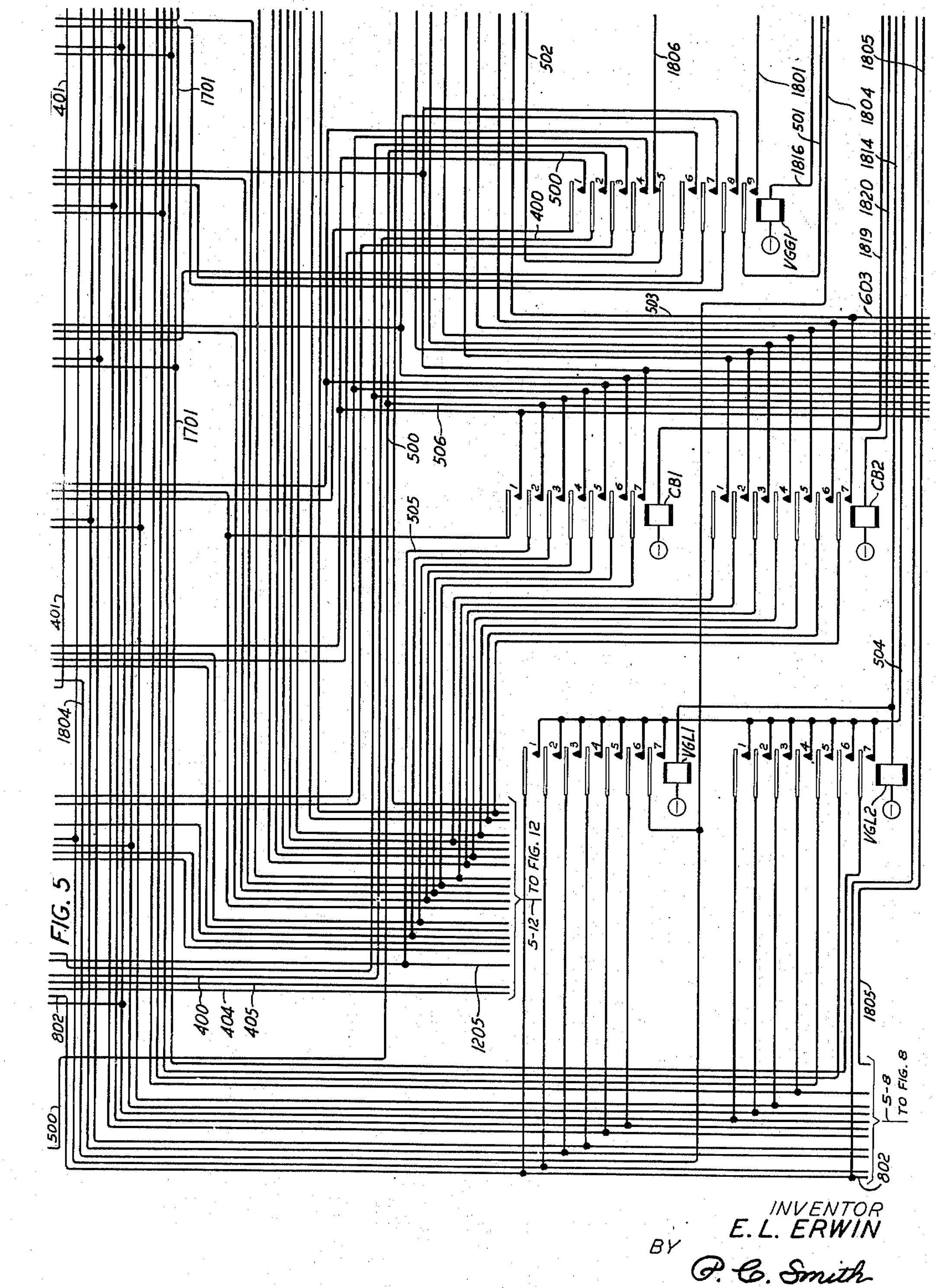
Figure 6:
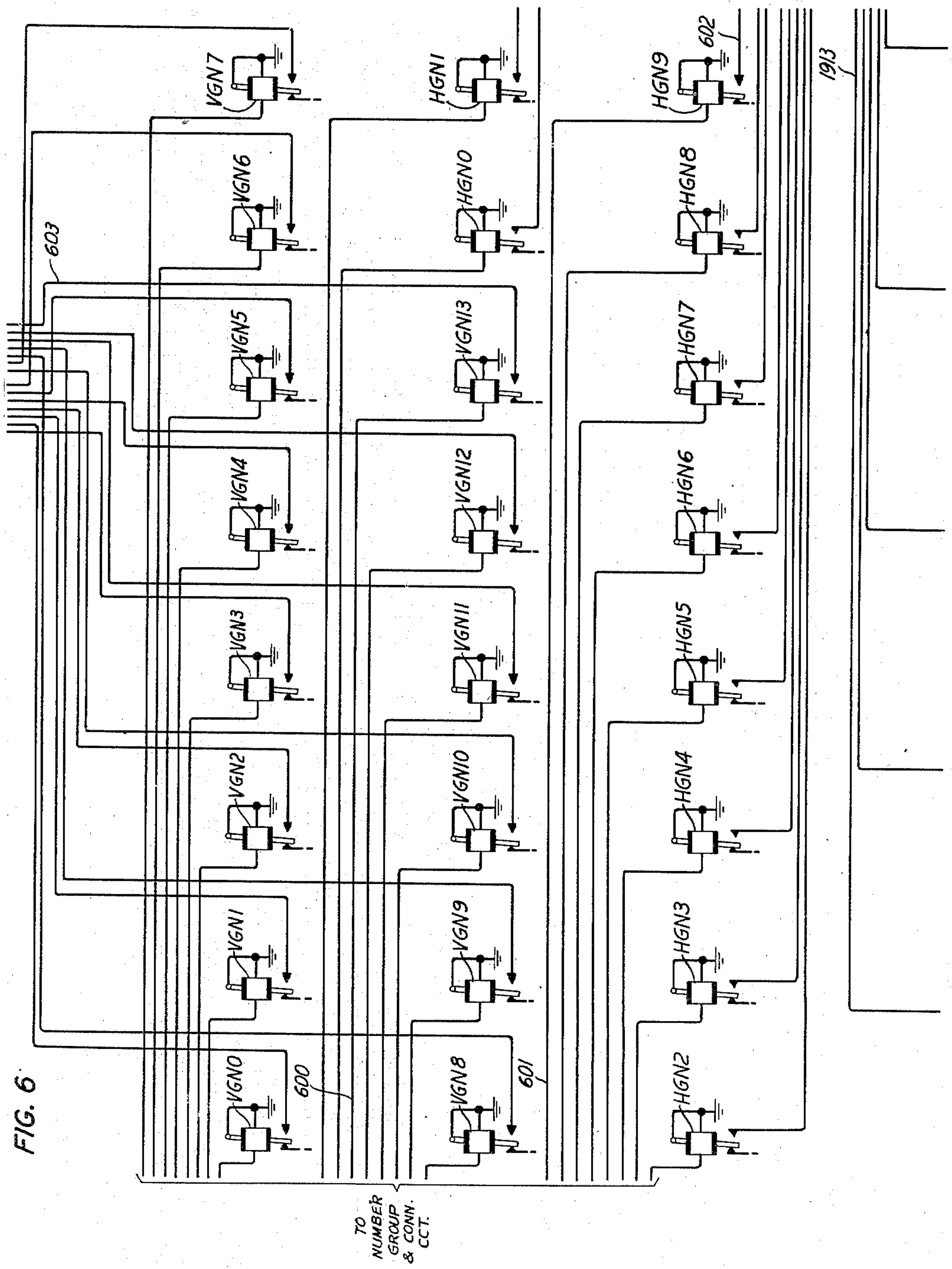
Figure 7:
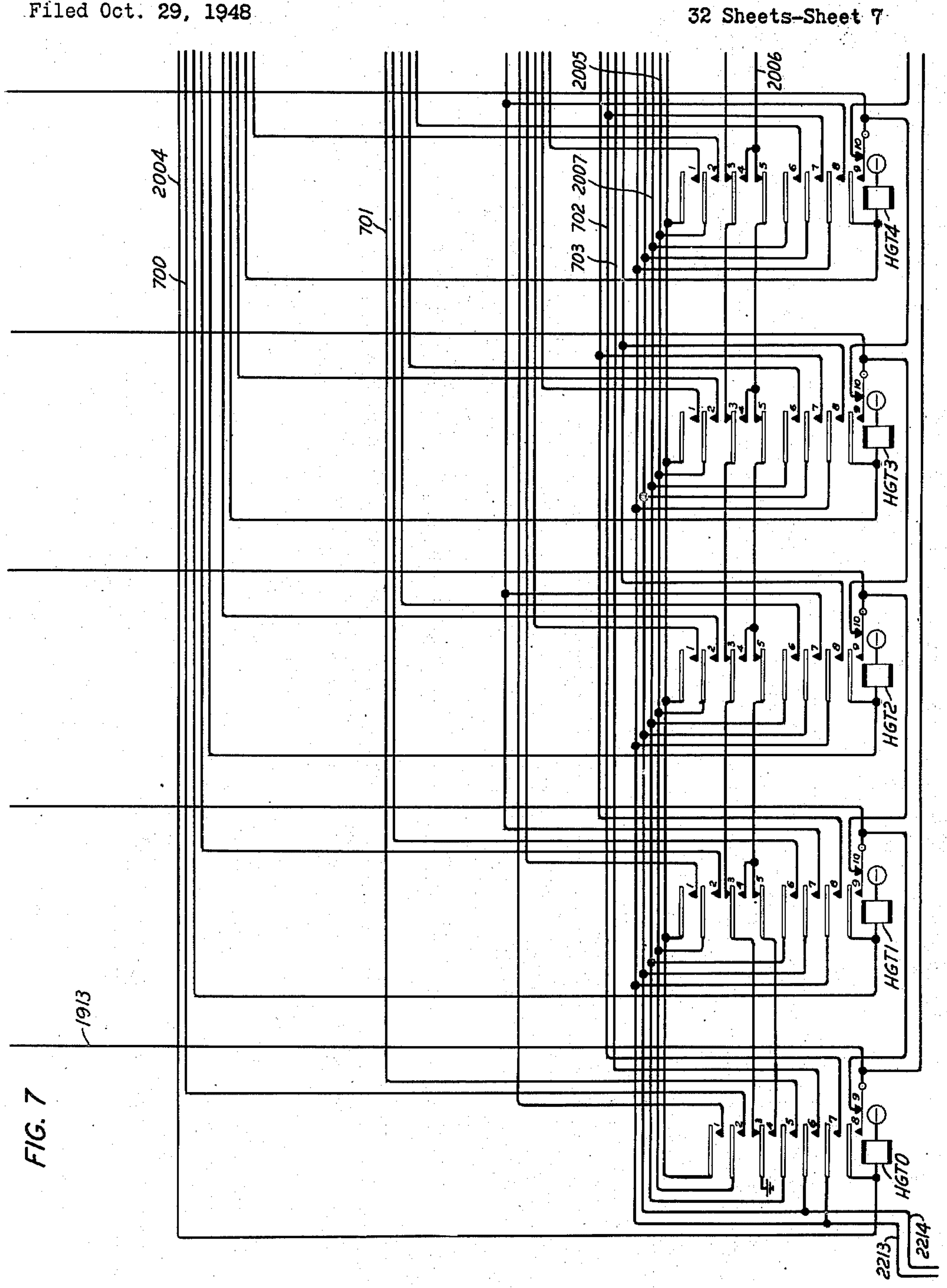
Figure 16:
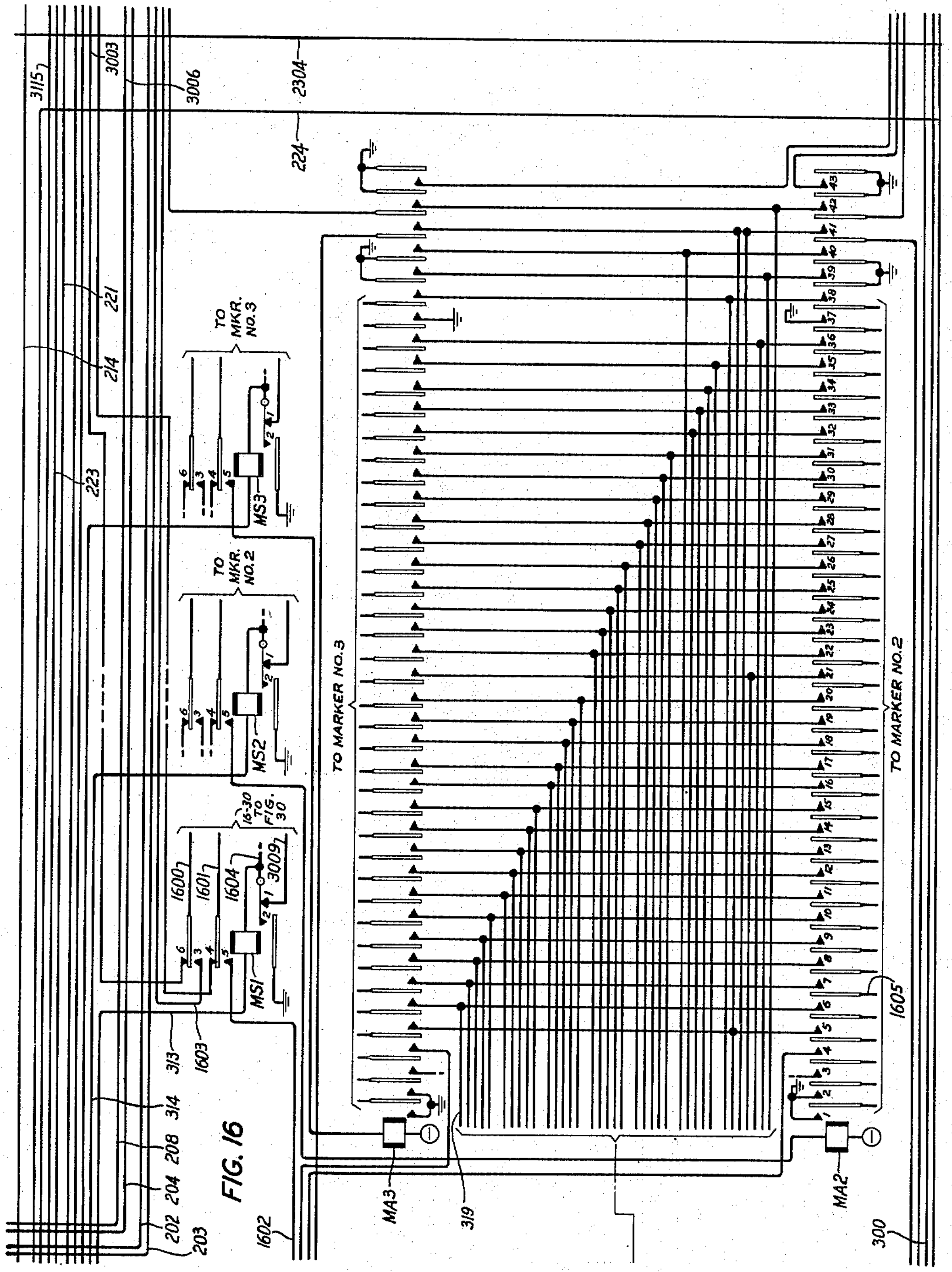
Figure 17:
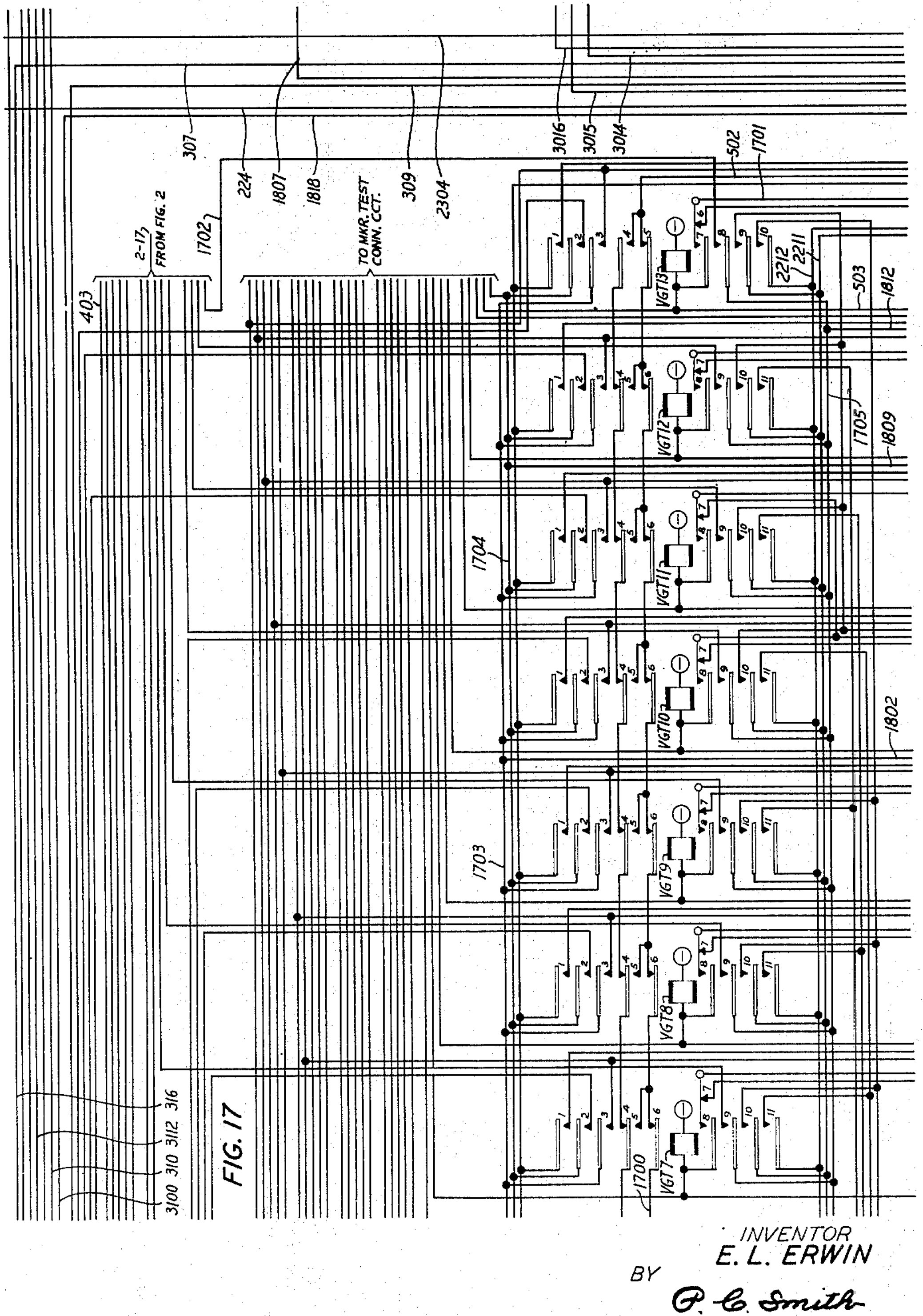
Figure 28:
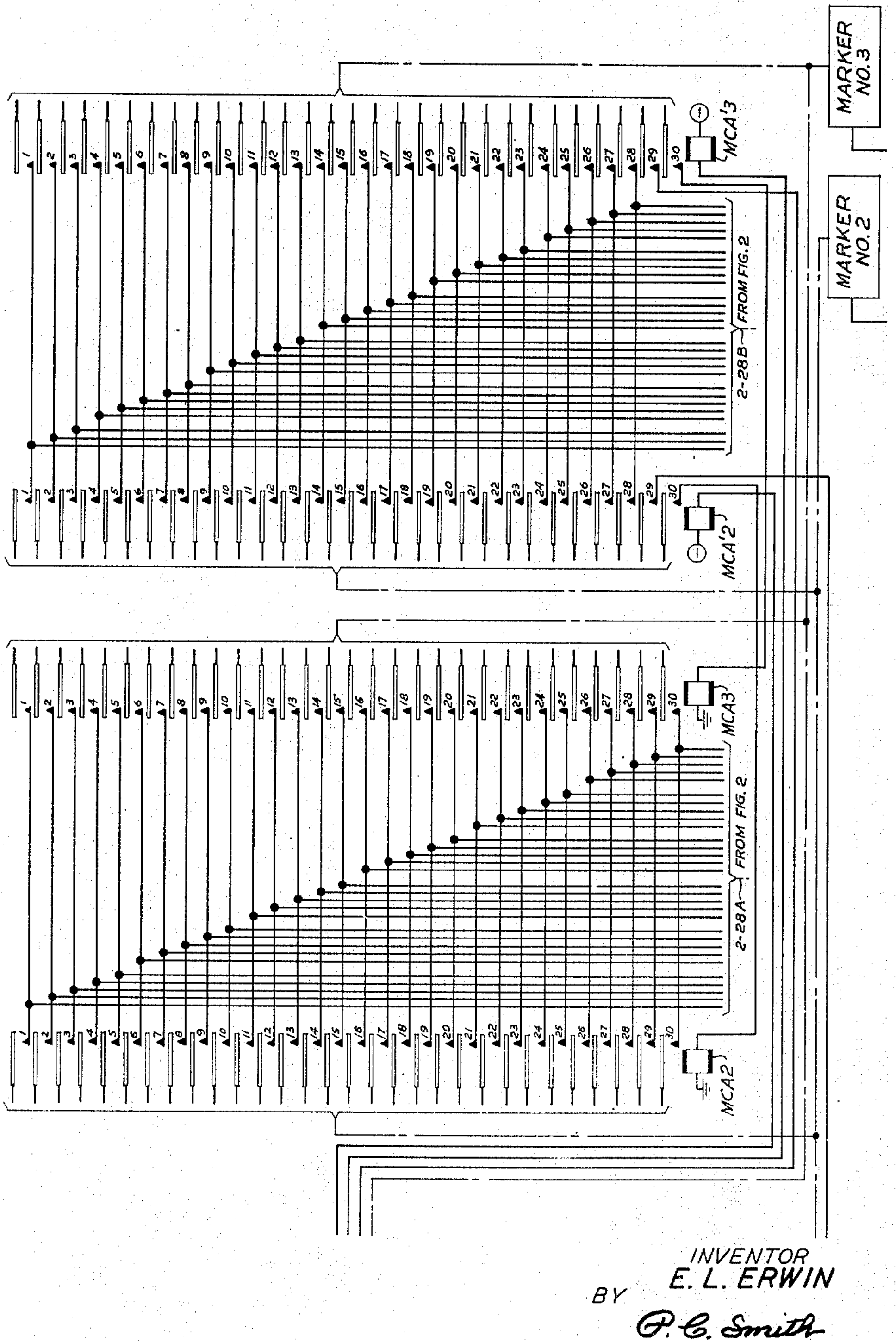
Figure 29:
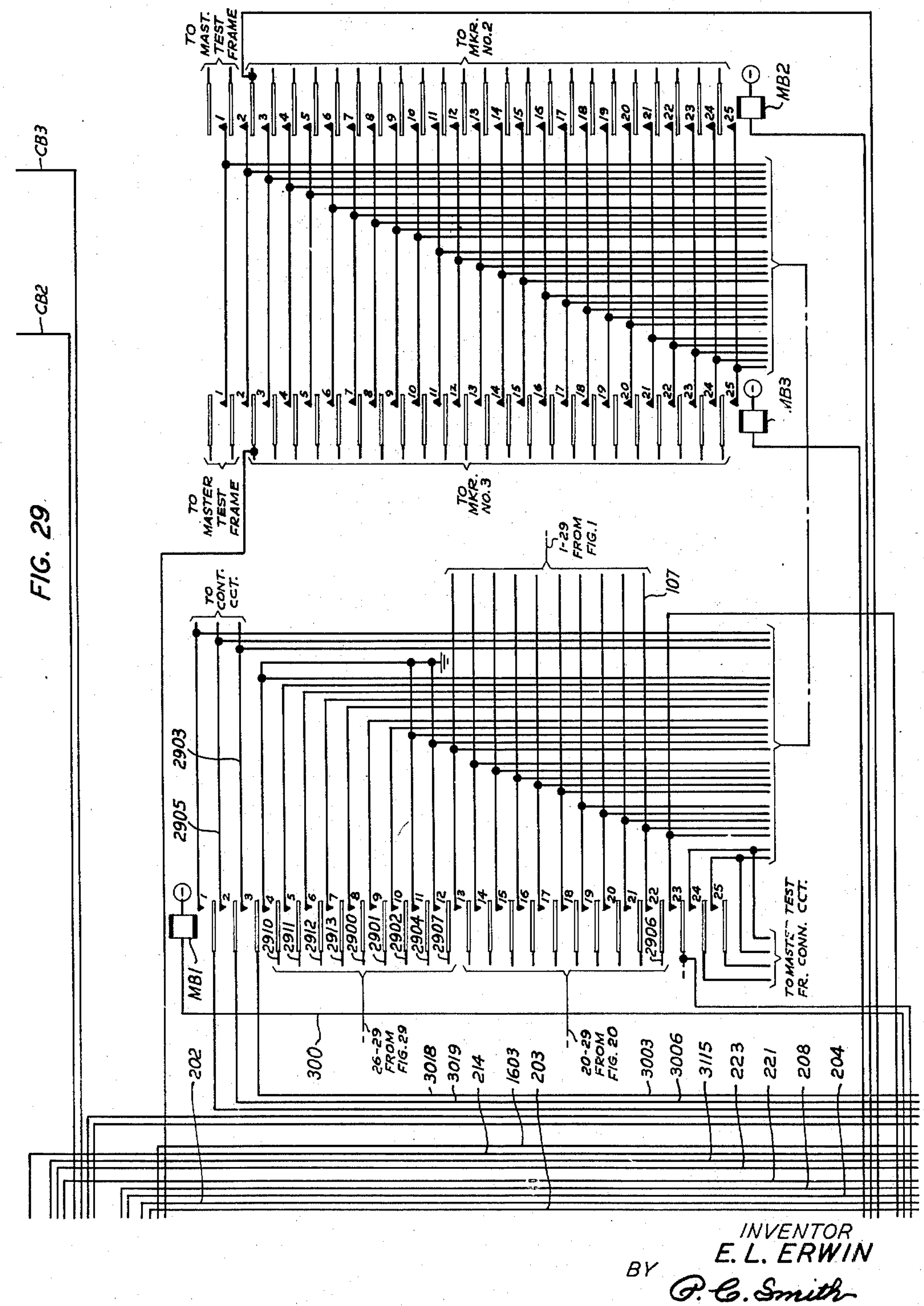

Figs. 3, 16 and 29 show parts of line-link marker, or secondary connector circuits for three markers, two of which are shown in block form in Fig. 28; and Figs. 4 through 14, 17 through 27, 30, and 31 show parts of the marker circuits for the other marker.

A detailed description is now set forth of an intraoffice call where the calling and the called lines terminate on line link frames of the same central office and where the present invention is employed in the successful setting up of the control and conversational connections required to interconnect the calling and the called subscribers.

When the subscriber at substation 100 initiates a call, the removal of the receiver at the substation completes a circuit from battery through the winding of line relay L00(1), contact 1 of hold magnet LH00(1), over the switchhook contact of the line at substation 100, contact 2 of hold magnet LH00(1) to ground. Line relay L00(1) operates in this circuit and connects ground to conductors 101 and 102. The connection of ground to conductor 101 is ineffective at this time.

The connection of ground to conductor 102 completes the circuit through resistance 0(1) and the winding of vertical group relay VGS0(1) to battery. Relay VGS0(1) is individual to the zero vertical group of fifty lines on frame 00 and is operated in response to the initiation of a call by any one of the fifty lines. Each vertical group includes ten horizontal subgroups of five lines and each horizontal subgroup has an individual conductor such as conductor 102 and an individual resistance such as resistance 0(1) through which any one of the five lines in that horizontal subgroup may operate the corresponding vertical group relay. These subgroup conductors are used subsequently to identify the horizontal subgroup to the marker. Relay VGS0(1) at contact 4 closes an obvious circuit for relay DT(1).

At contact 3, relay VGS0(1) connects ground to conductor 103 and at contacts 1 and 2 connects battery through resistance ST(1), over contacts 1 and 2 of relay L0(1), contacts 1 and 2 of relay VGS0(1) to start conductors 104 and 105 of the line link marker connector individual to the line link frame 00.

Each link frame has a line link marker connector individual thereto comprising a control circuit and a plurality of multicontact relays. The multicontact relays for the connector associated with line link frame 00 are shown in Figs. 3, 16 and 29. There is a set of multicontact relays for each marker to which the line link frame may be connected. Multicontact relays MA1(3) and MB1(29) are individual to the first marker which is that shown partially in Figs. 4 through 14, 17 through 27, and 30, 31. Multicontact relays MA2(16) and MB2(29) are individual to an intermediate marker called marker 2 and shown on Fig. 28, while multicontact relays MA3(16) and MB3(29) are individual to a third marker, also shown on Fig. 28.

The start circuits for the line link marker connector of frame 00 closed by the connection of battery to conductors 104 and 105 as above described, may be further traced to conductors 200 and 201. At the same time the operation or relay VGS0(1) closes a circuit from ground over its contact 4, contact 4 of relay L0(1) to conductor 106 which extends to the marker connector control circuit for timing purposes. Ground on conductor 106 starts a timing circuit in this marker control circuit to measure off a time interval during which the line link marker connector should operate to connect an idle marker with the line link frame 00.

In order to distribute the use of the markers with any one line link frame, the marker control circuit (not shown) is provided with relay means which operate on alternate calls and release on alternate calls so that a different one of the conductors 104, 105 is completed in circuit to one of the conductors 200, 201 on alternate calls such that a different marker preference relay is used on successive calls. It will be assumed that conductor 104 will be extended to conductor 200 and then over conductor 311 which is shown connected to the upper armature of relay CB1(3). On the next call, conductor 105 will be extended to conductor 201 and thence over conductor 312 which is connected to the upper armature of relay CB3(3). Each connector has a chain busy relay CB–(3) and a marker start relay MS–(16) for each marker. As three markers have been indicated on the drawings, while several more markers may be used in an actual installation, only three chain busy relays CB–(3) have been shown for the line link marker connector of frame 00 with their associated marker start relays MS–(16). Each marker connector control circuit (not shown) has its two start leads such as conductors 200, 201, connected to the armatures of two CB–(3) relays preferably at separate points in the CB chain of relays. A separate trio of chain busy relays CB would be provided for another line link marker connector which would be arranged to function with the three markers shown. The start leads such as conductors 200, 201 for the other marker connector would be extended one at a time by the associated control circuit in the above manner to different CB relay armatures.

Figure 30:
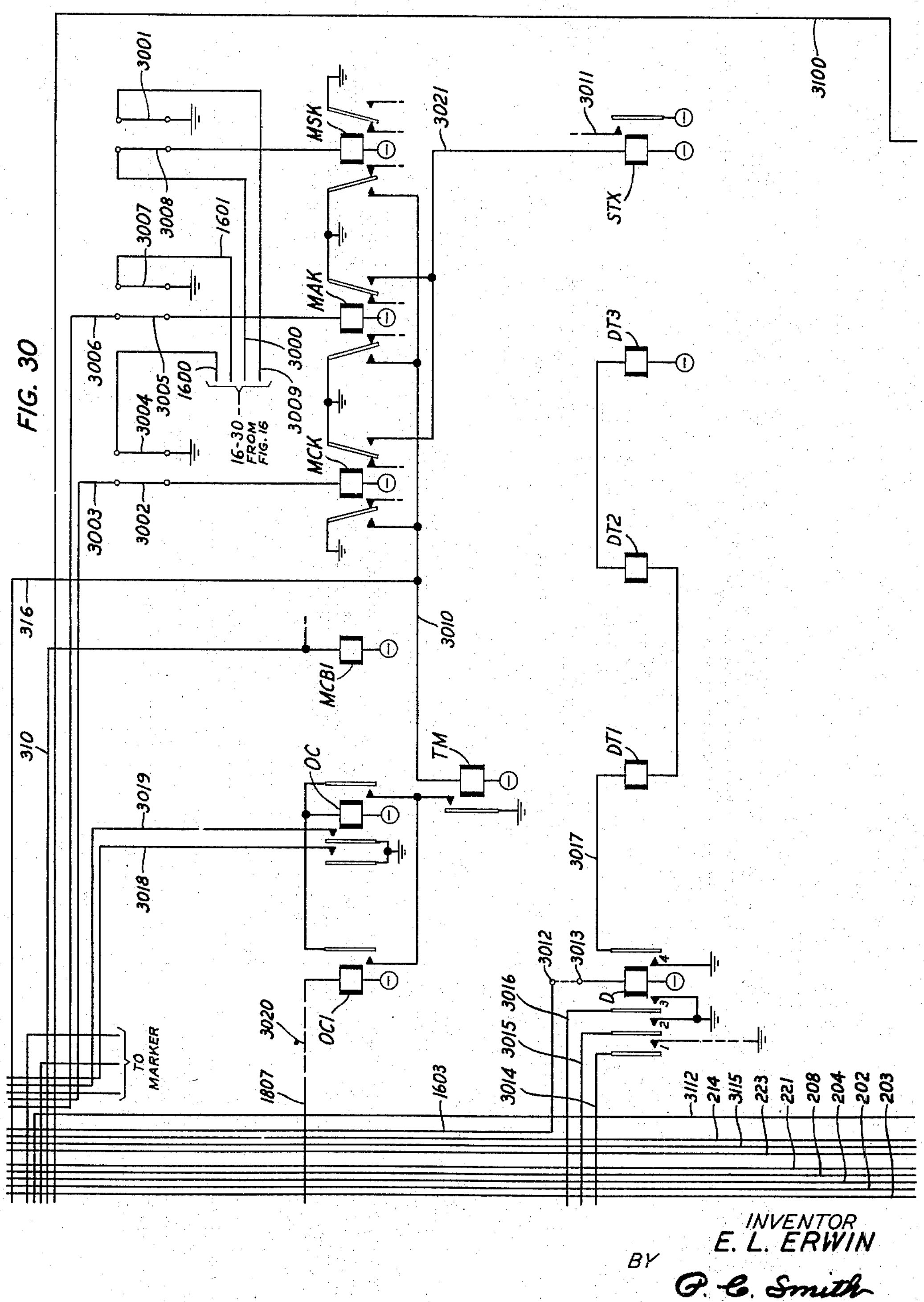

Assuming that relay CB1(3) is not operated, the start circuit previously traced to conductors 200, 311 extends over contact 1 of relay CB1(3), over conductor 313, winding of relay MS1(16), conductor 1604, over the normal contacts of all other MS relays for the same marker associated with other marker connector circuits through cable 16—30 to Fig. 30 and over conductor 3000 and cross-connection 3001 to ground.

Since the marker must also be associated with originating registers (not shown) and incoming registers (not shown), a connector similar to the line link marker connector is provided for associating the marker with the originating registers known as the originating register marker connector. The CB relays for each connector are arranged in a continuous chain so that irrespective of the CB relay to which the start circuits such as conductors 200 and 201 of a particular connector is connected, all of the markers will be available; for example, with conductors 311 connected to the armature of relay CB1(3), if the first marker is busy resulting in the operation of relay CB1(3), as described in the Busch application, the circuit will be extended over contact 2 of relay CB1(3) to the armature of relay CB2(3) and over contact 1 of that relay, if that marker is idle, to the winding of relay MS2(16), over conductor 314. On the other hand, if the second start circuit is closed which extends over conductor 312 to the armature of relay CB3(3) and the associated marker is busy so that relay CB3(3) is operated, the start circuit extends over contact 2 of relay CB3(3) to the armature of relay CB1(3) and thence to the winding of relay MS1(16), over conductor 313. It will be understood of course that there will be a plurality of CB relays, one for each marker, with contact 2 of each relay connected to the armature of the subsequent relay in the chain.

Similarly, the marker start relays MS are arranged in a chain (not shown) individual to each marker and are so arranged that the line link marker connectors have preference over the originating register marker connectors and the originating register marker connectors have preference over the incoming register marker connectors.

Relay MS1(16) operates in the above-traced circuit locking over its contact 2 to ground.

When the first marker associated with chain busy relay CB1(3) and marker start relay MS1(16) is idle, circuits are closed over the contacts of the associated MS relays for the same marker in all of the various connectors to hold operated relays MAK(30, MCK(30) and MSK(30) in the marker. The circuit for holding relay MCK(30) operated may be traced from battery through the winding of relay MCK(30), through the cross-connection 3002, conductor 3003, through the MS chain for other marker connector circuits associated with the same marker including contact 6 of relay MS1(16), conductor 1600 through cable 16—30 to Fig. 30 to ground in the marker over cross-connection 3004. A similar circuit is closed from battery through the winding of relay MAK(30), cross-connection 3005, conductor 3006 through the MS chain for other marker connectors associated with the same marker including contact 4 of relay MS1(16), conductor 1601 through cable 16—30 to Fig. 30 to ground over cross-connection 3007. The circuit for relay MSK(30) extends over cross-connection 3008, conductor 3009 through cable 16—30 to Fig. 16, contact 1 of relay MS1(16), conductor 1604 over the MS chain for the same markers through cable 16—30, conductor 3000 to ground over cross-connection 3001.

When relay MS1(16) operates as previously described, all of these circuits are opened and the relays MCK(30), MAK(30) and MSK(30) all release. Relays MCK(30) and MAK(30) in releasing, connect ground to conductor 3021 and all three relays in releasing connect ground to conductor 3010 to operate relay TM(30) which, in operating, performs no useful function at this time. Ground on conductor 3021 completes the circuit extending to the winding of relay STX(30) and battery. At its contact relay STX(30), upon operating, connects direct battery to conductor 3011 completing the battery supply for the channel test relays (not shown).

With relay MS1(16) operated a circuit is closed from ground at cross-connection 3007, conductor 1601 through cable 16—30, contact 5 of relay MS1(16), conductor 1602 to the winding of relay MA1(3) and battery. In addition, relay MS1(16) closes a circuit to tell the marker that it is to serve a dial tone connection which circuit may be traced from ground through cross-connection 3004, conductor 1600, cable 16—30, contact 3 of relay MS1(16) and conductor 1603 to a cross-connecting terminal 3012.

There is a cross-connecting terminal such as terminal 3012 for each line link frame and these cross-connecting terminals are in turn connected to terminal such as 3013 in accordance with the type of line connected to that frame. If all of the lines on the frame are dial pulse lines, terminal 3012 will be connected to such a terminal as 3013. If, on the other hand, all of the subscribers with lines appearing on a particular line link frame have multifrequency dialing arrangement, the terminal corresponding to terminal 3012 will be connected to some other terminal corresponding to 3013. If both types of lines appear on a frame, the terminal corresponding to terminal 3012 will be cross-connected to a still different terminal corresponding to terminal 3013. In general, the particular connection between terminals such as 3012 and 3013 will be effective to operate different route relays which serve to distinguish the type and location of the originating register to be selected in accordance with the type of pulses which they are designed to receive. In the present case, terminal 3012 is cross-connected to terminal 3013 whereby relay D(30) operates to inform the seized marker that this marker connector requires dial tone equipment.

Relay MA1(3) when operates as above described, closes a plurality of contacts for associating the marker 1 with line link frame 00. In addition, relay MA1(3) closes a circuit from ground over its contact 43 to the winding of relay MB1(29) over conductor 305 and battery to further connect the marker 1 with the line link frame 00.

Relay MA1(3) closes a circuit (not shown) thereby causing the stopping of the marker selection timing operation previously mentioned. Relay MA1(3) also closes a circuit (not shown) for conditioning the marker control circuit (not shown) such that when the marker releases and is reseized by the same connector circuit a different start lead 104, 105—200, 201 will be extended to the chain busy relays CB-(3). In addition, relay MA1(3) closes a circuit from ground over its contact 2, conductor 310 through the winding of relay MCB1(30) to battery. Relay MCB1(30) operates in this circuit to make the marker busy. The marker, as a result of the operation of relay MCB1(30), closes circuits over conductors corresponding to conductor 301 for relay CB1(3) through the windings of all other CB relays (not shown) for the same marker but associated with other connector circuits to battery through resistances corresponding to resistance 302 for relay CB1(3) respectively to mark this marker busy in all the other connectors. However, in the connector associated with line link frame 00, the operation of relay MA1(3) has already closed a circuit from ground in the marker connector control circuit (not shown) over lead 303, contact 40 of relay MA1(3), conductor 304 to resistance 302 and battery in shunt of the winding of relay CB1(3) thereby preventing the operation of relay CB1(3) and preventing the opening of the circuit of relay MS1(16). In all other connectors, due to the operation of the relay CB therein associated with marker 1, a start circuit over such conductors as 311 closed by any such connector will be advanced to the next marker. In addition, relay MA1(3), when operated as previously described, closes a circuit from battery through the windings of relays CKG3(31) and CKG2(31), conductor 3100 to ground at contact 1 of relay MA1(3). Relay MA1(3) also at its contact 37 places ground over conductor 316 and over conductor 3010 to hold relay TM(30) operated. At its contact relay CKG3(31) closes an obvious circuit to the winding of relay CKG4(31) and battery.

When relay CKG4(31) is operated it closes a circuit over its contact to contact 4 of relay SCB1(31) and over the contact of relay LK1(31) and in series through the windings of relays LLC1(31) and LLC2(31) and thence to the winding of relay 0NW(31) and battery.

Relay D(30) at contacts 1, 2, 3 and 4 connects ground to conductors 3014, 3015, 3016 and 3017 respectively. Ground on conductor 3014 completes a circuit over contact 1 of relay VTK(18) in parallel to the windings of relays VGG1(5) and VGG2(18) and battery over respective conductors 1816 and 1817. Relays VGG1(5) and VGG2(18) prepare the marker for receiving the vertical group identification of the calling line. Ground on conductor 3015 completes a circuit over contact 1 of relay HTK(19), conductor 1900 to the marker controller circuit and back over conductor 1901 to the winding of relay HGG(19) and battery. Relay HGG (19) prepares the marker to receive the horizontal group of the calling line identification. Ground on conductor 3017 completes a series circuit through the windings of relay DT1(30), relay DT2(30), and relay DT3(30) to battery. In addition, relay D(30) completes a circuit from ground on contact 3 of relay D(30), conductor 3016, contact 2 of relay FTK(22), over conductor 2221 to the winding of relay VFG(9) and to battery. Relay VFG(9) prepares the marker to identify the vertical file in which the calling line is located.

Figure 11:
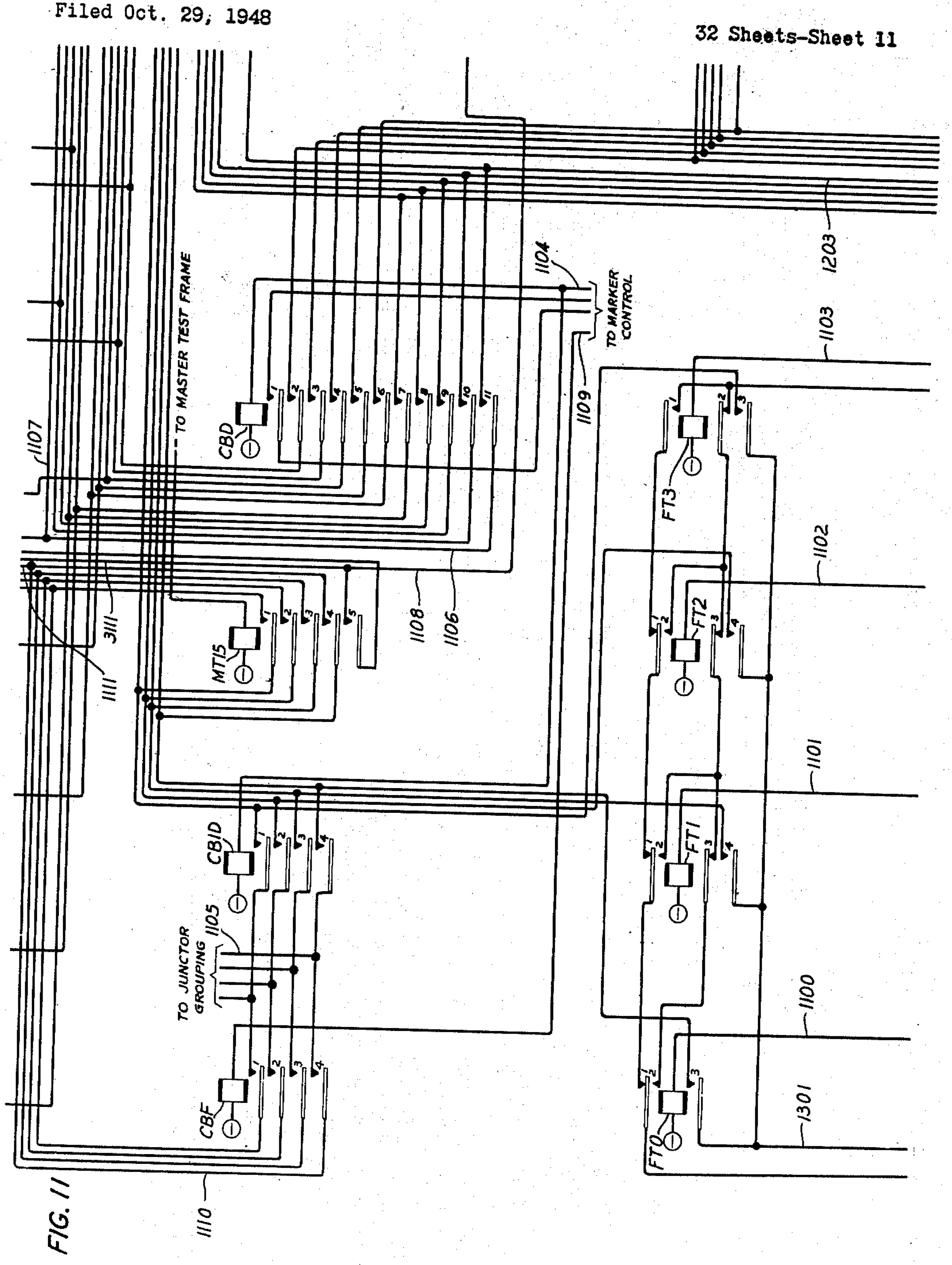
Figure 12:
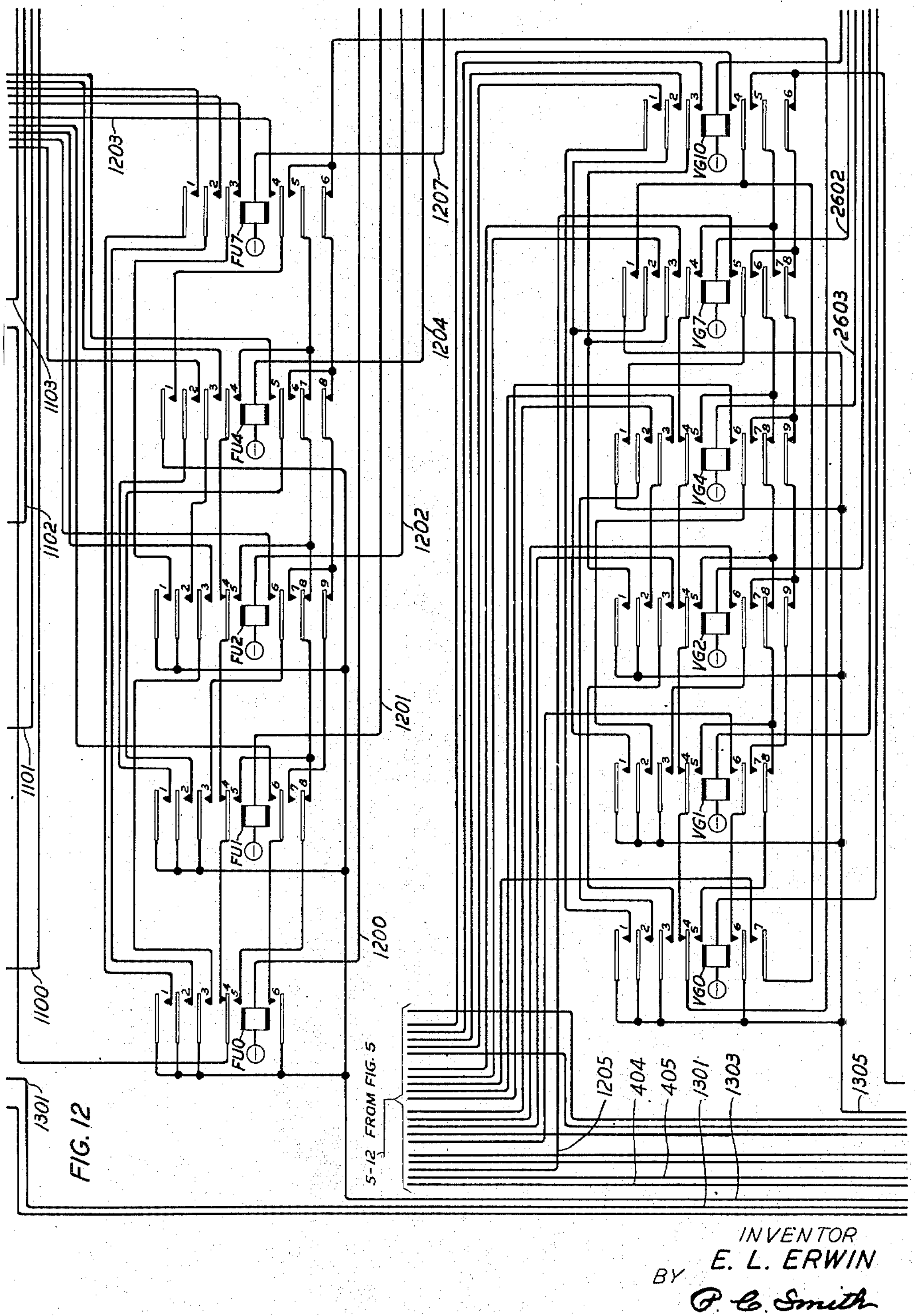
Figure 13:
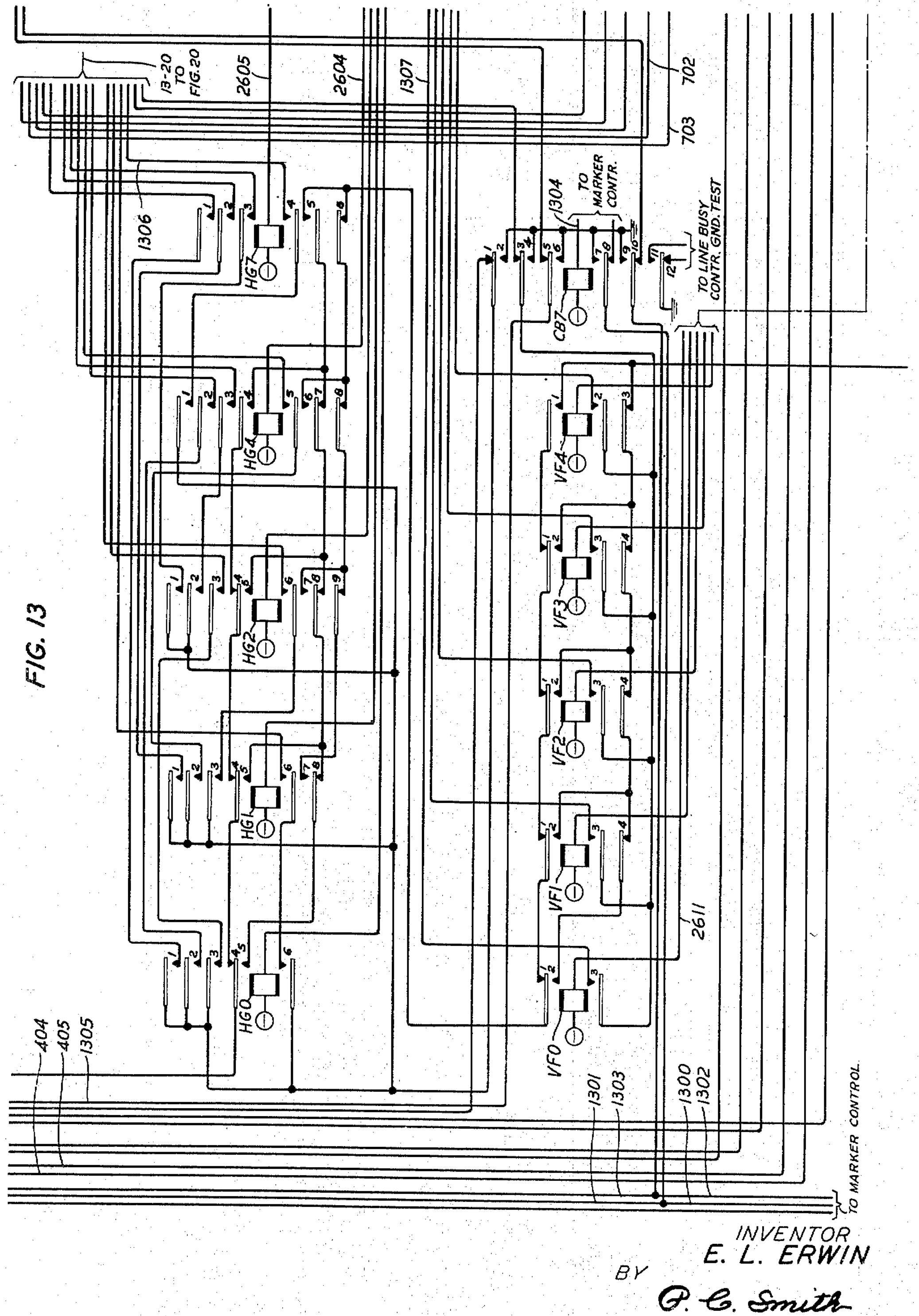
Figure 14:
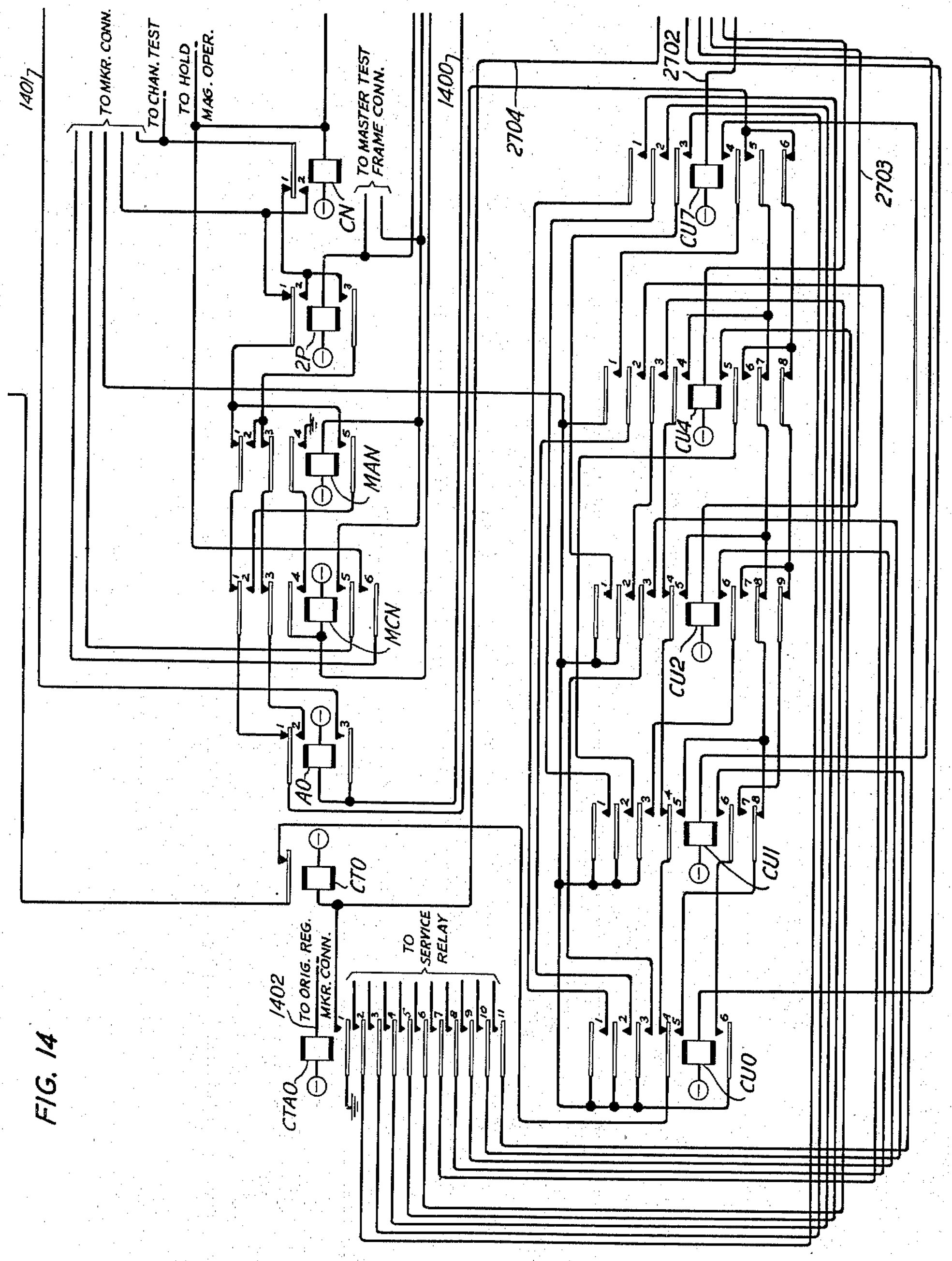
Figure 31:
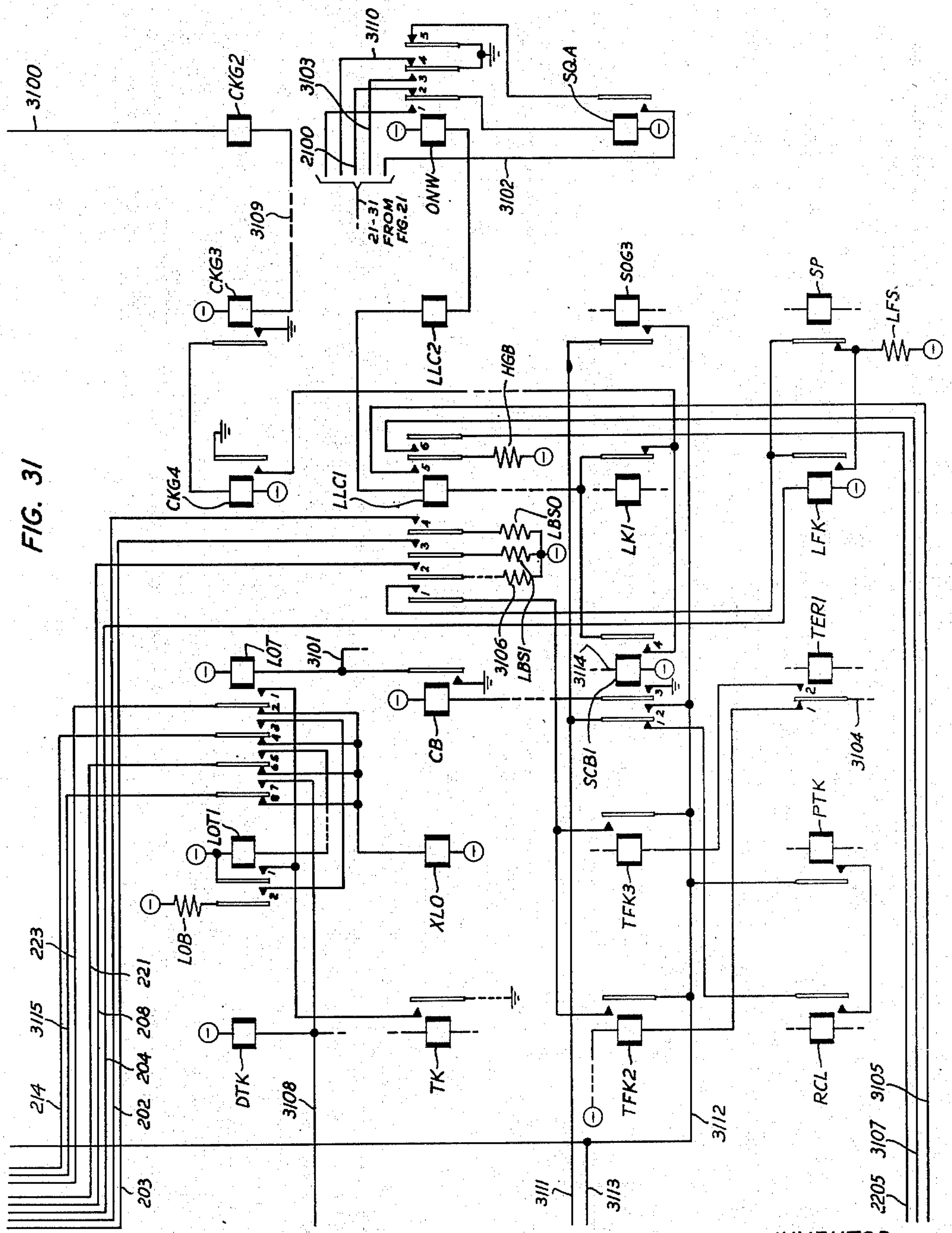
Figure 32:
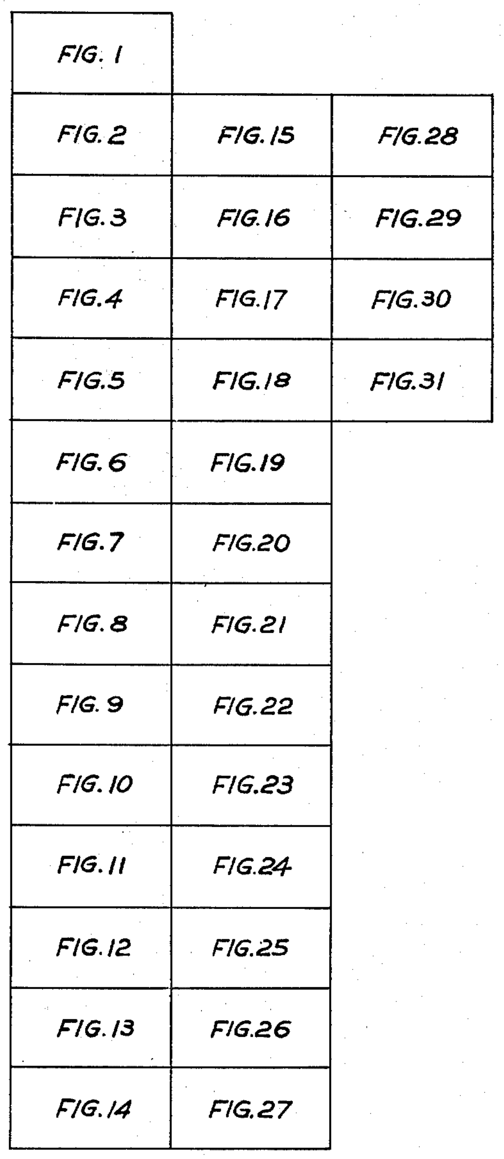

When relay DT1(30) was operated, as previously described, it closed a circuit from ground over conductor 3101 in Fig. 31 from the marker controller circuit which extends through the winding of relay L0T(31) to battery and in parallel therewith over conductor 1104 in Fig. 11 from the marker controller circuit through the winding of relay CBD(11) to battery and through the winding of relay CBD1(11) to battery. Relay DT1(30) also closes a circuit from ground in the marker controller circuit over conductor 2600 of Fig. 26 to the windings of relays GTL3(26), GTL4(26) and GTL2(25) and battery. The functions of these relays will appear hereinafter.

Figure 8:
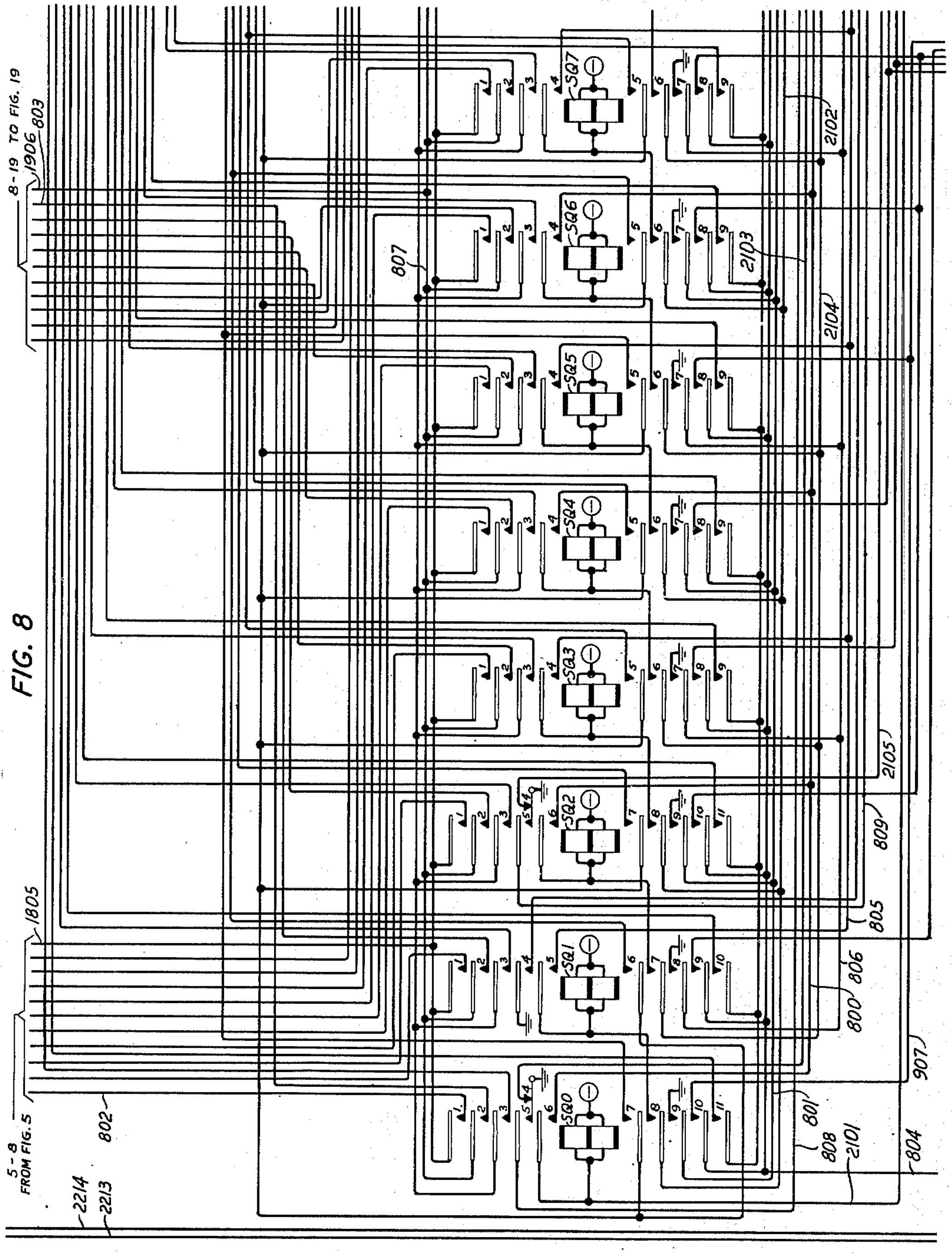
Figure 9:
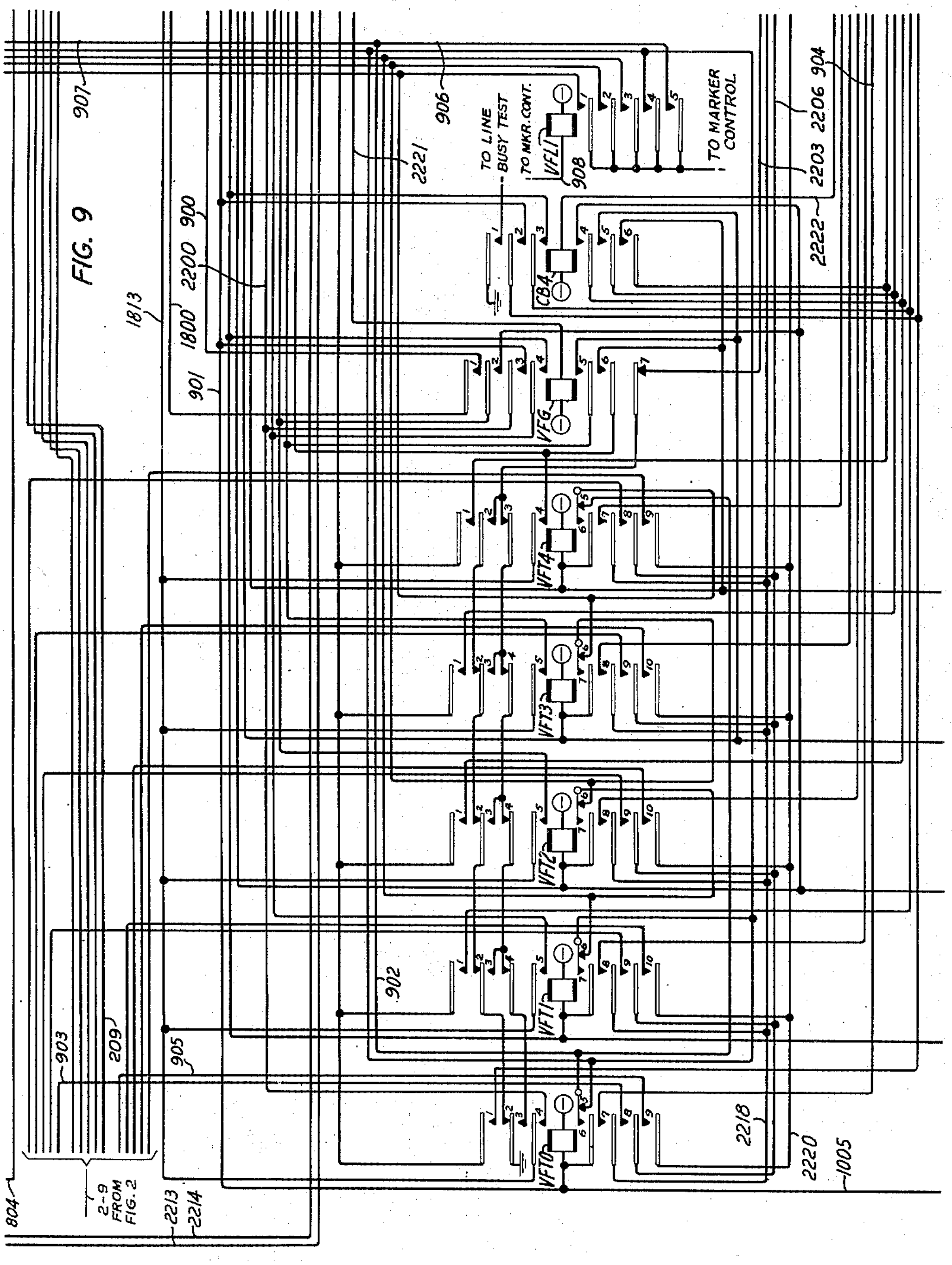
Figure 10:
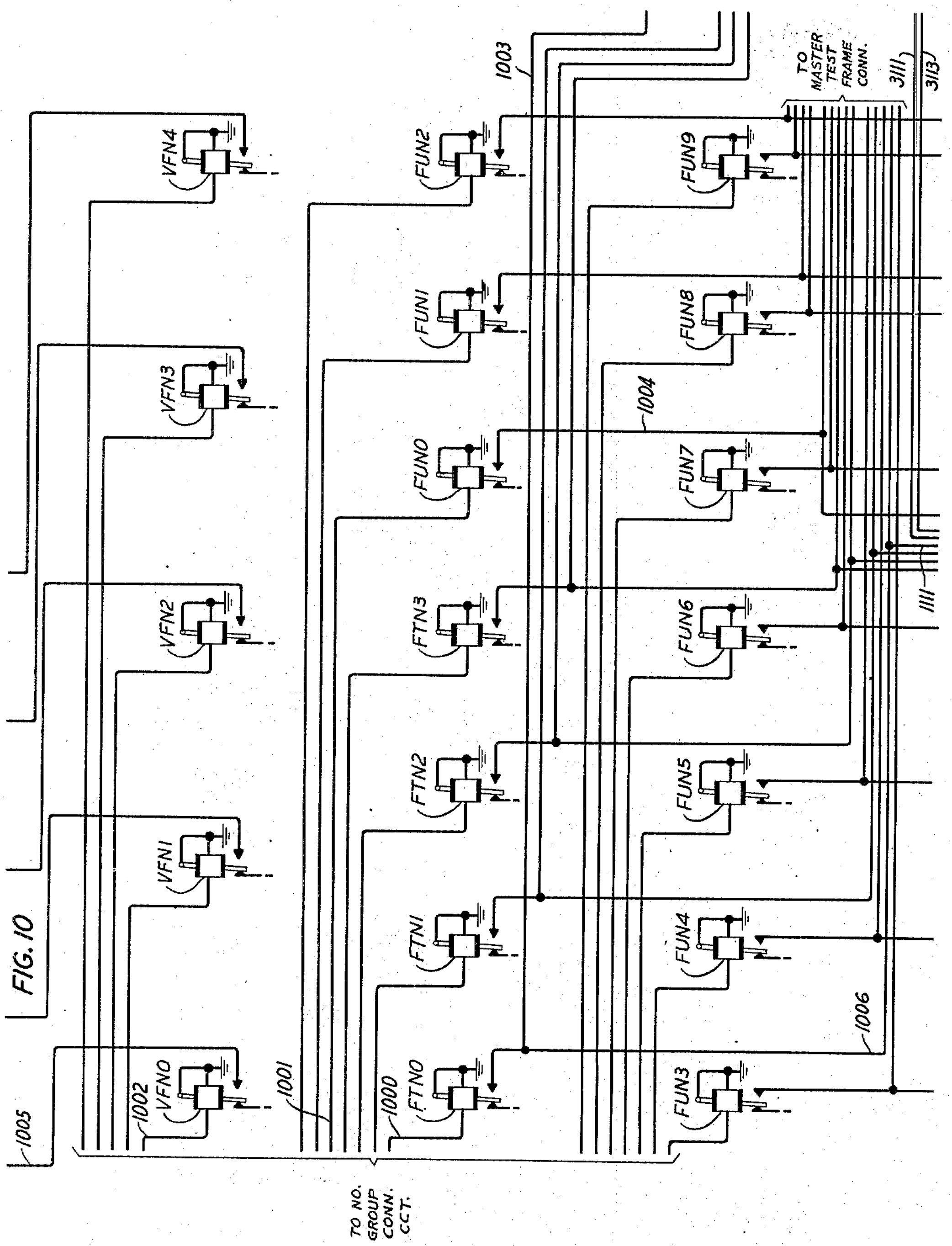
Figure 21:
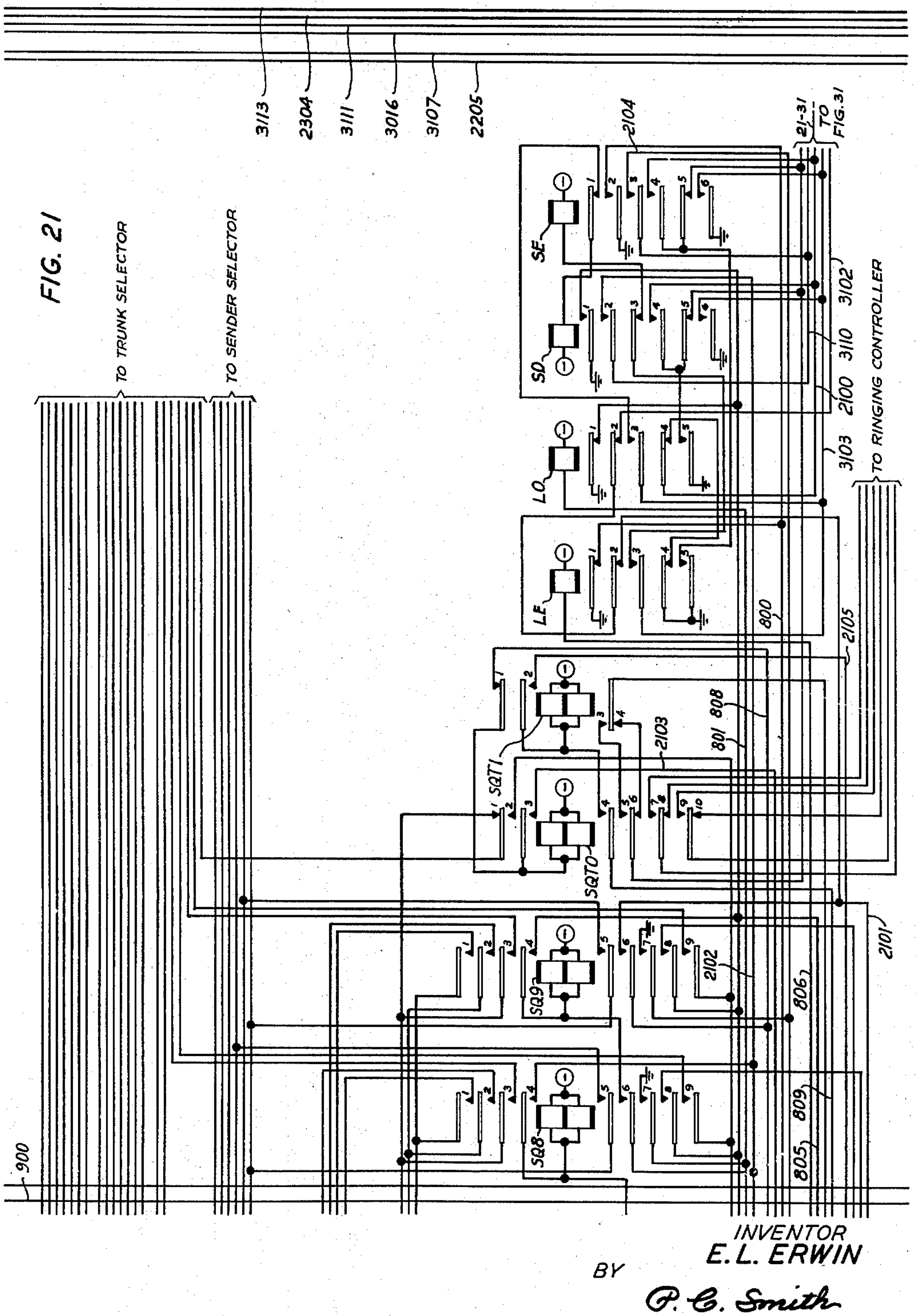

Means is provided in the marker to sequentially advance the preference on successive calls to different horizontal and vertical groups on the line link frame. For controlling the preference among groups of lines on the line link frame, the sequence relays of Figs. 8 and 21 are provided. When the marker is first put into service a circuit exists for the operation of relay SQA(31) which may be traced from ground over contact 4 of relay LE(21), contact 4 of relay L0(21), conductor 2100 through cable 21—31 to Fig. 31, contact 2 of relay 0NW(31) to the winding of relay SQA(31) and to battery. Relay SQA(31) operates in this circuit closing a circuit from ground over a contact 5 of relay 0NW(31), the contact of relay SQA(31), conductor 3102 through cable 21—31, contact 2 of relay L0(21), contact 2 of relay LE(21), conductor 2101 to the winding of the first sequence relay SQ0(8) and battery. Relay SK0(8) locks over contact 6 of relay SQ0(8), conductor 800 and contact 1 of relay LE(21) to ground. Relay SQ0(8) in operating closes a circuit from ground over its contact 9, conductor 801, winding of relay L0(21) to battery. Relay L0(21) operates in this circuit and opens at its No. 4 contact the above operating circuit for relay SQA(31) which thereupon releases. Relay SQ0(8) in operating completes a circuit for operating sequence test relay SQT0(21). The circuit extends from ground over contact 5 of relay SQ0(8), over conductor 808, contact 1 of relay SQT1(21), to battery through the windings of relay SQT0(21) operating the latter relay. Relay SQT0(21) completes a circuit, over its contact 3, and conductor 2103 to contact 4 of relay SQ0(8) so that relay SQT0(21) will remain operated after relay SQ0(8) releases.

When relay 0NW(31) operates as above described, it closes a circuit from ground over its contact 3, conductor 3103 through cable 21—31, contact 3 of relay L0(21), contact 1 of relay SE(21), the winding of relay S0(21) and to battery. Relay S0(21) operates in this circuit and connects ground over its contact 6 to conductor 3103 providing a locking circuit for itself independent of relay 0NW(31).

The foregoing operations which are performed as a result of the operation of the marker start relay MS1(16) in the line link marker connector serve to place the marker in condition to handle the dial tone connection. While these operations have been in progress, the marker has also been receiving an indication of the location of the calling line so that it may seize the proper line link frame when it is ready to connect the line with a selected idle originating register. To completely identify the calling line, information is required which will identify the line link frame on which the calling line terminates and the location of the calling line termination on that line link frame.

Each subscriber's line terminates on one across-bar switch vertical unit of a line link frame line switch. Therefore each vertical unit of this line cross-bar switch may be associated with a particular subscriber's line and the identification of the calling line cross-bar switch vertical unit will identify the calling line on that line link frame. For the purposes of line identification, the line cross-bar switch vertical units are grouped as follows:

A. *Vertical groups*

The line link frame line cross-bar switches are mounted on ten horizontal switch levels on the line link frame. Each switch is divided into subscriber line groups of five adjacent vertical units. The ten subscriber line groups located at the same position on each of the ten horizontal levels are designated the vertical groups. One vertical group will contain a total of fifty vertical units and fifty subscriber line terminations. The maximum number of vertical groups on any one line link frame will be foreseen.

B. *Horizontal groups*

The vertical units within the same horizontal switch level are designated in horizontal groups. One horizontal group will consist of a minimum of thirty vertical units to a maximum of seventy vertical units. On any line link frame there will be ten horizontal groups—see vertical files. The ten vertical units located in the same position on each of the ten horizontal switch levels are designated a vertical file. One vertical file will consist of one cross-bar switch vertical unit in each of the ten horizontal switch levels. There will be five vertical files within one vertical line group.

When the line link marker connector, which is individual to the line link frame, operates, it identifies that frame to the marker. Since the marker is arranged to serve a maximum of forty line link frames, the frame number may conveniently be indicated by separately indicating the frame tens digit and the frame units digit. The frame tens digit is indicated by grounding one of four frame tens conductors and the units digit is indicated by grounding in code two of five frame units conductors. Specifically, the conductors which may be grounded by the line link marker connector to indicate the frame tens digit may be identified as conductors 1100, 1101, 1102 and 1103 in Fig. 11 while the units conductors which may be grounded by the line link marker connector may be identified as conductors 1200, 1201, 1202, 1204 and 1207 in Fig. 12. The code according to which the units conductors are grounded is such that for the digits 1 to 9 the sum of the units digit of the conductor numbers is equal to the units digit of the frame number. For example, to indicate frame units digit 5, conductors 1201 and 1204 would be grounded. For a units digit 0, conductors 1204 and 1207 are grounded.

Since it has been assumed that the marker is connected to line link frame 00, the operation of the relay MB1(29) grounds units conductors 2904 and 2907 and tens conductor 2910. These conductors extend through cable 26—29 to the contacts of relay GTL2(25). When relay GTL2(25) operated as previously described, conductors 2900 to 2907 and 2710 to 2713 were connected to conductors 1200 to 1207 and conductors 1100 to 1103 respectively and thence through the windings of relays FU0(12) to FU7(12) and FT0(11) to FT3(11) respectively. Since conductors 2904, 2907 and 2910 are grounded, conductors 1204, 1207 and 1100 are grounded and therefore relays FT0(11), FU4(12) and FU7(12) operate.

When the vertical group relay VGS0(1) on the line link frame operated as the result of the operation of the line relay L00(1), it grounded conductor 103 which extends to the contact 7 of relay MA1(3). Since the marker is equipped to serve frames having a maximum of fourteen vertical groups, relay MA1(3) in operating extends fourteen vertical group identification conductors such as conductor 103 to the marker where they are connected to contacts of relays VGG1(5) and VGG2(18). The operation of these relays as above described further extends the vertical group identifying conductors to the windings of the vertical group test relays VGT0(4) to VGT13(17). Conductor 103 is extended over contact 7 of relay MA1(3), conductor 305, conductor 400, contact 2 of relay VGG1(5), conductor 500 to the winding of relay VGT0(4) to battery. Relay VGT0(4) operates in this circuit to identify the calling line as located in the zero vertical group. If at the same time some other line on line link frame 00 is also calling, the corresponding vertical group test relay would also be operated.

Figure 22:
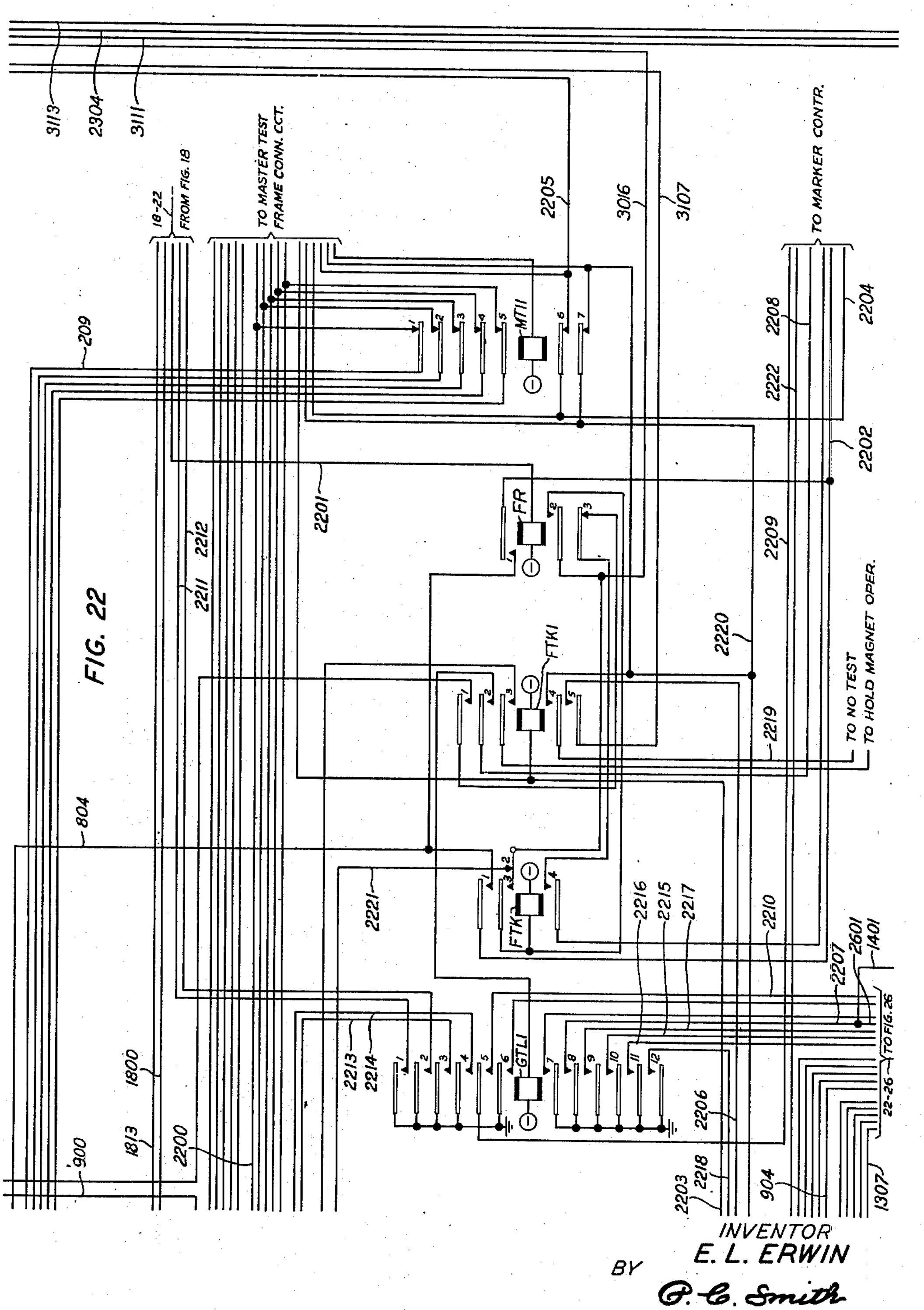

When the marker is ready to receive the line identification, that is, with the vertical group gating relays VGG1(5) and VGG2(18), horizontal group gating relay HGG(19) and vertical file gating relay VFG(9) operated, a circuit for checking their proper operation is closed which may be traced from ground on conductor 306 from the marker, contact 36 of relay MA1(3), conductor 307, conductor 1800 through cable 18—22 to Fig. 22, conductor 1800, contact 1 of relay VFG(9), conductor 900, contact 11 of relay HGG(19), conductor 1902, contact 9 of relay VGG2(18), conductor 1801, contact 9 of relay VGG1(5), conductor 501 to the winding of relay GK(18) and to battery. Relay GK(18) operates in this circuit if the gating relays are operated and locks over its contact 1 and conductor 307 to the operating ground independent of the gating relays.

With relay GK(18) operated, the operation of relay VGT0(4) closes a circuit from battery through the winding of relay VGR(18), contact 3 of relay GK(18), conductor 1802, conductor 1703, contact 3 of relay VGT0(4), conductor 400 to ground over the previously traced operating circuit for relay VGT0(4). A parallel circuit extends for relay VGR(18) over the contacts of any other vertical group test relay which may be operated. Since the circuit of relay VGR(18) is under the control of the line relay L00(1), this relay serves to monitor for disconnection by the subscriber. Relay VGR(18) closes a circuit for locking the operated vertical group test relay or the preferred relay if more than one such relay is operated. One the line link frame all lines requiring special attention are included in vertical group 2 and that group is given preference over all other groups. The preference among the other groups is controlled by the sequence relays of Figs. 8 and 21 where it may be assumed that relay SQ0(8) has been operated as above described. It will also be assumed that no other vertical group test relay has been operated. Therefore the locking circuit of relay VGT0(4) may be traced from ground on conductor 1803 in Fig. 18 from the marker, contact 1 of relay VGR(18), contacts 2 and 7 of relay TR2D(18), conductor 1804, normally closed contact 7 of relay VGT2(4), conductor 401, contact 4 of relay TR2D(18), conductor 1805 through cable 5—8 to Fig. 8, contact 1 of relay SQ0(8), conductor 802 through cable 5—8 to Fig. 5, contact 7 and winding of relay VGT0(4) to battery. If some other VGT relay had been operated a locking circuit for that relay would have extended over the normally closed contact 6 of relay VGT0(4). Therefore with relay VGT0(4) operated, no other VGT–(4) to VGT–(17) relay can be locked.

With relay VGR(18) operated, a circuit is closed from battery through the winding of the vertical group test check relay VTK(18), contact 3 of relay VGR(18), conductor 3014 to ground at contact 1 of relay D(30). Relay VTK(18) operates in this circuit, locking over its contact 2 to grounded conductor 3014. At contact 3 relay VTK(18) closes a supplementary locking circuit for relay VGT0(4) in parallel with contact 1 of relay VGR(18) and at contact 1 opens the operating circuit for relays VGG1(5) and VGG2(18). Relays VGG1(5) and VGG2(18) release, opening the vertical group test circuits and releasing any non-locked VGT–(4) to VGT–(17) relays and preventing the subsequent operation of any other vertical group test relay.

A check is now made that one and only one VGT–(4) to VGT–(17) relay is operated and that relays VGG1(5) and VGG2(18) have released. For this purpose, a circuit is closed from battery through the winding of relay VTK1(18), contact 5 of relay VGG2(18), conductor 1806, contact 5 of relay VGG1(5), conductor 502, contact 5 of relay VGT13(17), contact 6 of relays VGT12(17) to VGT7(17), conductor 1700, contacts 6 of relays VGT6(4) to VGT1(4), contact 5 of relay VGT0(4) to ground.

When relay VTK(18) operates, it closes the locking circuit for relay MS1(16) which may be traced from ground over contact 2 of relay MS1(16), winding of that relay, conductor 313, contact 1 of relay CB1(3), conductors 311 and 308, contact 4 of relay MA1(3), conductor 309, contact 5 of relay VTK(18), conductor 1807, winding of relay 0C1(30) and to battery. Relay 0C1(30) operates in series with relay MS1(16) and closes a circuit from battery through the winding of relay 0C(30), contact of relay 0C1(30) to ground at the contact of relay TM(30). Relay 0C(30) operates in this circuit and locks to the contact of relay TM(30) independent of relay 0C1(30). Relay 0C(30) in operating connects ground to conductors 3018 and 3019 which extend over contacts 3 and 2 of relay MB1(29), conductors 2903 and 2905 to the control circuit which thereupon disconnects the marker start leads 104 and 105 in Fig. 2 from conductors 200 and 201. The relay MS1(16) is held operated however over the above-traced circuit through the winding of relay 0C1(30).

Figure 18:
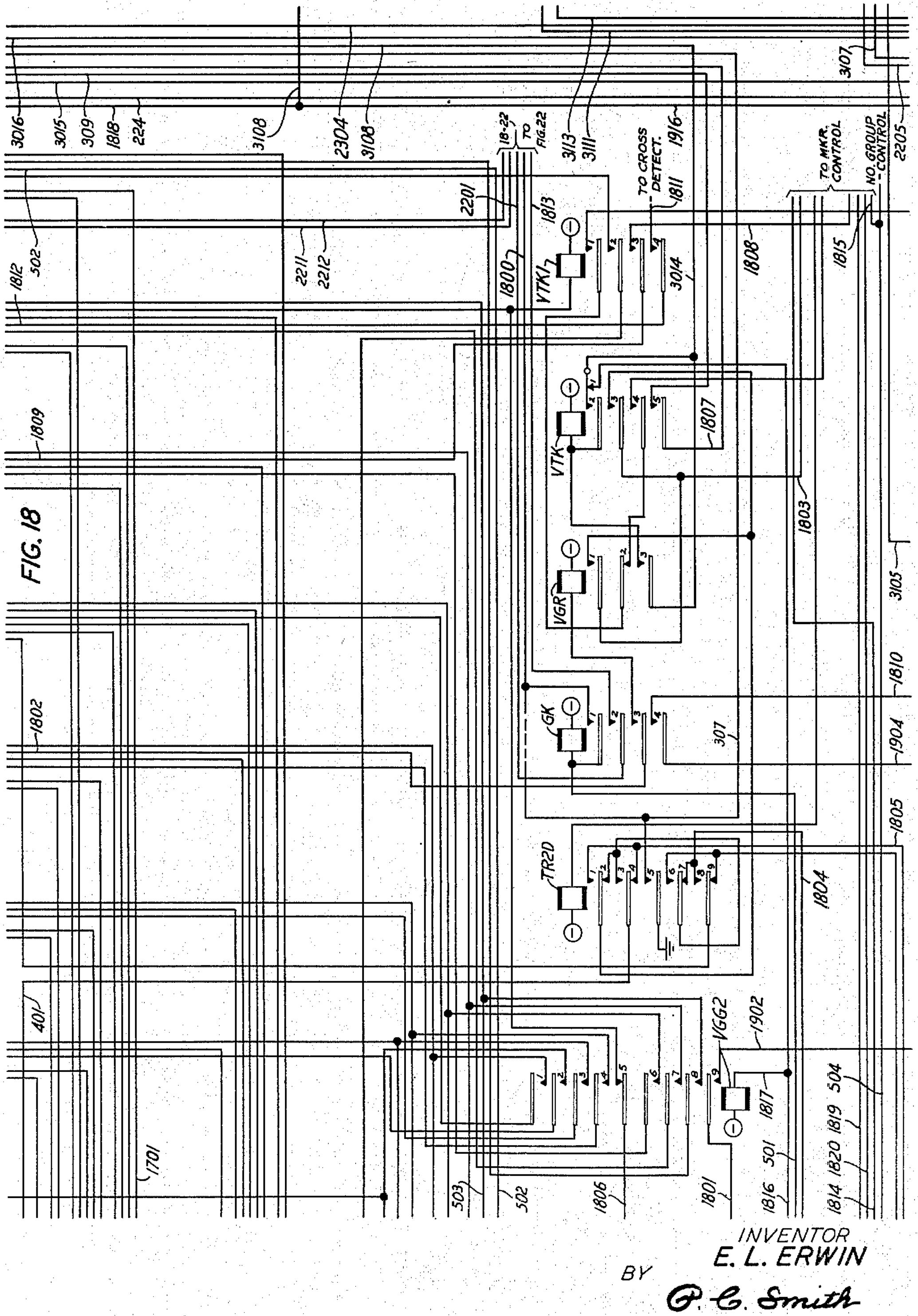
Figure 19:
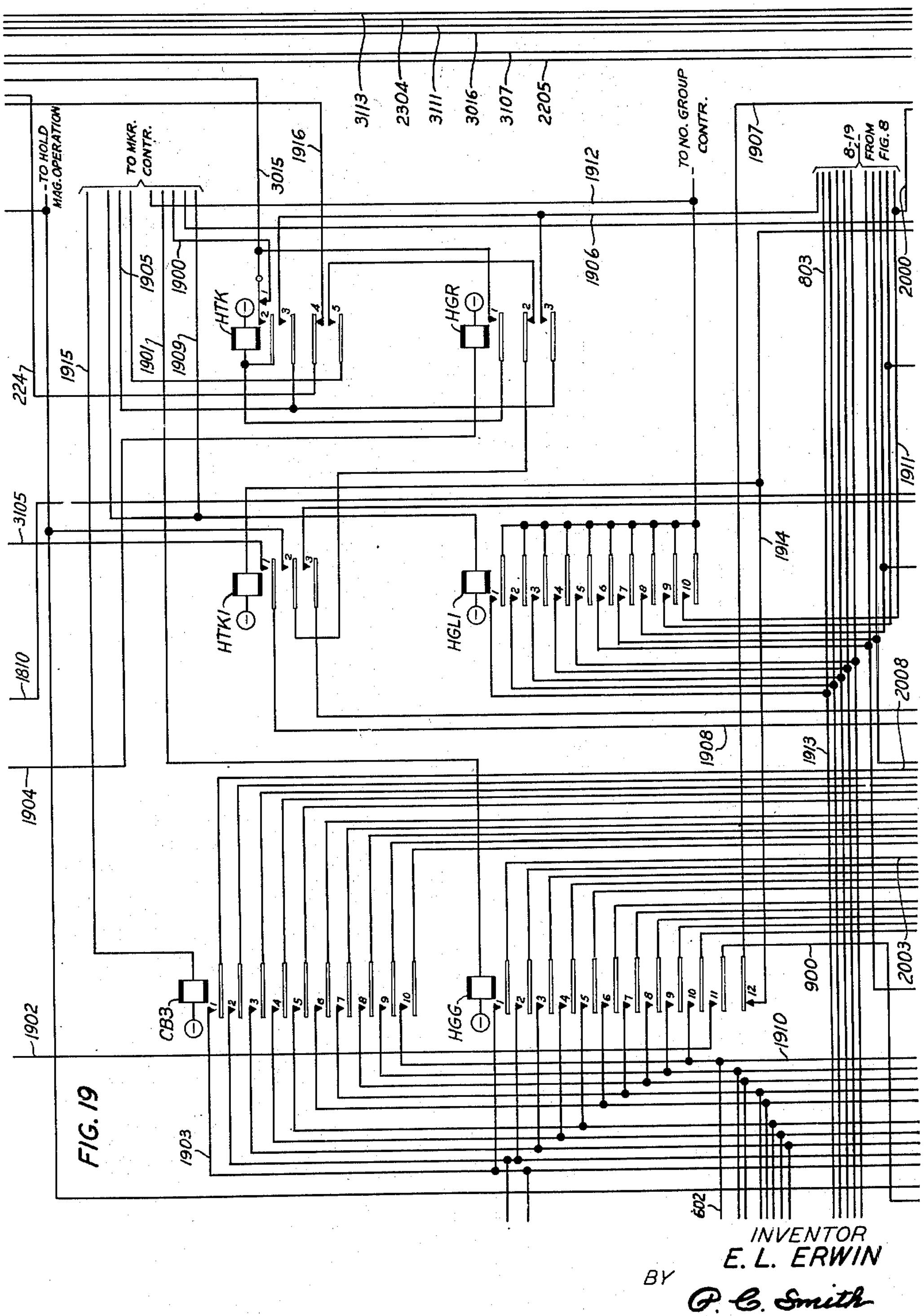
Figure 20:
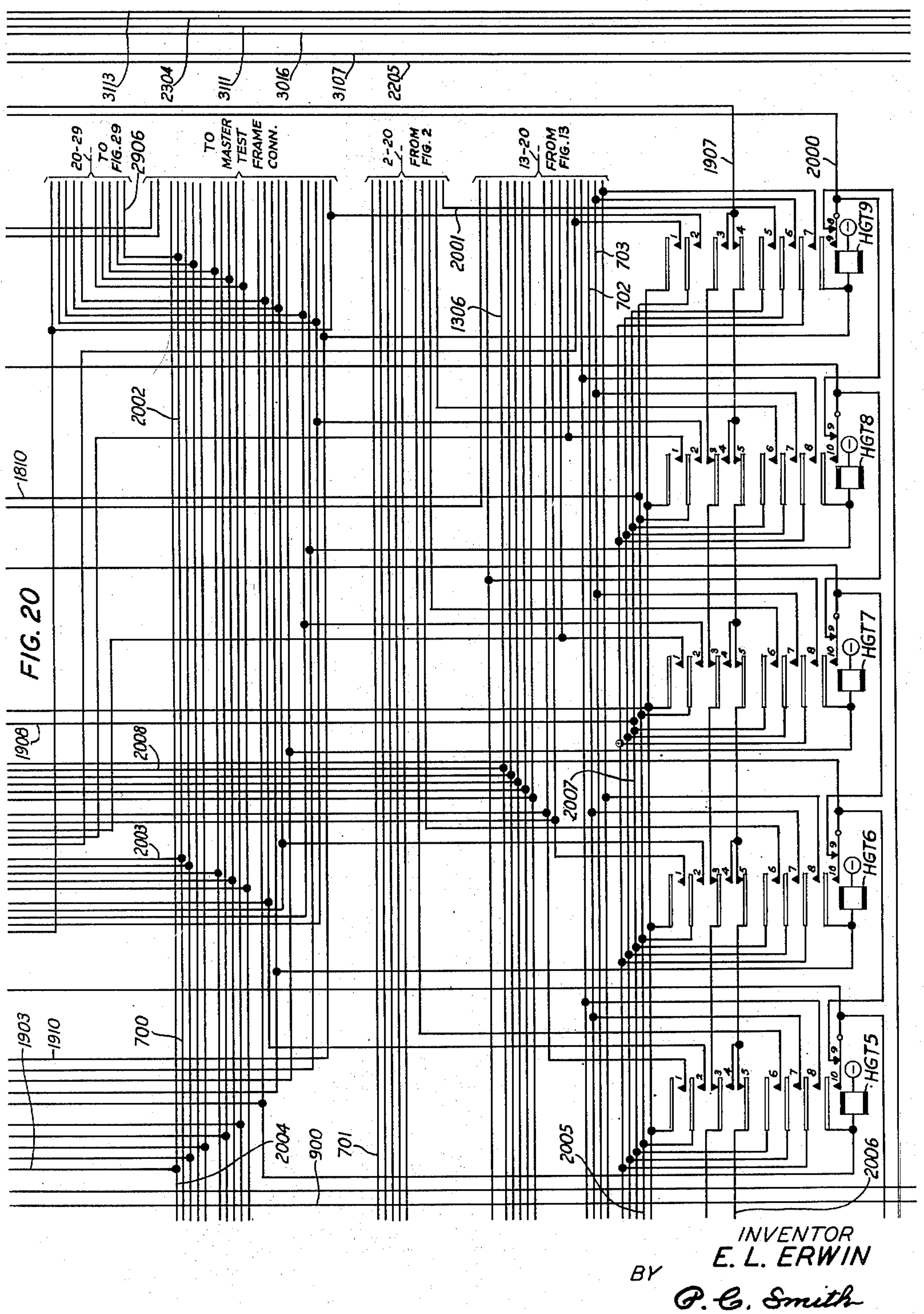

With relay VTK1(18) operated, a circuit is closed from battery at the marker controller on conductor 1808 in Fig. 18, contact 3 of relay VTK1(18), conductor 1809, conductor 1704, contact 2 of relay VGT0(4), conductor 402, contact 22 of relay MA1(3), conductor 315 to the winding of the vertical group auxiliary relay VGA0(1) and ground. Relay VGA0(1) prepares the circuits for identifying a horizontal group in which the calling line is located. The previous circuit closed by relay VTK1(18) over its contact 3 extends in multiple to contact 2 on each of the vertical group test relays VGT0(4) to VGT6(4) and VGT7(17) to VTG13(17) so that the vertical group auxiliary relay VGA– on the line link frame corresponding to the operated vertical group test relay VGT– in the marker will be operated in response to the operation of relay VTK1(18).

With relay VGA0(1) operated, conductor 102 grounded by line relay L00(1) is extended together with nine other similar conductors individual to the vertical group 0 in the nine other horizontal levels to contacts of relay MB1(29) and thence over contacts of horizontal group gating relay HGG(19) to the winding of the ten horizontal group test relays HGT0(7) to HGT4(7) and HGT5(20) to HGT9(20). Ground connected to conductor 102 completes the circuit over contact 10 of relay VGA0(1), conductor 107 through cable 1—29 to Fig. 29, contact 22 of relay MB1(29), conductors 2906 through cable 20—29 to Fig. 20, over conductors 2002 and 2003, contact 1 of relay HGG(19), conductor 1903, conductor 2004 to the winding of relay HGT0(7) and battery. Relay HGT0(7) operates in this circuit. If some other line in the vertical group 0 but in a different horizontal group is also waiting for a dial tone connection, the corresponding horizontal group test relay HGT– will also be operated.

With relay GK(18) operated, as previously described, the operation of relay HGT0(7) closes a circuit indicating that at least one horizontal group test relay has been operated, which circuit may be traced from battery through the winding of relay HGR(19), conductor 1904, contact 4 of relay GK(18), conductor 1810, conductor 2005, contact 2 of relay HGT0(7) to conductors 700, 2002 and 2906 and thence to ground at contact of the line relay L00(1) as previously traced. Relay HGR(19) operates and monitors for a subscriber disconnect within the selected horizontal group of the selected vertical group.

If two or more horizontal group test relays have operated, one of these relays and the associated horizontal groups will be preferred by means of a preference circuit controlled by the sequence relays of Figs. 8 and 21. With relay SQ0(8) operated as previously assumed, the operation of relay HGR(19) closes the circuit from ground on conductor 1905 from the marker in Fig. 19, contact 3 of relay HGR(19), conductor 1906 through cable 8—19 to Fig. 8, conductor 807, contact 2 of relay SQ0(8), conductor 803 through cable 8—19 to Fig. 19, conductor 803, conductor 1913, contact 8 and winding of relay HGT0(7) to battery. Relay HGT0(7) is locked in this circuit, opening at its contact 9 the locking circuits for any other horizontal group test relays which may have been operated.

With relay HGR(19) operated, horizontal test check relay HTK(19) operates in a circuit from battery through its winding, contact 1 of relay HGR(19) to ground on conductor 3015. Relay HTK(19) operates in this circuit and locks over its contact 2 to ground on conductor 3015. At contact 1 relay HTK(19) opens the operating circuit for relay HGG(19) causing the latter relay to release and disconnect the horizontal group test relays HGT0(7) to HGT4(7) and HGT5(20) to HGT9(20) from the line link frame, to release any non-locked horizontal group test relays which have been operated, and to prevent the subsequent operation of any other horizontal group test relays which might interfere with the horizontal group to be served by this marker. At its contact 3, relay HTK(19) closes a supplementary locking circuit for relay HGT0(7) in parallel with contact 3 of relay HGR(19). With relay HGG(19) released, relay HGT0(7) locked, and the remaining horizontal group test relays released, a circuit is closed to check the completion of these operations which may be traced from battery through the winding of relay HTK1(19), conductor 1914, contact 12 of relay HGG(19), conductor 1907, contact 4 of relay HGT9(20), contacts 5 of relays HGT8(20) to HGT5(20), conductor 2006, contacts 5 of relays HGT4(7) to HGT1(7), contact 4 of relay HGT0(7) to ground. Relay HTK1(19) operates in this circuit.

Further identification takes place after the marker has seized the link frame through the line link frame connector, which seizure is delayed until the marker has selected and seized a trunk link frame having thereon one or more idle originating registers. The purpose of this delay is to prevent two markers from competing against each other simultaneously for the same line link frame and the same trunk link frame to thereby block the operation of either marker.

In the selection of an idle originating register for connection with the calling line, the marker performs five chief functions namely: identifies the type of originating register required, tests for and selects an idle trunk link frame connecting with one or more idle originating registers of the required type, connects with the selected trunk link frame, tests for and selects an idle originating register of the required type and connects the calling line with the selected register.

The type of originating register required in the present case is indicated as a dial pulse register by the operation of relay D(30). As above described this relay is operated directly from the marker start relay MS1(16) in the line link marker connector if all of the lines on the frame use the same type of dial pulse generator.

After the marker has determined the type of originating register required, it will connect with two leads extending to each trunk link frame. One lead from each frame is designated the trunk link frame busy test lead and will be grounded at the trunk link frame whenever this frame is not accessible to a marker. The other lead designated the trunk frame test lead is grounded by the presence of one or more idle originating registers of the desired type associated with that frame. The marker tests all of these leads simultaneously and by its preference arangement selects a frame from among those accessible to the marker and having idle registers of the required type.

When the marker preference relay in the selected trunk link frame is operated it renders the marker preference relays associated with other markers ineffective and closes a circuit to inform the marker that it has been operated. This circuit may be traced from ground on conductor 3104 of Fig. 31, contact 1 of relay TER1(31) and the winding of relay TFK2(31) to battery. The operation of relay TFK2(31) indicates to the marker that the marker preference relay in the selected trunk link frame has been operated.

When the marker is connected to the selected trunk link frame by the trunk link connector, a group of twenty busy test leads is extended from the marker circuit to the selected trunk link frame. The trunk link connector will be controlled by the marker to further extend one of these busy test leads to each originating register of the required type associated with a selected frame. The marker then tests for an idle originating register of the desired type and selects the register to serve the calling line. Before the marker can test for an idle register it must determine the location of all of the originating registers of the required type.

In each trunk link frame there are 160 terminations to which originating registers or trunks may be connected. The trunks and registers associated with any trunk link frame are divided into twenty block groups containing a maximum of twenty registers or trunk circuits. There will be a maximum of only six such twenty block groups on a frame since certain trunks such as incoming trunks are not selectable from the marker. Within any one trunk link frame all dial pulsing originating registers will be placed within one twenty block group although the same twenty block group may also contain multifrequency originating registers or trunks. The twenty block group and the location of the register of the desired type within the group are determined by the route relay (not shown) which is controlled in part from the relay D(30).

The route relay (not shown) identifies the twenty block group by operating one of the groups of twenty block relays (not shown) and identifies the location of the registers within the twenty block group by operating one of a group of test group relays (not shown).

The marker establishes the necessary connections with the selected trunk link frame by which it may determine the channel to be used in connecting that frame with the line link frame on which the calling line is located as described in the A. J. Busch application above referred to.

In the meantime, the marker has been setting up similar connections through the line link frame connector with the line link frame on which the calling line is located. As soon as relay TFK2(31) operates to indicate that the marker has seized and has been connected with the trunk link frame, a circuit is closed from battery through the resistance lamp LFS(31), contact of relay SP(31), contact 1 of relay LLC1(31), contact of relay TFK2(31), conductor 3112, contact 3 of relay MA1(3), conductor 317 to the winding of the marker preference relay MP1(15). Assuming that no other marker is attempting to seize line link frame 00 at this time, relay MP2(15) for marker 2 and relay MP3(15) for marker 3 will both be released and the circuit of relay MP1(15) will extend over contact 3 of the other marker preference relays such as relays MP2(15) and MP3(15) to ground.

Relay MP1(15) operates in this circuit, locking to ground over its contact 4, and at contact 2 connects ground to conductor 1500 completing a circuit for relay MCA'1(2). Relay MCA'1(2) closes circuits from ground through the windings of relays MCB1(2) and MCA1(2), over contacts 29 and 30 of relay MCA'1(2), conductors 202 and 203, contacts 4 and 3 of relay LLC1(31) to battery through resistance lamps LBS0(31) and LBS1(31). The operation of relays MCA'1(2), MCA1(2) and MCB1(2) extend a large number of circuits from the line link frame circuit to the marker circuit which are required for vertical file identification, class of service identification and other necessary functions. As soon as relay MCA'1(2) operates, it closes a circuit from ground over its contact 16, conductor 204 through the winding of relay LFK(31) to battery. Relay LFK(31) operates but has no special function in connection with a dial tone call.

When relay HTK1(19) operated, as above described, following the operation and locking of relay HGT0(7) to select horizontal group 0 for service, it connects battery through resistance lamp HGB(31), contact 5 of relay LLC1(31), conductor 3105, contact 1 of relay HTK1(19), conductor 1908, conductor 2007, contact 5 of relay HGT0(7) to conductor 701. The operation of relay MCA'1(2) extends battery on conductor 701 through cable 2—20 to Fig. 2, contact 28 of relay MCA'1(2), conductor 205 through the winding of the corresponding one of the ten horizontal group relays, namely group relay HG0(1) and ground. Relay HG0(1) operates in this circuit to prepare circuits for testing the line link, for operating the select magnets, and for operating the line group relays. As an indication to the marker that the horizontal group relay HG0(1) has been operated, relay HG0(1) closes a circuit from ground over its contact 11, conductor 108, contact 18 of relay MCA'1(2), conductor 206 which operates a horizontal group check relay HGK (not shown), in the marker.

Figure 2:
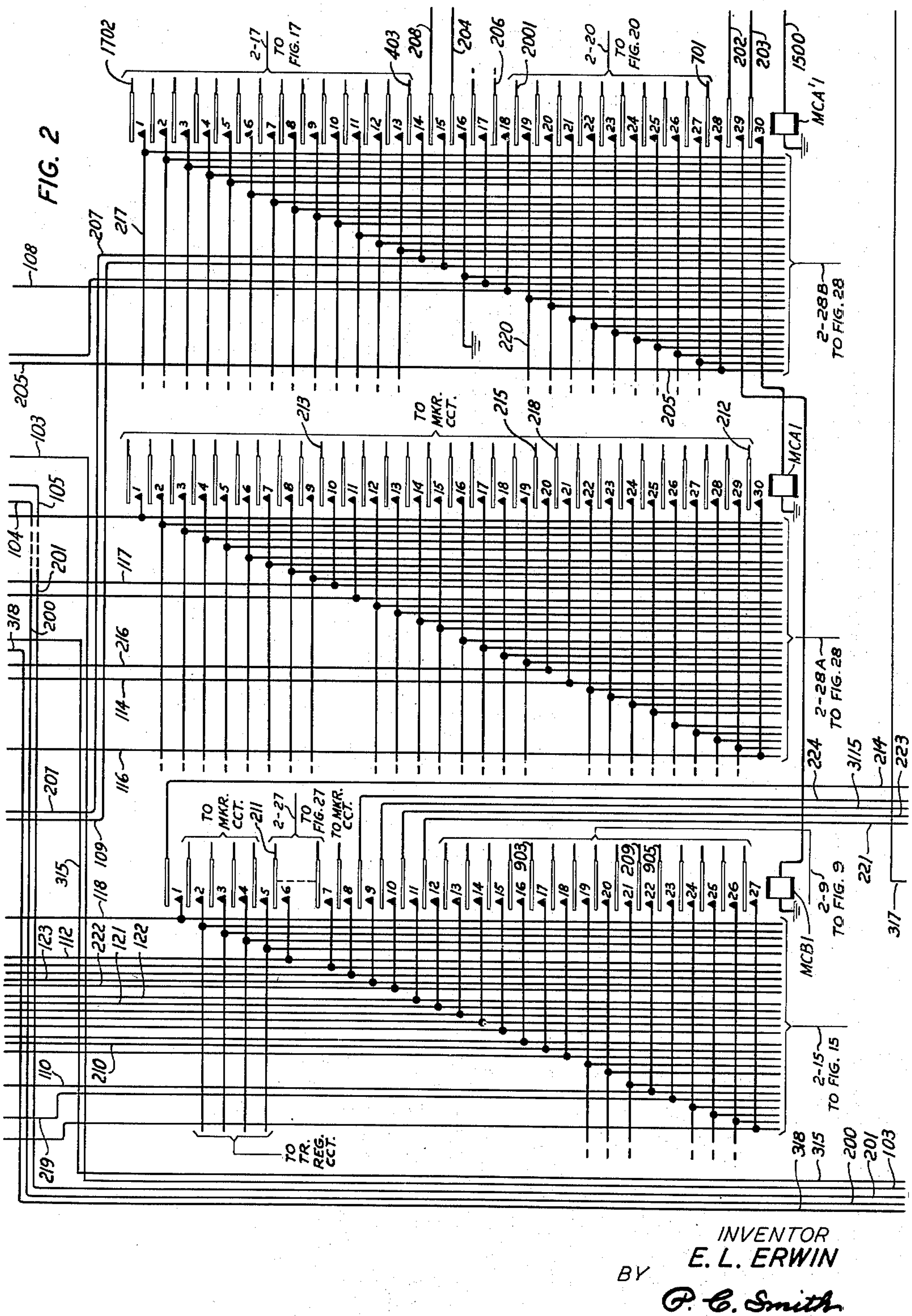
Figs. 2, 15 and 28 show parts of line-link frame, or primary connector circuits for three markers, two of which are shown in block form in Fig. 28.

When relay VTK1(18) operated, as above described, following the operation and locking of relay VGT0(4) to select vertical group 0 for service, it connected battery from the marker to conductor 1811 in Fig. 18, contact 4 of relay VTK1(18), conductor 1812, conductor 1705, contact 8 of relay VGT0(4), conductor 403 through cable 2—17 to Fig. 2, contact 14 of relay MCA'1(2), conductor 207, winding of the corresponding one of fourteen vertical group relays namely, relay VGB0(1) to ground. Relay VGB0(1) operates in this circuit and prepares a circuit for transmitting to the marker an indication of the class of service to which the calling line belongs, which will be described hereinafter.

The operation of one vertical group relay and one horizontal group relay in the line link frame conductor will identify the line group in which the calling line is located. With relay VGB0(1) and relay HG0(1) operated, a circuit is closed for the line group relay individual to the line group of the calling line. This circuit may be traced from ground through the winding of line group relay LG0(1), contact 2 of relay HG0(1), contact 1 of relay VGB0(1), conductor 109, contact 15 of relay MCA'1(2), conductor 208, contact 2 of relay LLC1(31) to battery through resistance 3106. Relay LG0(1) operates in this circuit extending the five vertical file identification leads of the five lines belonging to the associated line group to the marker. Relay L00(1) when operated, grounded the individual conductor 101 which is extended by the operation of relay LG0(1) over contact 3 of relay LG0(1), conductor 110, contact 22 of relay MCB1(2), conductor 209 through cable 2—9 to Fig. 9, contact 1 of relay MT11(22), conductor 2200, contact 3 of relay VFG(9), conductor 901 through the winding of vertical file test relay VFT0(9) and to battery. Relay VFT0(9) operates in this circuit. If any other line in this group of five lines were also awaiting a dial tone connection at this time, the corresponding vertical file test relay would be operated.

As soon as relay VFT0(9) operates, a circuit is closed from battery through the winding of relay FR(22), conductor 2201 through cable 18—22 to Fig. 18, contact 2 of relay GK(18), conductor 1813 through cable 18—22 to Fig. 22, contact 4 of relay VFT0(9) to conductor 2200 and ground at the contact of the line relay L00(1) as previously traced. Relay FR(22) operates in this circuit and monitors on a subscriber disconnect within the selected vertical file, vertical group, and horizontal group.

With relay FR(22) operated, one of the vertical files is preferred for service under the control of the sequence relays of Figs. 8 and 21. With relay SQ0(8) operated, as previously assumed, relay VFT0(9) locks over its contact 6, conductor 902, conductor 807, contact 10 of relay SQ0(8), conductor 804, contact 1 of relay FR(22), conductor 2202 to ground in the marker. Relay VFT0(9) at its contact 5 opens the locking circuits for the other vertical file test relays so that even though another one of these relays may have been operated, it cannot be locked.

Relay FR(22) also closes a circuit from battery through the winding of relay FTK(22), contact 2 of relay FR(22), conductor 3016 to ground at contact 3 of relay D(30). Relay FTK(22) locks over its contact 3 to ground on conductor 3016 independent of relay FR(22) and closes at its contact 1 an alternate connection between conductors 804 and 2202 in parallel with contact 1 of relay FR(22).

Relay FTK(22) at its contact 2 opens the operating circuit for relay VFG(9) causing that relay to release and open the vertical file test circuit, releasing all of the non-locked vertical file test relays and leaving relay VFT0(9) operated alone. As soon as relay VFG(9) and the vertical file test relays have released, a circuit is closed for relay FTK1(22) extending from battery through the winding of that relay, conductor 2203, contact 7 of relay VFG(9), contact 3 of relay VFT4(9), contacts 4 of relays VFT3(9), VFT2(9) and VFT1(9) to ground over contact 3 of relay VFT0(9).

In order to properly charge the calling subscriber for the call, it is necessary to determine the class of service to which the calling line belongs. It is possible to have as many as thirty different classes of service in any one office and on any one line link frame. Calling subscriber lines with different classes of service may be grouped on the line link frame in any manner subject to one limitation, namely that all subscriber lines terminating in the same vertical file on the same line link frame must be of the same class of service. The marker is normally equipped with thirty class of service identification relays but for convenience only ten such relays have been shown in Fig. 27. These relays are used to determine the class of service by being connected to class of service cross-connections shown in part in Fig. 1 on the line link frame and in turn to operate relays in the marker to indicate the type of line.

When relay VGB0(1) was operated as above described, it prepared the five class of service identification circuits for the five vertical files included in the corresponding vertical group. When relay FTK1(22) operated as above described, the circuit associated with the vertical file which has been selected to be served was closed from ground on conductor 2204 in Fig. 22 from the marker, contact 6 of relay MT11(22), conductor 2205, contact 6 of relay LLC1(31), conductor 33107, contact 5 of relay FTK1(22), conductor 2206, contact 8 of relay VFT0(9), conductor 903 through cable 2—9 to Fig. 2, contact 17 of relay MCB1(2), conductor 210, contact 2 of relay VGB0(1), cross-connection 111, conductor 112, contact 6 of relay MCB1(2), conductor 211 through cable 2—27 to Fig. 27, winding of class relay CS9(27), conductor 2700 to battery in the marker circuit. Relay CS9(27) in operating closes a circuit for relay A0(14) extending from battery through the winding of relay A0(14), conductor 1400, contact 4 of relay CS9(27), conductor 2701, contact 2 of relay GTL4(26), conductor 2601 through cable 22—26, conductor 2207 to contact 8 of relay GTL1(22). Relay A0(14) will operate in this circuit, as soon as relay GTL1(2) operates, to indicate that the line is of no special type, that is, that it is neither coin, party nor manual and will lock over its contact 3 and conductors 1401 and 2207 to ground over contact 8 of relay GTL1(22) independent of relay CS9(27).

The marker is now ready to transfer the calling line identification including its class of service to the originating register for storage.

As set forth above, relay FTK1(22) was operated following the identification of the vertical file of the calling line which completed the identification of the calling line to be served. When the marker has been connected with the originating register, a circuit is closed from battery through the winding of relay GTL1(22), contact 2 of relay FTK1(22), conductor 2208 to ground in the marker circuit. The operation of relay GTL1(22) permits relay A0(14) to operate as above described. With relay GTL1(22) operated, a circuit is closed from ground on conductor 2209 in Fig. 22 under control of relay OC1(30), a contact 5 of relay GTL1(22), conductor 2210 through cable 22—26 to the winding of relay GTU(25) and battery. Relay GTL1(22) provides the ground for transmitting the line identification to the originating register and relay GTU(25) closes circuits for transmitting the frame identification to the originating register.

It will be remember that the calling line is located on line link frame 00 in horizontal group 0, vertical group 0 and vertical file 0 and belongs to class 9. In consequence, frame tens relay FT0(11), frame units relay FU4(12) and FU7(12), horizontal group test relay HGT0(7), vertical group test relay VGT0(4), vertical file test relay VFT0(9) and class relay CS9(27) were operated.

When relay GTU(25) operates, it connects the conductors, which were grounded by the line link marker connector for identifying the line link frame to the marker, to the trunk link connector. It will be remembered that conductors 2904, 2907 and 2910 were grounded by the operation of relay MB1(29)). With relays GTL2(25) and GTU(25) operated, these conductors are extended over contacts 4, 5 and 6 of relay GTL2(25), contacts 9, 10 and 2 of relay GTU(25), conductors 2522, 2523 and 2521 and conductors 2504, 2507 and 2510 to the originating register through the trunk link frame connector. Conductors 2510, 2504 and 2507 extend to the windings of the frame units relays and the frame tens register relays in the originating register. These register relays, corresponding to relays FT0(11), FU4(12) and FU7(12) in the marker, operate in these circuits and lock to ground supplied by the originating register. The locking ground for these relay holds operated the relays FT0(11), FU4(12) and FU7(12) in the marker over conductors 2510, 2504 and 2507.

When relay GTL1(22) operates it closes two out of a possible six circuits under the control of the vertical group test relay VGT0(4), one of which extends from ground at contact 1 of relay GTL1(22), conductor 2211 through cable 18—22, over contact 9 of relay VGT0(4) to conductor 404, and the other of which extends from ground at contact 2 of relay GTL1(22), conductor 2212 through cable 18—22, contact 10 of relay VGT0(4) to conductor 405. Conductors 404 and 405 are further extended through cable 5—12, over contacts 10 and 9 of relay GTL3(26) to conductors 2602 and 2603 to the windings of relays VG7(12) and VG4(12) and battery and an parallel therewith over conductors 2524 and 2525 and over contacts of the trunk link frame connector (not shown) to the originating register where they operate register relays corresponding to VG4(12) and VG7(12) of the marker. Relays VG7(12) and VG4(12) in the marker operate as well as the corresponding relays in the originating register. The latter relays close locking circuits for themselves which also serve to hold relay VG7(12) and relay VG4(12) in the marker operated.

Relay GTL1(22) at contacts 3 and 4 closes two out of a possible five circuits under the control of the horizontal group test relay HGT0(7), one of which extends from ground at contact 3 of relay GTL1(22), conductor 2213, contact 7 of relay HGT0(7) to conductor 702 and the other of which extends from ground at contact 4 of relay GTL1(22), conductor 2214, contact 6 of relay HGT0(7) to conductor 703. Conductors 702 and 703 are further extended through cable 13—26 over contacts 4 and 5 of relay GTL3(26) and conductors 2604 and 2605 to the windings of relays HG4(13) and HG7(13) and battery and in parallel therewith over conductors 2606 and 2607 and conductors 2526 and 2527 to the originating register over the trunk line frame connector where they are further extended to the windings of register relays corresponding to HG4(13) and HG7(13). Relays HG4(13) and HG7(13) in the marker operates as well as the corresponding relays in the originating register. The latter relays lock to off-normal ground in the originating register, which ground also serves to lock relays HG4(13) and HG7(13).

At its contacts 9, 10 and 11, relay GTL1(22) closes three circuits in cooperation with the class relay CS9(27). The first of these circuits extends from ground over contact 10 of relay GTL1(22), conductor 2215 through cable 22—26, contact 4 of relay GTL4(26), conductor 2608, contact 2 of relay CS9(27) to conductor 2702. The second of these circuits extends from ground over contact 11 of relay GTL1(22), conductor 2216 through cable 22—16, contact 5 of relay GTL4(26), conductor 2609, contact 1 of relay CS9(27) to conductor 2703. The third of these circuits extends from ground over contact 9 of relay GTL1(22), conductor 2217 through cable 22—26, contact 3 of relay GTL4(26), conductor 2610, contact 3 of relay CS9(27) to conductor 2704. Conductors 2704, 2702 and 2703 extend to the windings of relays CT0(14), CU7(14) and CU2(14) and battery and is parallel therewith over conductors 2705, 2706, 2707 to the originating register over the trunk link frame connector circuit where they extend to the windings of register relays corresponding to CT0(14), CU7(14) and CU2(14) in the marker. Relays CT0(14), CU7(14) and CU2(14) in the marker operated in the above-traced circuit. The corresponding relays in the originating register also operate in these circuits and lock to off-normal ground in the originating register, their locking ground serving to hold the corresponding relays in the marker operated.

It will be observed that the class identification is translated into a combination of a class tens indication and a class units indication. While in the present disclosure only ten class relays have been shown, so that the class tens relay has little significance in the case, where a complete set of thirty class indications is used, the class tens indication is necessary.

At its contact 12 relay GTL1(22) closes one out of a possible five circuits in cooperation with a vertical file test relay VFT0(9) which may be traced from ground over contact 12 of relay GTL1(22), conductor 2218, contact 7 of relay VFT0(9), conductor 904 through cable 22—26, contact 6 of relay GTL4(26), conductor 2611 to the winding of relay VF0(13) and to battery and in parallel therewith over conductors 2612 and 2528 to the originating register over the trunk link frame connector circuit where it extends to the winding of a register relay corresponding to VF0(13). Relay VF0(13) and the corresponding relay in the originating register operate, the latter locking to off-normal ground in the originating register. The locking ground for the latter relay serves to hold relay VF0(13) operated.

Having obtained access to the selected originating register through the trunk link frame connector circuit and to the calling line through the line link frame connector circuit, the marker now proceeds to select an idle connecting path or channel by which the calling line may be connected to the selected register. In a selection of such a path the marker must perform the following functions, namely: select the ten line links by which the calling line may be extended; select the ten trunk links which have access to the select register, select the subgroup of junctors by which the selected line links and the selected trunk links may be connected, test for and select an idle channel comprising an idle line link, an idle junctor, and an idle trunk link and transmit to the originating register the identity of the channel selected.

As above indicated, the number of line links to which the calling line has access and the number of trunk links having access to the selected register or trunk is fixed by the nature of the cross bar switch. Similarly the total number of junctors outgoing from any one line link frame and the number of junctors incoming to any one trunk link frame is fixed by the arrangement of the switches on the frame. However, the number of junctors connecting a particular line link frame to a particular trunk link frame will vary in accordance with the size of the office as determined by the number of such frames furnished. As pointed out previously, there are always twice as many line link frames as there are trunk link frames and the size of the office with which control equipment will function may vary from four line link frames and two trunk link frames to forty line link frames and twenty trunk link frames. Since there are one hundred junctors outgoing from each line link frame and two hundred junctors incoming to each trunk link frame, the number of junctors in the group connecting a particular line link frame with a particular trunk link frame will vary from fifty in the smaller size office to ten in the office having ten trunk link frames. Where the number of trunk link frames exceeds ten, extension switches are connected in parallel with the junctor switches on the line link frames and on the trunk link frames so that in no case will there be less than ten junctors connecting a particular line link frame with a particular trunk link frame. If there are more than ten junctors in a junctor group they are subdivided into subgroups of ten junctors or less.

Within a junctor subgroup containing ten junctors, there will be one junctor connecting a horizontal termination on each line link frame junctor switch to a horizontal termination of the like numbered junctor of the trunk link frame. The junctors constituting a subgroup will be connected either to the right section or to the left section of the trunk link junctor switches. Junctors of a subgroup are all connected to the same horizontal level in the ten trunk link frame junctor switches.

To determine if a particular connecting path or channel through which it is possible to connect a calling subscriber line to an originating register is idle and available for use, it is necessary to test the particular line link junctor and trunk link associated with this channel for an idle condition. If any of these elements is busy the entire channel is unavailable.

The marker is equipped to simultaneously test ten separate channels between a particular subscriber's line and an originating register. To do this the marker will test the line link, the junctor and the trunk link associated with each of the ten channels. However, before it is possible to test for an idle channel, the marker must determine which ten channels in the office should be selected for testing and must then determine the elements associated with these ten channels. After the line link, junctor and the trunk links associated with each channel have been determined, the marker may proceed to test for an idle channel.

The elements of the channel are so assigned that the numerical designation of the channnel is the same as the designation of the line link which is the same as the designation of the level in the line switch to which the line link is connected and also the same as the numerical designation of the line link junctor switch to which the line link extends.

The group of line links associated with the ten channels to be tested is determined by the location of the calling subscriber line, being the line links which terminate in the same horizontal group on the same frame as the calling line. When relay HG0(1) was operated following the operation of the line link frame connector relays MCA'1(2), MCA1(2) and MCB1(2), a pair of test circuits for the line links were closed. The primary test circuits for the line link 0 may be traced from the sleeve conductor of that link namely, conductor 113, over contact 10 of relay HG0(1), contact of jack JS9(1), conductor 114, contact 21 of relay MCA1(2), conductor 218 and thence through the winding of a line link test relay (not shown) in the marker to battery. The primary test circuit for line link 9 may be traced from the sleeve conductor of that link, namely conductor 115, over contact 9 of relay HG9(1), contact of jack JS9(1), conductor 116, contact 39 of relay MCA1(2), conductor 212 and thence through the winding of a line link test relay (not shown) in the marker to battery. Similarly test circuits are closed for the other eight line links. When a line link is busy its sleeve conductor will be marked with ground and the corresponding line link test relays will be operated. Assuming that line link 0 still is idle, the corresponding test relay (not shown) in the marker will not be operated.

The secondary test circuit for line link 0 may be traced from the sleeve conductor 113, over contact 7 of relay HG0(1), conductor 117, contact 10 of relay MCA1(2), conductor 213 through the winding of a link busy relay (not shown) in the marker and battery. Similarly secondary test circuit will close from the sleeve conductors of the other line links to the windings of other link busy relays (not shown). The functions of the link busy relays will be described hereinafter.

As previously mentioned, the number of junctors in the junctor group will vary from a maximum of fifty junctors to a minimum of ten junctors. Since the marker is supposed to simultaneously test a maximum of ten channels and therefore to test the maximum of ten junctors, each junctor group is subdivided into junctor subgroups consisting of ten or less junctors. Therefore, the marker will select those junctors within one junctor subgroup when testing for an idle channel. The selection of the subgroup of ten or less junctors will, in general, be determined by the following factors: the office size of the installation, the numerical designation of the line link frame involved, the numerical designation of the trunk link frame involved, the junctor sequence relay operated during this connection, and the junctors in the junctor sets of relays operated.

When the trunk link frame is connected to the marker circuit, the selection of the subgroup of junctors and the identification of the office size will be initiated and determined.

After the identification of the office size has been completed, the marker will proceed to identify both the junctor subgroups selected for service and the selected junctor subgroup junctor distribution pattern. For this purpose when relay FT0(11) operated as previously described, a circuit was closed from ground in the marker over conductor 1390 in Fig. 13, conductor 1391, contact 3 of relay FT0(11), contact 4 of relay CBD1(11), conductor 1105 to operate an auxiliary relay (not shown) for indicating the tens digit of the line link frame number. Similarly when relays FU4(12) and FU7(12) operated, they closed a circuit from ground in the marker over conductor 1302 in Fig. 13, conductor 1303, contact 1 of relay FU4(12), contact 4 of FU7(12), conductor 1203, contact 11 of relay CBD(11), conductors 1106 and 1107, winding of relay FUT0(24), conductor 2400 to battery through the winding of a cross-detection relay (not shown) in the marker, thus operating relay FUT0(24). Relays FUT0(24) to FUT9(24) are auxiliary relays for indicating the units digit of the line link frame number.

The number of junctors within a junctor subgroup will vary, as previously mentioned, from a maximum of ten junctors to a minimum of one junctor depending upon the office size of a selected junctor subgroup. The marker circuit is equipped to simultaneously test ten separate channels. Therefore, the marker must determine those channels which are incomplete because of non-existing associated junctors within the selected junctor subgroups and consider these incomplete channels unavailable. A total of twenty-two patterns are used, one of which is the normal pattern in which there are ten junctors for the ten channels. The operation in one of the frames of one of its frame units relays FUT0(24) to FUT9(24) in combination with one of the frame tens relays (not shown), operated over conductor 1105 of Fig. 11, identifies the junctor subgroup pattern number to the marker. In the present disclosure it has been assumed that there are twenty line link frames and ten trunk link frames, therefore, no junctor patterns are required. There are just ten junctors available for the ten channels to be tested.

After the office size and the junctor subgroup have been identified, the marker circuit will operate a relay (not shown), in the trunk link connection, to extend the junctor test leads from the selected trunk link frame to the marker. For this purpose the marker determines whether the selected junctors terminate on the left section or the right section of the trunk link frame junctor switch and determines the horizontal level on each trunk link junctor switch on which the selected junctor terminates.

The marker is now ready to operate the junctor connector relay (not shown) for the purpose of connecting the junctor test conductor as well as the operating circuits with a junctor select magnet to the marker.

The test circuit for junctor 000 which connects trunk link frame 00 with line link frame 00 extends from the sleeve conductor of that junctor through the winding of a junctor test relay (not shown) in the marker to battery. Similarly, test circuits are closed when the sleeve conductors of the nine other junctors are included in the subgroup. When a junctor is in use in connection with a call, ground is connected to the sleeve conductor of the junctor from the associated trunk or register and a corresponding junctor test relay operates. Assuming that junctor 000 is idle, its test relay will not be operated.

The group of ten trunk links associated with the ten channels to be tested terminate on the trunk link frame trunk switch associated with the selected originating register and on either the left section or the right section of these trunk switches. If the junctors associated with the selected junctor subgroups terminate on the left section of the trunk link junctor switch, the ten trunk links associated with the selected ten channels will terminate on the left section of the trunk switch. Test circuits for the trunk links are extended to the marker to be tested and if any of the trunk links in the group are busy, ground will be connected to the associated sleeve conductor and the corresponding one of the trunk link test relays (not shown) in the marker will be operated. Assuming that trunk link 00 is idle its test relay will not be operated.

Test circuits will have been closed by now for the line links, the junctors and the trunk links making up the channels by which the calling line may be connected to the selected originating register. If the line link, junctor and the trunk link associated with the channel are all idle, the entire channel is available for use but if either the line link, the junctor or the trunk link is busy the entire channel is unavailable and is considered busy.

Before proceeding with the actual selection of an idle channel, the marker makes a circuit check as to whether or not certain key relays have been operated properly as a result of junctor, trunk link and line link testing. This circuit extends through the winding of relay TK(31) which operates to indicate a proper check of prior function in preparation for selection by the marker of an idle channel.

Since the marker is completing a dial tone connection, relay TK(31) in operating closes a circuit for testing that the marker has connected with the same line link frame through both the line link frame connector and the line link marker connector. This circuit may be traced from battery through the winding of relay DTK(31), conductor 3108, conductor 1818, contact 6 of relay MA1(3) in the line link marker connector, conductor 318, contact 1 of relay DT(1), conductor 118, contact 1 of relay MCB1(2) in the line link marker connector, conductor 214, contact 1 of relay LOT(31) to ground over the contact of relay TK(31).

In order to delay the selection of a channel until after all of the test relays (not shown) in the marker for the channel elements, that is, the line link test relays, the junctor test relays and the trunk link test relays have had a sufficient time in which to operate, a time interval is measured following the operation of relay TK(31) before the selection circuit is closed. When the channel has been selected the identity of the selected line link is registered on the line link relays (not shown) in the marker and transmitted to the originating register. The marker now checks that all of the necessary information has been properly transmitted to the originating register. A circuit is now closed to check that the circuits for operating and locking the register relays in the originating register have been closed. If all of the relays connecting the marker with the originating register are operated and the registration checking relays have been operated, ground is removed from conductor 2600 in Fig. 26 to thereupon open the operating circuits for relays GTL2(25), GTL3(26) and GTL4(26).

The release of relays GTL2(25), GTL3(26) and GTL4(26) removes all of the operating grounds for the register relays both in the marker and in the originating register. However, if the register relays in the originating register have operated and locked accurately, the associated register relays in the marker will be held operated from the originating register.

After the selection of an idle connecting path or channel has been completed, the marker will proceed to set up this connecting path by operating the select magnets on both the line link frame and the trunk link frame which are associated with the selected connecting path and by operating the hold magnets associated with the selected channel after the select magnets are operated. It will then test the selected channel for false crosses or grounds, for continuity, and for double connections to determine that the channel is in a proper condition for service. If the condition is satisfactory the marker will extend the selected channel from the trunk link frame to the selected register.

On the line link frame, the line links appear in a horizontal level of both the line switches and the junctor switches. When relay HG0(1) was operated and connected the horizontal group 0 with the marker, it not only extended to the marker the test circuits for the ten line links associated with that horizontal group but also extended to the marker the operating circuits for the select magnets associated on both the line switch and the line junctor switch with the line links serving that horizontal group. A circuit is closed from battery in the marker to select an idle channel, say channel 0, over conductor 215 in Fig. 2, contact 20 of relay MCA1(2), conductor 216 and thence in parallel over contact 3 of relay HG0(1) to the winding of select magnet LS0(1) and ground and over contact 5 of relay HG0(1) to the winding of select magnet LJS0(1) and ground operating the select magnets associated with the two ends of the selected line link 0. Select magnets LS0(1) and LJS0(1) prepare the cross-points of the zero levels of the line switch and the line junctor switch for operation.

On the trunk link frame the junctors appear in the horizontal level of the trunk link junctor switches so that the selection of a junctor as a part of a channel will determine the select magnet to be operated. The select magnet (not shown) prepares the cross-points of the zero level on the trunk junctor switch for operation. When the originating register was selected, the identity of the trunk-link select magnet was determined and a circuit was closed for operating the select magnet (not shown) of the trunk switch.

In order to complete the operation of the cross bar switches the marker must now operate the hold magnets of these switches. The identification of the line group within which the calling line is located and the operation of relay LG0(1) extends the operating circuits for the hold magnets associated with the five lines included in the line group toward the marker. The identification of the junctor group to be used extends the operating circuits for the associated hold magnets JH0(1) belonging to the line junctor switches toward the marker. The identification of the group of trunk links to be used extends the operating circuit for hold magnets (not shown) associated with the trunk link toward the marker.

After the selection of the connecting path, the marker will delay the operation of the hold magnets for a period of time sufficient to allow the select magnets to fully operate and for a time sufficient to allow for the full release of any previously operated hold magnet which may have released just prior to the channel selection and which perhaps must be reoperated in setting up this connecting path. The purpose of this latter time delay is to prevent double connections caused by closing two cross-points for the operation of one hold magnet due to failure of the previously closed contacts to restore to normal before the hold magnet is reoperated.

Figure 1:
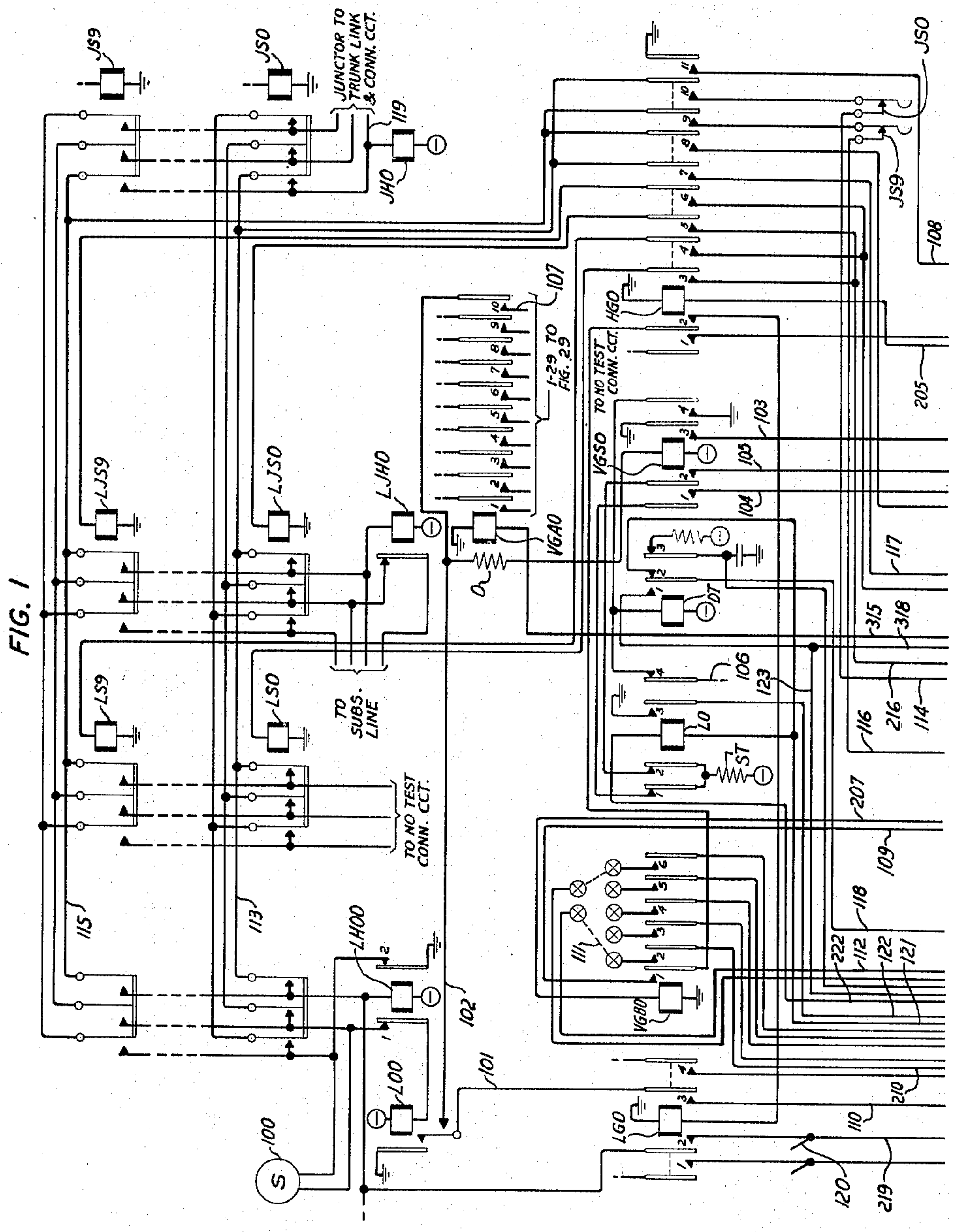
Fig. 1 shows in skeleton form a subscriber's line circuit, line-across-bar switches, line-junctor cross-bar switches and certain relays of the lines, line-link and line-link connector circuits.

The marker initiates the operation of the trunk link frame hold magnets (not shown) and the line link frame junctor switch hold magnet JH0(1) over the junctor sleeve conductor 119 of Fig. 1.

The marker now checks that the above cross-points have been closed. It will be remembered that the secondary test circuit was previously traced from the sleeve conductor 113 of the line link 0 to the winding of a link busy relay in the marker over conductor 213 in Fig. 2. When now ground is connected to conductor 113 from conductor 119 by the operation of the hold magnet JH0(1), the link busy relay operates in the marker over lead 213 as an indication that the cross-point 00 of the line frame junctor switch has been closed. The operation of the line hold magnet will either be delayed while a marker makes a false ground test on the tip and ring conductors of the connecting path or will take place immediately following the operation of the other hold magnets according to whether the load on the available marker is light or heavy.

A false ground test is made as soon as the cross-points of the line junctor switch, the trunk junctor switch and the trunk switch have been closed. The false cross and grounded test is made only under light traffic conditions. In making this test the marker tests for the appearance of a false ground potential on the ring conductor, a false battery potential on the tip conductor or a false connection between the ring conductor and the tip conductor on the channel as it has been set up between the line link and the outgoing side of the trunk switch.

After the ground test, the marker closes a circuit for operating the hold magnet individual to the calling line which circuit may be traced from ground in the marker over conductor 2219 in Fig. 22, contact 4 of relay FTK1(22), contact 7 of relay MT11(22), conductor 2220, contact 9 of relay VFT0(9), conductor 905 through cable 2—9, contact 23 of relay MCB1(2), conductor 219, contact 2 of relay LG0(1) to the winding of hold magnet LH00(1) to battery. Magnet LH00(1) operates in this circuit closing cross-points 00 on the line switch and connecting the tip and ring conductors of the calling line 100 to the tip and ring conductors of the selected channel. Magnet LH00(1) connects its winding to the sleeve conductor 113 of the line link 0 and at its contacts 1 and 2 opens the circuit for line relay L00(1).

The marker initiates a continuity test which is made to check that all cross-points of the selected channel are closed and that a continuous pair of tip and ring conductors extend from the trunk switch to the calling subscriber.

The marker also makes a double connection test. This test is applied to the sleeve conductor associated with the select connecting path to test for a false ground potential applied to the sleeve conductor associated with a selected connecting path from the sleeve conductor associated with some other busy channel.

Upon the indication of a successful double connection test, the marker causes the tip, ring and sleeve conductors of the established channel to be disconnected from the marker and to be extended to the originating register.

The dial tone connection will be held by the originating register which disconnects its calling line register from the marker. The sleeve conductor of the selected connecting path to ground in the originating register is extended through the windings of the hold magnets. At this time the linkage check relay LK1(31) in the marker is operated as an indication that the connecting path between the calling line and the selected originating register has been set up or has been tested and has been found in condition for service.

*Marker release*

When relay LK1(31) operates, it opens at its contact the operating circuit for relays ONW(31), LLC2(31) and LLC1(31) causing these relays to release.

The operation of relay LK1(31) causes the opening of the operating circuit at 3109 in Fig. 31 for relays CKG2(31) and CKG3(31) causing these relays to release. Relay CKG3(31) at its contact opens the operating circuit for relay CKG4(31) releasing the latter relay to thereby further open the operating circuit for relays ONW(31), LLC1(31) and LLC2(31). Relay LK1(31) in operating also opens at the point 3020 in Fig. 30, the circuit over which relay MS1(16) was locked in series with relay OC1(30) thereby releasing both relays OC1(30) and MS1(16).

The relay MS1(16) opens the operating circuit for the multicontact relay MA1(3) of the line link marker connector which in turn releases the multicontact relay MB1(29) thereby completing the opening of the connections established between the line link frame and the marker through the line link marker connector. Relay MA1(3) opens the circuit of relay MCB1(30) and that relay in releasing releases the CB relays in all of the marker connectors and the markers available to such connectors.

In addition, the release of relay MS1(16) opens the circuit of relay D(30) which will in turn release relays DT1(30), DT2(30) and DT3(30). Upon the completion of a successful double connection test as previously mentioned, the circuit of relay GTL1(22) over conductor 2208 was opened and relay GTL1(22) released in turn releasing relay GTU(25). Relay GTU(25) opens the circuit by which relays FT0(11), FU4(12) and FU7(12) have been held operated from the originating registers causing these frame relays to release in turn releasing relay FUT0(24) and removing ground from lead 1105 in Fig. 11.

The release of relay MA1(3) in the line link marker connector will release relay GK(18) which in turn releases relays VGR(18), HGR(19) and FR(22). The release of relay D(30) opens the locking circuits for relays VGT0(4), HGT0(7), VFT0(9), VTK(18), HTK(19) and FTK(22) by effecting the opening of conductors 1803, 1905, 2202, 3014, 3015 and 3016 respectively. Relays VGT0(4), HGT0(7) and VFT0(9) in releasing in turn release relays VTK1(18), HTK1(19) and FTK1(22) respectively.

When relay LLC1(31) releases in response to the operation of relay LK1(31) as above described, it opens the circuit for the marker preference relay MP1(15) of the line link frame connector causing that relay to release in turn releasing the multicontact relay MCA1(2) of the line link frame connector. Relay MCA'1(2) opens the circuits for the other multicontact relays MCA1(2) and MCB1(2) of the line link frame connector completing the disconnection of the marker from the line link frame. On the line link frame a release of relay MCA'1(2) opens the circuit for a horizontal group relay HG0(1) which releases in turn releasing the line group connector relay LG0(1). Relay MCA'1(2) also opens the circuit of relay VGB0(1) causing that relay to release. When relay LK1(31) operated, it caused conductor 1808 to be opened to thereby open the circuit for relay VGA0(1) which was further opened by the release of relay MA1(3).

Relay LLC1(31) also opens the circuit of the class relay CS0(27) causing that relay to release.

The disconnection of the calling line registers in the originating register from the marker opened the circuit by which relays VG4(12), VG7(12), HG4(13), HG7(13), VF9(13), CT0(14), CU2(14) and CU7(14) were being held from the originating register causing all of these relays to release. These circuits were opened by opening the respective conductors 2525, 2524, 2526, 2527, 2528, 2705, 2707 and 2706.

When the marker releases from its connection to the trunk link frame, relay TFK2(31) releases. Relay TK(31) releases in turn releasing relay DTK(31). Relay LOT(31) releases upon the release of relay DT1(30). Relay LFK(31) releases upon the release of relay MCA'1(2). Relay LK1(31) releases when relay CKG4(31) released. When relay MS1(16) released, relays MCK(30), MAK(30) and MSK(30) reoperated to respective grounds on cross-connections 3004, 3007 and 3001. The reoperation of relays MCK(30) and MAK(30) releases relay STX(30) and the reoperation of relays MCK(30), MAK(30) and MCK(30) releases relay TM(30) which in turn release relay OC(30). Relays CBD(11) and CBD1(11) released upon the release of relay DT1(30) due to the opening of conductor 1104. Upon the release of relays CS9(27), GTL1(22) and GTL4(26), relay A0(14) released.

When relay 0NW(31) releases, it causes the sequence circuit to function to advance the preference of various horizontal and vertical groups on the line link frame for the next use of the marker. When relay 0NW(31) releases it disconnects ground from conductor 3103 and connects it to conductor 3110. The removal of ground from conductor 3103 opens the operating circuit for relay S0(21) but that relay is held operated as above described under the control of relays SE(21) and L0(21) over the contact 6 of relay S0(21). When ground is connected to conductor 3110, a circuit is completed over conductor 3110, over cable 21—31, contact 2 of relay S0(21), conductor 2102, contact 8 of relay SQ0(8), winding of relay SQ1(8) to battery. Relay SQ1(8) closes a locking circuit for itself over its contact 5, conductor 805 to ground at contact 1 of relay S0(21). Relay SQ1(8) closes a circuit from ground over its contact 8, conductor 806 through the winding of relay LE(21) to battery. Relay LE(21) operates in this circuit opening at its contact 1 the locking circuit for relay SQ0(8) which now releases in turn releasing relay L0(21). The release of relay L0(21) opens the locking circuit for relay S0(21) and that relay also releases. Relay L0(21), in releasing, at its contact 1 also connects ground to conductor 805 to provide a supplementary locking circuit for relay SQ1(8) which becomes effective before relay S0(21) opens the previously traced locking circuit. Therefore, during the interval between the release of the marker and its seizure for the next call, relays SQ1(8), SQT0(21) and LE(21) remain operated.

On the line link frame the operation of hold magnet LH00(1) releases the line relay L00(1) which disconnects ground from conductors 100 and 102 thereby releasing relay VGS0(1), if no other line on this frame is being the dial tone connection at this time. The release of relay VGS0(1) opens the circuit of relay DT(1) which releases. Relay VGS0(1) also opens the start conductor leading to the line link marker connector. When relay MA1(3) in the line link marker connector releases, it actuates relays (not shown) for changing the preference of markers the next time this line link marker connector circuit seizes a marker.

When a dialing tone signal is transmitted to the calling line from the originating register, the subscriber hearing this tone dials the number of the desired connection.

After the registration of the called number in the originating register, the latter places battery on marker connector start leads such as 104 and 105 of Fig. 1 for the line link marker connector. One of these leads will be comparable to conductor 311 of Fig. 3 and will extend to the upper armature of a relay CB (not shown) which is individual to marker 1 in the originating register marker connector serving the originating register shown. This CB relay (not shown), as previously mentioned, will be arranged in a chain circuit with relay CB1(3) and other CB relays (not shown) for the same marker but for other marker connector circuits. Assuming that marker 1 is idle and therefore that the CB relay is not operated, the circuit above traced will be extended over a contact of such CB relay to the winding of a marker start relay MS (not shown) similar to relay MS1(16) of Fig. 16 and if no other originating register having a lower preference and no incoming register is attempting to seize this marker, the MS relay will be operated to initiate the connection of the originating register with marker 1 just as has been described for the line link marker connector. With connector relays (not shown) similar to MA1(3) and MB1(29) operated, the originating register is connected with the selected marker over a large plurality of conductors some of which are shown collectively in Fig. 26.

As discussed in connection with the establishment of the dial tone connection, the operation of the MS relay associated with the originating register marker connector opens the operating circuits for the normally operated relays MCK(30), MAK(30) and MSK(30) permitting these relays to release and connect ground to conductors 3021 and 3010, operating relays STX(30) and TM(30) as previously described. The connector relay similar to MA1(3) closes its supplementary ground corresponding to lead 316 to conductor 3010. Likewise, relay MCB1(30) is operated from the connector relay MA. Also, as described in connection with the line link marker connector, all CB relays corresponding to CB1(3) for other connectors are operated except the CB relay associated with the originating register, which includes relay CB1(3) this time, operated from the marker over conductor 301.

A relay is operated in the marker to indicate to the marker that it has been called in by an originating register.

The marker connector, corresponding to MA1-(3), connects ground to conductor 3100 completing a circuit which extends through the windings of relays CKG2(31) and CKG3(31) to battery.

Relays CKG2(31) and CKG3(31) prepare the marker for operation as described in connection with the dial tone connection. Relay CKG4(31) when operated in turn operates relays 0NW(31), LLC1(31) and LLC2(31)

Relay 0NW(31) connects ground to conductor 3103 completing a circuit from conductor 3103 through cable 21—31, contact 3 of relay LE(21), contact 3 of relay S0(21) to battery through the winding of relay SE(21) and battery. Relay SE(21) operates in this circuit connecting ground over its contact 6 to conductor 3103 to provide a locking circuit for itself.

All of the foregoing operations take place as described in connection with a seizure of the marker for a dial tone connection.

The marker closes the previously traced circuit for operating relays GTL2(25), GTL3(26) and GTL4(26) over conductor 2600.

When the multicontact relays of the originating register marker connector have operated as above described, a plurality of circuits are closed for transferring the calling line designation and the called line designation from the originating register to the marker. It will be observed that as a result of the transfer of the calling line designation to the originating register during the dial tone connection, the following relays (not shown) in the originating register were operated: frame tens relay FT0, frame units relays FU4 and FU7, horizontal group relays HG4 and HG7, vertical group relays VG4 and VG7, vertical file relay VF0, class tens relay CT0, and class units relays CU2 and CU7, to identify the location and class of the calling line.

As the result of dialing a called line designation, register relays (not shown) in the originating register, were operated to record three digits of the office designation of the wanted line while other register relays (not shown) were operated to record the four digits of a numerical designation of the wanted line which may be assumed to have been Media 6–7890. Each of these relays grounds a conductor individual thereto which is extended through the originating register marker connector to the marker to operate the corresponding register relay in the marker. In addition, the originating register grounds one of three conductors to inform the marker whether the call is a permanent signal, a partial dial or a regular call and one of three conductors to inform the marker whether a coin has been returned, a stuck coin has been encountered or that no coin return attempt has been made.

Specifically, relays CT0, HG4, HG7, FU4 and FU7 in the originating register connect ground to conductors 1402, 2613, 2614, 2615 and 2616 respectively. Conductor 1402 extends through the winding of relay CTA0(14) and to battery. Conductors 2613 and 2614 extend over contacts 4 and 5 of relay GTL3(26), conductors 2604 and 2605 through the windings of horizontal group relays HG4(13) and HG7(13). Conductors 2615 and 2616 extend over conductors 2904 and 2907, contacts 4 and 5 of relay GTL2(25), conductors 1204 and 1207 through the windings of frame units relays FU4(12) and FU7(12).

Also in the originating register, relays FT0, VG4, VG7, CU2, CU7 and VF0 connects ground to conductors 2617, 2708, 2709, 2618, 2619, and 2620 respectively. Conductors 2708 and 2709 extend over conductors 2707 and 2706 and conductors 2703 and 2702 to battery through the windings of relays CU2(14) and CU7(14) respectively. Conductor 2617 extends over contact 6 of relay GTL4(26), conductor 2611 through the winding of relay VF0(13) and to battery. Conductors 2618 and 2619 extend over contacts 9 and 10 of relay GTL3(26) to conductors 2603 and 2602 and to battery through the windings of relays VG4(12) and VG7(12). Conductor 2620 extends over conductor 2910, contact 6 of relay GTL2(25), conductor 1109 to the winding of relay FT0(11) and battery.

It will be remembered that in the originating register relays (not shown) were operated to register the digits representing the office in which the called line is located. Likewise, in the originating register relays (not shown) were operated to register the numerical designations of the called number, namely, 7890. These relays ground certain other conductors which are extended to the A, B and C office digit registers, the thousands register relay, the hundreds register relay, the tens register relays and the units register relays in the marker (not shown). These numerical register relays and the office code register relays operate in the marker as a result of the information being transmitted to these register relays from the originating register.

Since, as assumed, this is a local call, the numerical registration will be transmitted to the number group circuit which will inform the marker as to the equipment location and type of calling lines and the nature of the ringing current required. However, since the connection cannot be completed until an idle trunk is available the seizure of the number group circuit is delayed until the trunk link frame has been seized.

The marker is now ready to seize a trunk link frame having at least one idle intra-office trunk appearing thereon. The marker proceeds to determine which trunk link frames have intra-office trunks thereon. The marker tests for trunk link frames having idle intra-office trunks and through an associated trunk link frame connector circuit establishes the necessary connections with a selected trunk link frame and with an intra-office trunk.

The marker is now ready to determine the location of the called line. The marker proceeds to close circuits for operating relays HGL1(19), VGL1(5), VGL2(5) and VFL1(9). Relay HGL1(19) is operated in a circuit from ground in the marker over conductor 1909 of Fig. 19 to battery through the winding of relay HGL1(19). Relays VGL1(5) and VGL2(5) are operated in a circuit from ground in the marker over conductor 1814 in Fig. 18 through the windings of relays VGL1(5) and VGL2(5) in parallel to battery. Relay VFL1(9) is operated in a circuit from ground in the marker over conductor 908 in Fig. 9 to battery through the windings of relay VFL1(9).

Each number group circuit is equipped to assist in the translation of one thousand directory numbers. Therefore, there will be one number group circuit assigned to each series of one thousand directory numbers and the marker by examining the thousands digit of the called directory number will determine the particular number group circuit which is required.

Figure 15:
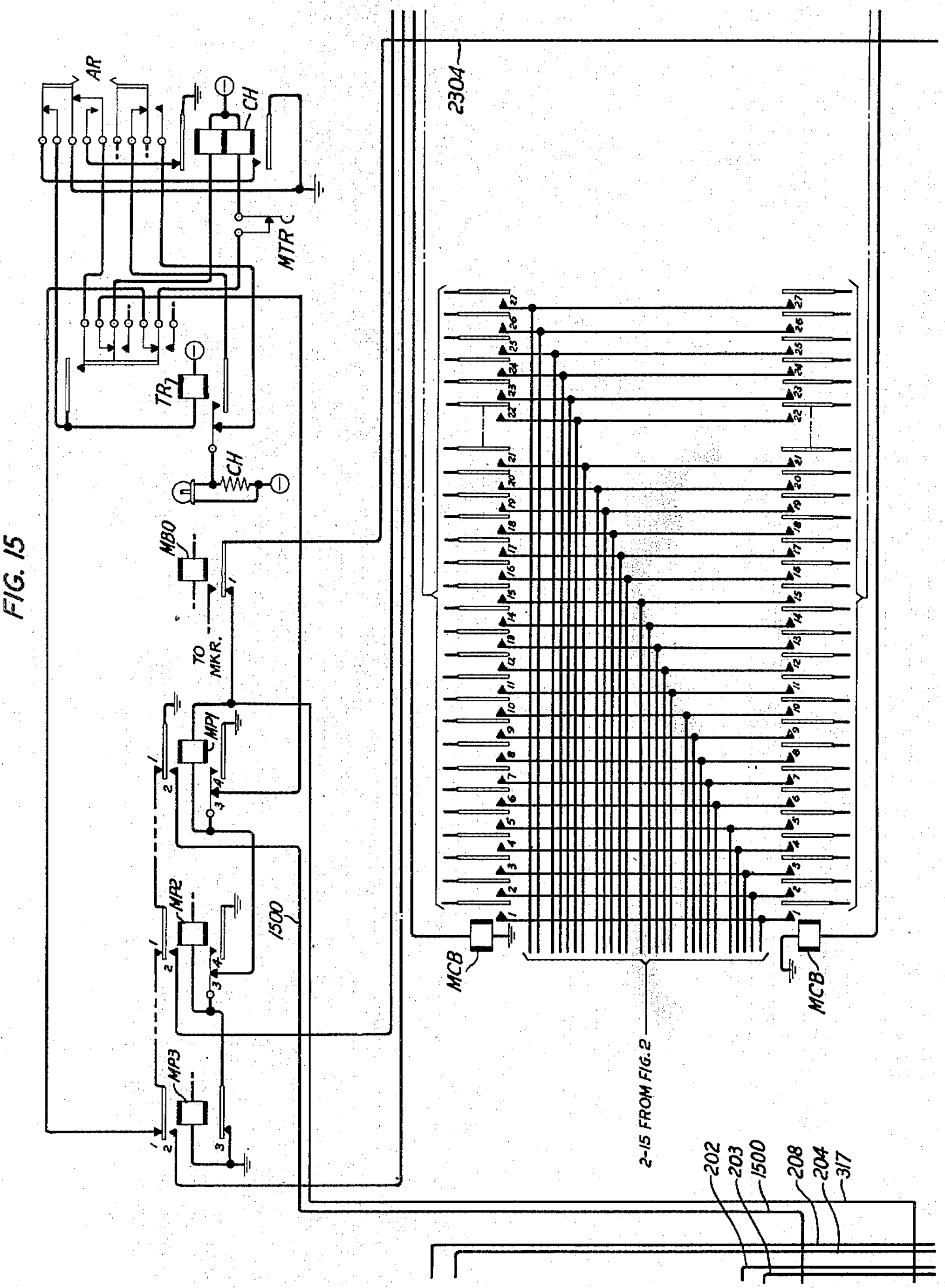

The marker makes connections with the desired number group circuit through a marker preference chain comparable to the relays MP3, MP2, and MP1 of Fig. 15 and by means of multicontact relays such as MCA'1(2), MCA1(2) and MCB1(2) as disclosed in Fig. 2 in connection with the line link frame connector circuit through which the marker connects with a line link frame as previously described. With the multicontact relays of the number group frame connector circuit operated, all of the circuits are completed which are necessary for transmitting the called line designation to the number group circuit and for receiving the translation of that designation from the number group circuit.

After the marker has been connected by the above-mentioned circuit through the multicontact relays to the desired number group circuit through the number group frame connector, the marker transmits to the number group the digits of the office code and numericals of the called line and operates relay PTK(31). When the identification relays in the number group circuit have operated, they in turn operate relays in the marker which register the identification of the called number in terms of equipment location and lock independently of the number group circuit. It is, of course, well known to provide such number group circuits which will translate directory numbers, such as Media 6–7890, into information which it can transmit to the marker circuit to inform the marker as to the equipment location of this directory number. This information will be in the form of frame tens and frame units numbers of the line link frame location of the called line, the horizontal group number, the vertical group number, the vertical file number and other information such as the proper ringing combination.

Let it be assumed that the called directory number exists in the line location which comprises line link frame 00, horizontal group 9 on frame 00, vertical group 13 and vertical file 0 within that vertical group. Based on the latter assumption the following identification relays are operated in the marker as a result of the translation which has taken place in the number group circuit. The frame tens number zero relay FTN0(10) will be operated from battery in the number group circuit over conductor 1000, to ground through the winding of FTN0(10). The frame units number zero relay FUN0(10) will be operated from battery in the number group circuit over conductor 1001 to ground through the winding of relay FUN0(10). The vertical file number zero VFN0(10) relay will be operated from battery in the number group circuit over conductor 1002 to ground through the winding of relay VFN0(10). The vertical group number 13 relay VGN13(6) will be operated in a circuit from battery in the number group circuit over conductor 600 to ground through the winding of relay VGN13(6). The horizontal group number 9 relay HGN9(6) will be operated from battery in the number group circuit over conductor 601 through the winding of relay HGN9(6).

When the identification relays have operated as above described, they in turn operate relays in the marker which register the identification of the called line and lock independently of the number group circuit. Relay FTN0(10) closes a circuit from ground over its contact, conductor 1003, through the winding of relay FTT0(23), conductor 2300, conductor 2301, to battery through a cross-detection relay (not shown) in the marker. Relay FTT0(23), operates in this circuit and locks over its contact 11 to ground in the marker circuit over conductor 2302. Relay FUN0(10) closes a circuit from ground over its contact, conductor 1004, conductor 1107, through the winding of relay FUT0(24) to cross-detection battery in the marker over conductor 2400. Relay FUT0(24) operates in this circuit and locks to ground in the marker circuit over its contact 4 and conductor 2401. Relay HGN9(6) closes a circuit from ground over its contact, conductor 602, conductor 1910 through the winding of relay HGT9(20) to battery. Relay HGT9(20) in operating locks to conductor 2000, over its contact 9 to ground in the marker circuit over conductor 1911, the No. 10 contact of relay HGL1(19) and conductor 1912.

Relay VGN13(6) in operating completes a circuit from ground over its contact, conductor 603, conductor 503, through the winding of relay VGT13(17) to battery. Relay VGT13 in operating locks to ground over its contact 7, conductor 1701, contact 7 of relay VGL2(5), conductor 504 and conductor 1815 to ground in the marker circuit.

Relay VFN0(10) in operating completes a circuit from ground over its contact and conductor 1005 to battery through the winding of relay VFT0(9). Relay VFT0(9) operates and locks in a circuit over its contact 6, conductor 902, conductor 906 and contact No. 5 of relay VFL1(9) to ground in the marker circuit.

The registration of the called line location is now set up in the marker and is locked independently of the number group circuit. The marker now checks the calling line location against the called line location to determine whether this is a reverting call; i. e. whether the calling and called subscribers are on the same line circuit. The operation of the marker in connection with the completion of the reverting call is described and claimed in the copending application of R. E. Hersey, Serial No. 57,397, filed October 29, 1948. Since the calling line and the called line are on the same line link frame but in different horizontal and vertical groups this is obviously not a reverting call and the marker proceeds to set up the connection of the called line with a selected intra-office trunk.

The locking of the relays FTT0(23), FUT0(24), HGT9(20), VGT13(17) and VFT0(9) in the marker circuit indicates that the called line designation, as translated by the number group frame, has been registered in the marker. Such indication effects the closing of a circuit for bringing about the release of the number group circuit. The releasing of the number group circuit and the freeing of it for use by other markers effects the release of the identification relays FTN0(10), FUN0(10), VFN0(10), HGN9(6) and VGN13(6).

After the location of the called line is identified, the marker will test the called line for a busy condition before establishing a connecting path from a selected intra-office trunk to the called subscriber's line since if the line is busy it must connect the calling line to a busy tone trunk instead of connecting it to the selected intra-office trunk.

Figure 23:
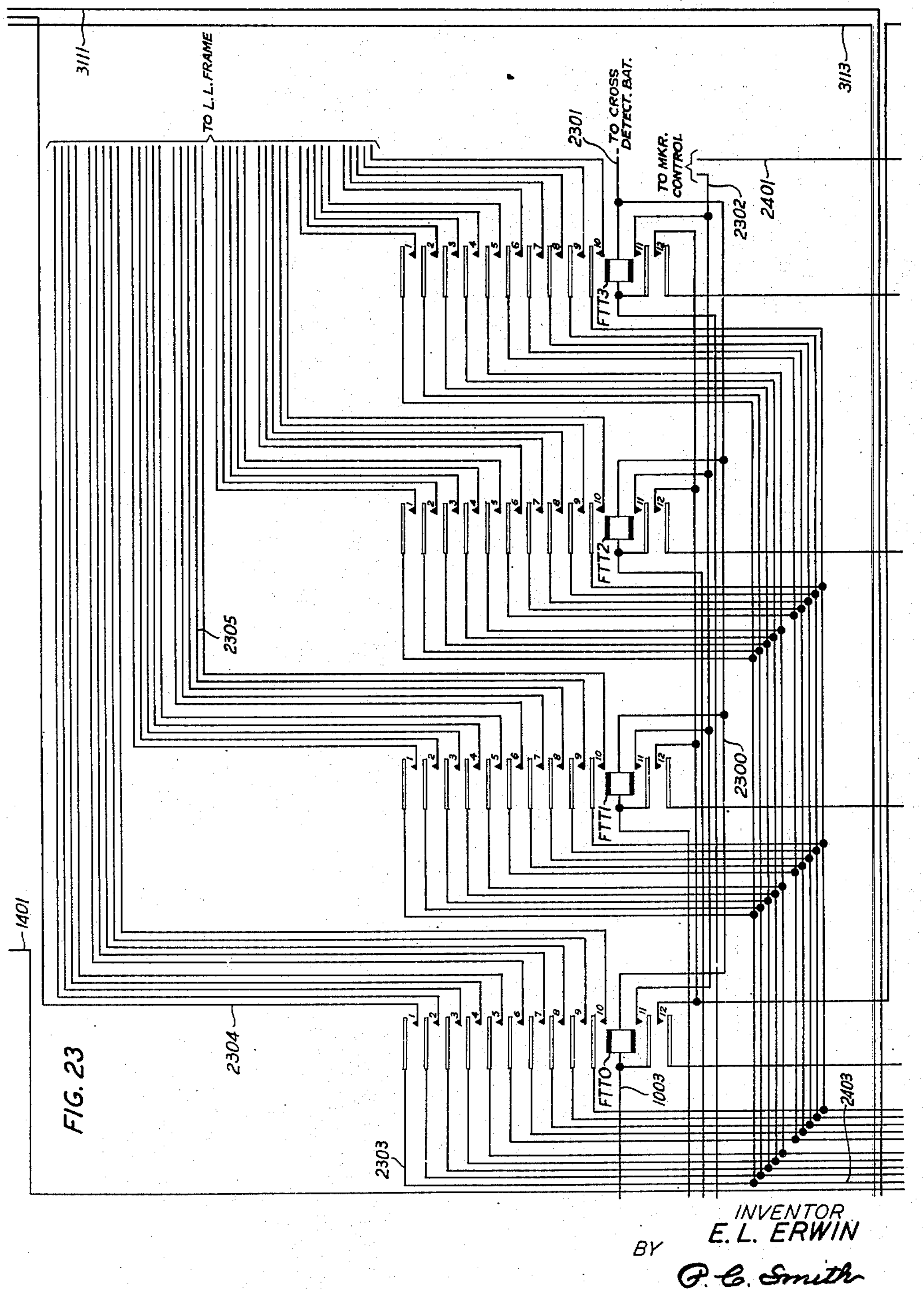
Figure 24:
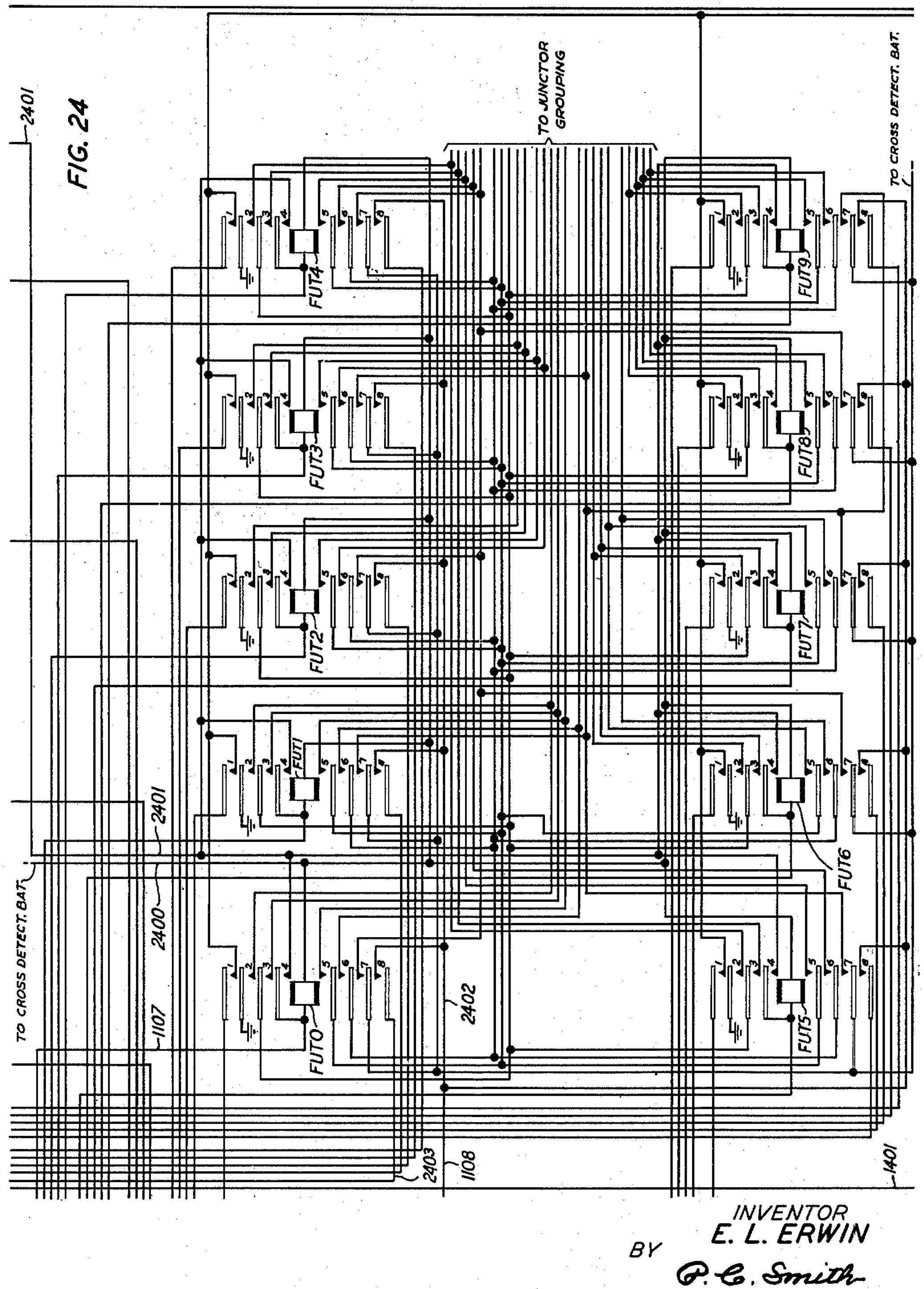
Figure 25:
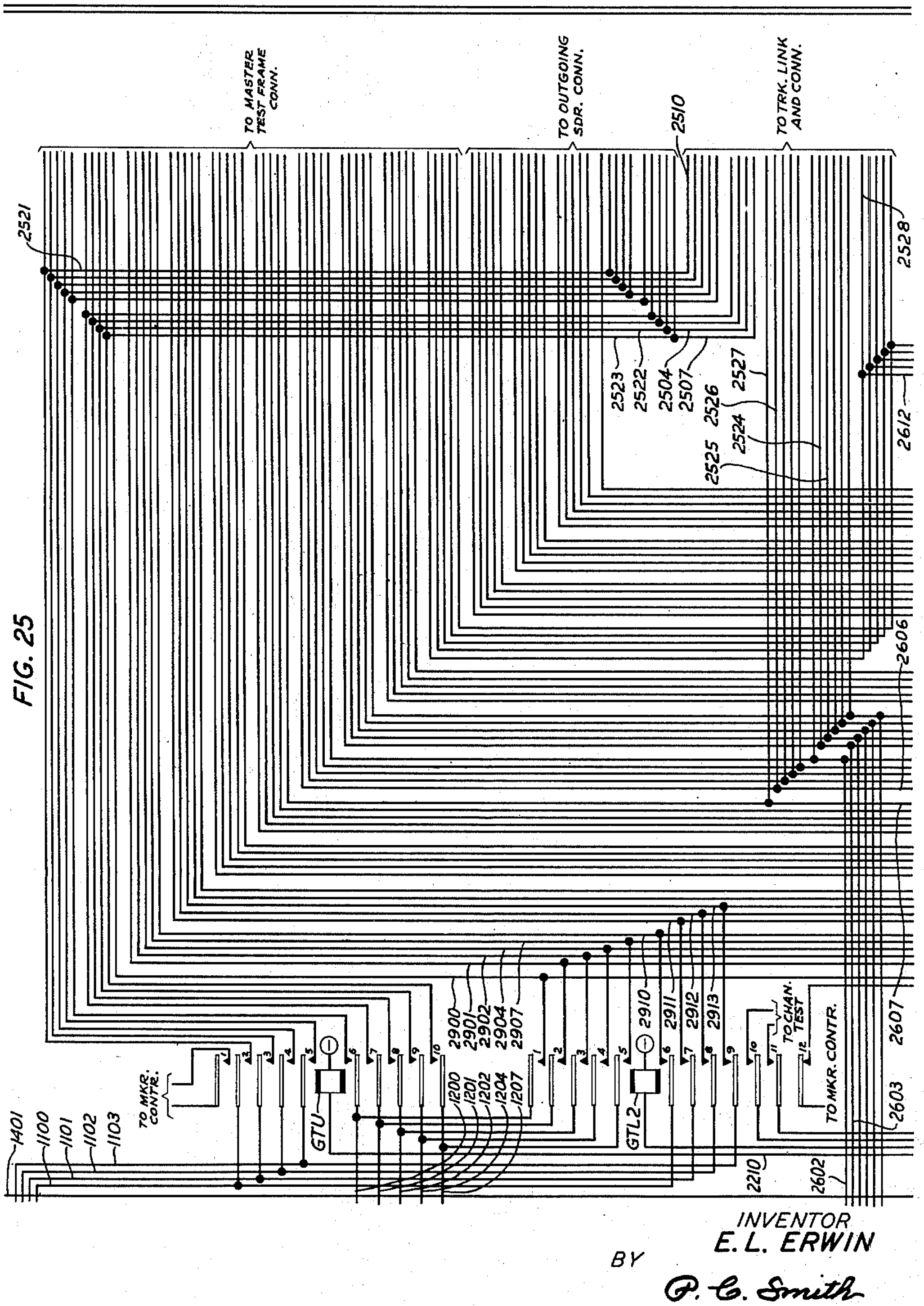
Figure 26:
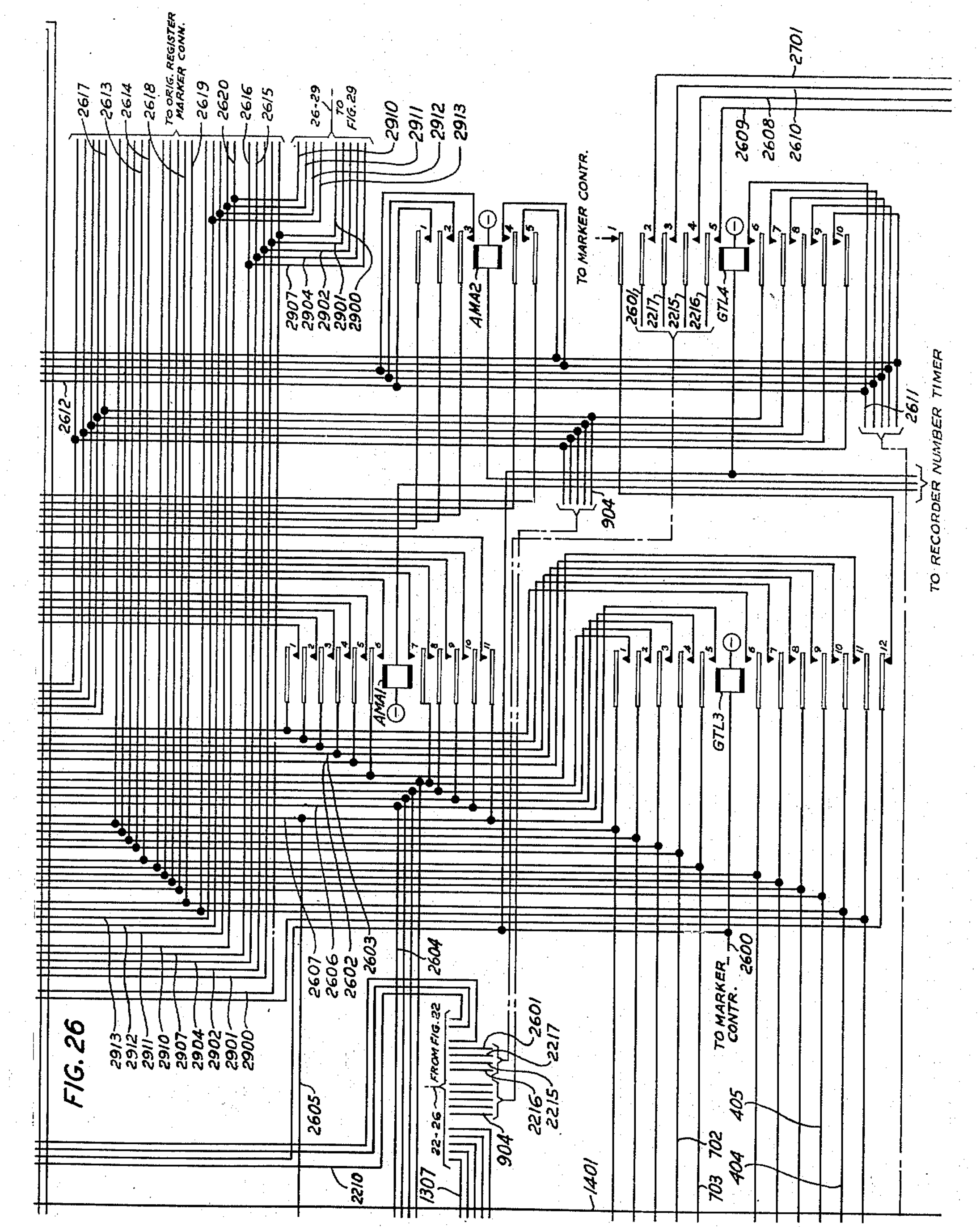
Figure 27:
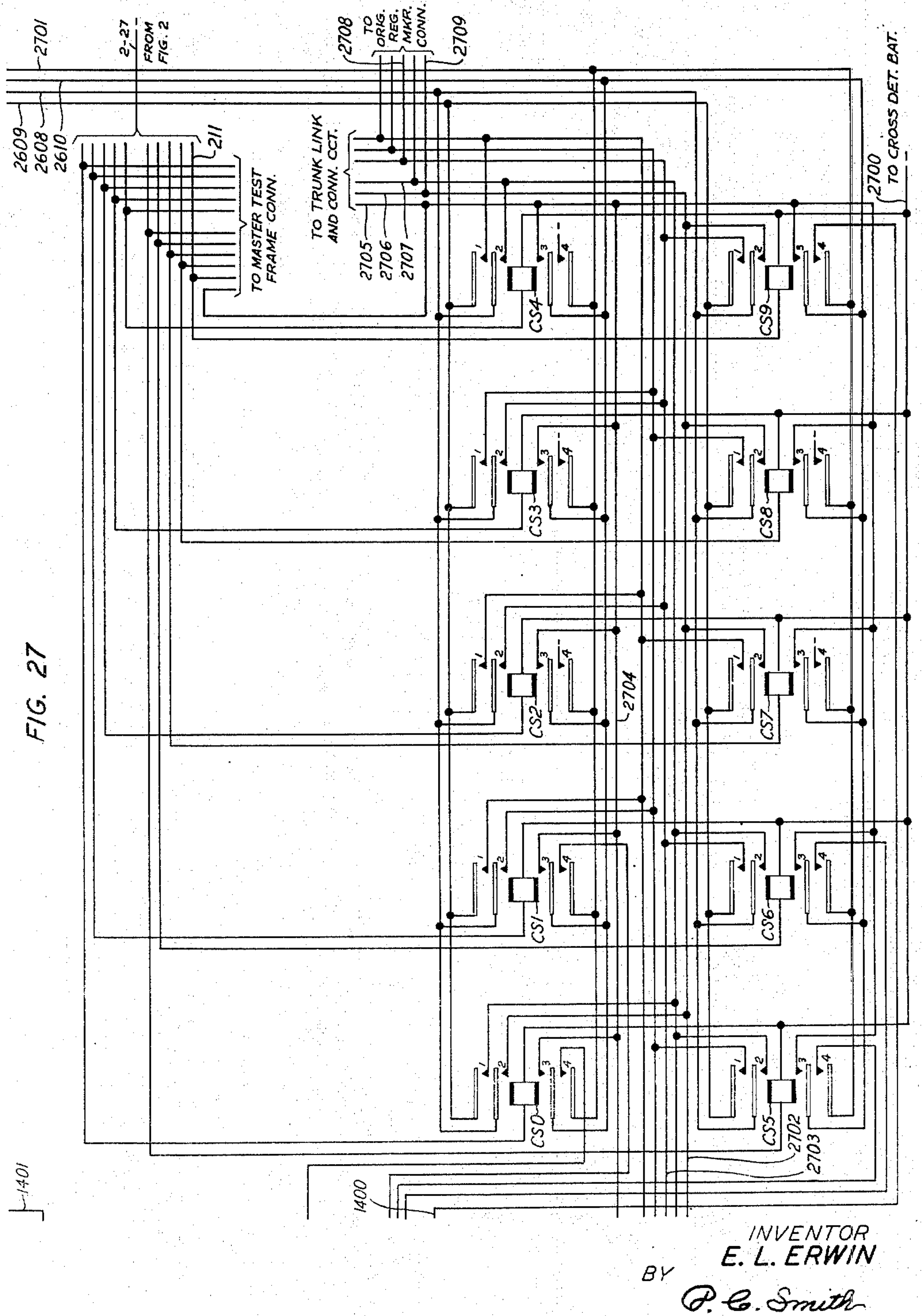

In order to test the called line the marker must seize the line link frame identified by the number group circuit from the directory number of the called line. The number group circuit in translating the directory number to the equipment location number as above described, also furnishes to the marker on register relays (not shown) the proper ringing combination to be used in ringing the called party. As an incident to the translation of the ringing combination number and the registering of it in the marker circuit relay RCL(31) in the marker circuit was operated. A circuit is now completed to enable the marker to select and connect to the line link frame 00 containing the called subscriber's equipment location. The circuit may be traced from battery through resistance LFS(31), contact of relay SP(31), contact 1 of relay LLC1(31), contact of relay TFK2(31), contact of relay PTK(31), contact of relay RCL(31), contact 1 of relay SCB1(31) to conductor 3111. Conductor 3111 extends to contact 5 of relay MT15(11) thence over conductor 1108, conductor 2402 over contact 8 of relay FUT0(24), conductor 2403, conductor 2303, over contact 1 of relay FTT0(23), to conductor 2304 to the line link frame connector for line link frame 00. The circuit extends over contact 1 of relay FTT0(23), conductor 2304, over contact 1 of relay MB0(15), through the winding of relay MP1(15) to ground over the contacts 3 of relays MP2(15) and MP3(15). Relay MP1(15) is a marker preference relay for marker No. 1 associated with the line link frame connector for line link frame 00. In Fig. 23 the other conductors, such as 2305, extend to the line link frame connector circuits for other line link frames such as frame 18, upon which the called subscriber's line equipment could exist and would energize a marker preference relay corresponding to relay MP1(15) associated with marker No. 1 and with the line link frame connector circuit for line link frame 00.

Assuming that no other marker is attempting to seize frame 00 at this time, the preference relays associated with other markers are not operated and the circuit of relay MP1(15) extends, as above described to ground over the contacts 3 of the other marker preference relays including relays MP2(15) and MP3(15), relay MP1(15) operates in this circuit, locks to ground at its contact 4, and closes a circuit from ground over its contact 2 and conductor 1500 to battery through the winding of multicontact relay MCA'1(2). Relay MCA'1(2) operates and closes circuits previously described for operating relay MCA1(2) which extends from ground through the winding of relay MCA1(2), contact 30 of relay MCA'1(2), conductor 203, and thence to battery as previously traced through resistance lamp LBS1(31). A similar circuit is closed from ground through the winding of relay MCB1(2), contact 29 of relay MCA'1(2), conductor 202 to battery through resistance lamp LBS0(31). Relays MCA'1(2), MCA1(2) and MCB1(2), when operated, connect the marker with the line link frame 00 over a plurality of conductors in the same manner as previously described in connection with the dial tone connection. Relay MCA'1(2) at its contact 16 connects ground to conductor 204, completing a circuit for operating relay LFK(31) in the marker. It will be noted that since this particular marker had not necessarily any previous connection with this particular frame 00 it employs the start circuit just traced instead of the start circuit leading to the line link marker connector which was used in operating the line link frame connector during the establishing of the dial tone connection.

When vertical group relay VGT13(17) was operated, it closed a circuit from ground over the normally closed contact 4 of relays VGT0(4) to VGT12(17), over operated contact 4 of relay VGT13(17), conductor 502, contact 5 of relay VGG1(5), conductor 1806, contact 5 of relay VGG2(18) to battery through the winding of relay VTK1(18), operating that relay. When relays VGT13(17) and VTK1(18) operated, as soon as the multicontact relay MCA'1(2) operates, a circuit is closed from battery in the marker over conductor 1811 in Fig. 18, contact 4 of relay VTK1(18), conductor 1812, contact 8 of relay VGT13(17), conductor 1702 through cable 2—17, contact 1 of relay MCA'1(2), conductor 217 to the winding of a vertical group auxiliary relay VGB13 (not shown) to ground operating the latter relay. Relay VGB13 (not shown) corresponds to relay VGB0(1) operated over conductor 207 in connection with the identification of the calling line whose equipment location falls within vertical group 0 on line link frame 00.

Similarly when relay HGT9(20) operated, it closed a circuit from ground over normally closed contact 3 of relays HGT0(7) to HGT8(20), over operated contact 3 of relay HGT9(20), conductor 1907, contact 12 of relay HGG(19) to battery through the winding of HTK1(19) operating relay HTK1(19). With relays HGT9(20) and HTK1(19) operated, as soon as the multicontact relay MCA'1(2) operates, a circuit is closed from battery through resistance lamp HGB(31), contact 5 of relay LLC1(31), conductor 3105, contact 1 of relay HTK1(19), conductor 1908, contact 5 of relay HGT9(20), conductor 2001, through cable 2—20, contact 19 of relay MCA'1(2), conductor 220, through the winding of a relay HG9 (not shown) to ground. Relay HG9 (not shown) corresponds to relay HG0(1), which was operated for identifying the calling line as existing within horizontal group 0 on line link frame 00. Similarly to the previously described functioning of relay HG0(1), relay HG9 (not shown), in operating, closes a circuit for operating an HGK (not shown) check relay in the marker circuit as an indication that the horizontal group relay of the line link frame has operated.

As has been described previously in connection with the dial tone connection set up by the marker in connection with the operation of relays VGB0(1) and HG0(1), the operation of relays VGB13 (not shown) and HG9 (not shown) in the line link connector, identifies the line group within which the called line is located and these relays in combination with the above-mentioned check relay HGK (not shown) closes a circuit for a line group relay LG13 (not shown) which circuit is comparable to the circuit of relay LG0(1). Relay LG13 (not shown) operates and extends to the marker a group of five busy test circuits connected to the sleeve conductors associated with the five subscribers' lines within the associated subscriber line group.

When relay VFT0(9) operates, as previously described, it connects ground over its contact 3 and the normally closed contacts 4 of relays VFT1(9), VFT2(9) and VFT3(9) and contact 3 of relay VFT4(9), contact 7 of relay VFG(9), conductor 2203 through the winding of relay FTK1(22) and to battery operating relay FTK1(22). Following the operation of relay LG13 (not shown), with relays VFT0(9) and FTK1(22) operated, a test circuit for the called line is closed extending from battery through the winding of a line busy test relay LBT (not shown), conductor 2219 in Fig. 22, contact 4 of relay FTK1(22), contact 7 of relay MT11(22), conductor 2220, contact 9 of relay VFT0(9), conductor 905 through cable 2—9, contact 23 of relay MCB1(2) over a contact of relay LG13 (not shown) through the winding of the hold magnets associated with the called line over the sleeve contact associated with the called line. If the called line were busy, ground would be connected to the sleeve conductor to which conductor 905 would be connected over the sleeve contact of an associated cross-point from the trunk or register to which the line has been connected, and the line busy relay LBT (not shown), in the marker, would operate to control the marker in the operations necessary to connect the calling line with a tone trunk and a busy signal.

Assuming, however, that the called line is idle, relay LBT (not shown) does not operate and the marker proceeds to set up the connecting path between the called line and the selected intraoffice trunk. These functions take place in substantially the manner described under the completion of the dial tone connection since the intraoffice terminates on a trunk link frame as well as the originating register does.

The various tests of the connecting path will be made substantially as described for the dial tone connection and in the meantime the marker sets up the ringing switch for the desired ringing code. The ringing switch is associated with the trunk circuit.

After the double connection tests have been satisfactorily completed, relay LK1(31) is operated. The operation of relay LK1(31) indicates the successful completion of the connection of the called line with the selected intraoffice trunk. As previously described, the operation of relay LK1(31) releases relays LLC1(31), LLC2(31) and 0NW(31) thereby releasing the line link frame. The release of relay 0NW(31) disconnects ground from conductor 3103 and connects ground to conductor 3110. The removal of ground from conductor 3103 opens the operating circuit for relay SE(21) but that relay is held operated as previously described under control of relays S0(21) and LE(21) over contact 6 of relay SE(21). When ground is connected to conductor 3110 a circuit is completed over conductor 3110, cable 21—31, contact 3 of relay SE(21), conductor 2104, contact 7 of relay SQ1(8) through the winding of relay SQ2(8) to battery. Relay SQ2(8) operates and closes a locking circuit for itself over its contact 6, conductor 800 to ground at contact 2 of relay SE(21). Relay SQ2(8) closes a circuit from ground over its contact 9, conductor 801 through the winding of relay L0(21) to battery. Relay L0(21) operates in this circuit opening at its contact 1 the locking circuit for relay SQ1(8) which now releases in turn releasing relay LE(21). The release of relay LE(21) opens the locking circuit for relay SE(21) which also releases. Relay LE(21), in releasing, at its contact 1 also closes ground to conductor 800 to provide a supplementary locking circuit for relay SQ2(8) which becomes effective before relay SE(21) opens the previously traced locking circuit. The operation of relay SQ2(8) closes a circuit from ground over contact 5 of relay SQ2(8) conductor 809, contact 4 of relay SQT0(21) to battery through the winding of relay SQT1(21). Relay SQT1(21) operates in this circuit so that relays SQT0(21) and SQT1(21) are now both operated.

Relay LK1(31) in operating also opens the circuit of relays VGL1(5), VGL2(5), HGL1(19) and VFL1(9). Relays VGL1(5), VGL2(5), HGL1(19) and VFL1(9) release, in turn releasing relay RCL(31). The operation of relay LK1(31) also effects the opening of the locking circuit for relays FTT0(23) and FUT0(24) by opening conductors 2302 and 2401 in Fig. 23. The release of relays FTT0(23) and FUT0(24) opens the operating circuit over conductor 2304 for marker preference relay MP1(15) for the line link frame connector. Relay MP1(15) releases in turn releasing the multicontact connector relays MCA'1(2), MCA1(2) and MCB1(2), to thereby disconnect the marker circuit from the line link frame connector. The called line is left connected to the intraoffice trunk and it remains for the marker to connect the calling line to the other end of the intraoffice trunk.

After the called line connecting path functions have been released, the call-back operation is initiated by the operation of relay SCB1(31) by the placement of ground on conductor 3114.

Relay SCB1(31) operates in the above-traced circuit and in operating closes a circuit from battery through the windings of the relays 0NW(31), LLC2(31) and LLC1(31), contact 4 of relay SCB1(31) to ground at the contact of relay CKG4(31) reoperating these relays to control the operation of the line link frame connector. At its contact 3, relay SCB1(31) connects ground to battery through the winding of relay CB(31) operating the latter relay.

Relay CB(31) in operating prepares for the transfer of the calling line designation to the selection controlling register by grounding conductors 1819, 1820, 1915, 1109, 1304, 2222, and 1104. Conductor 1819 extends to battery through the winding of relay CB1(5); conductor 1820 extends to battery through the winding of relay CB2(5); conductor 1915 extends to battery through the winding of relay CB3(19); conductor 1109 extends to battery through the winding of relay CBF(11); conductor 1304 extends to battery through the winding of relay CB7(13); conductor 2222 extends to battery through the winding of relay CB4(9); conductor 1104 extends in parallel circuits to battery through the windings of relays CBD(11) and CBD1(11). Ground on the contact of relay CB(31) operates relay L0T(31) in an obvious circuit.

The transfer of the calling line identification to the marker has been described heretofore resulting in the operation of relays FT0(11), FU4(12), FU7(12), VG4(12), VG7(12), HG4(13), HG7(13) and VF0(13). With relays CBD1(11) and CB7(13) operated, a circuit is closed from ground over contact 7 of relay CB7(13), conductor 1301, contact 3 of relay FT0(11), contact 4 of relay CBD1(11) and conductor 1105 to battery through the winding of a relay (not shown) as previously mentioned. Since relay CBF(11) is also operated, ground over the contact 4 of relay CBD1(11) is extended over contact 4 of relay CBF(11), conductor 1110, conductor 1111, conductor 1006, conductor 1003 through the winding of relay FTT0(23) and cross-detector battery over conductor 2300 as previously described. Similarly with relay CBD(11) operated, a circuit is closed from ground over contact 9 of relay CB7(13), conductor 1303, contact 1 of relay FU4(12), contact 4 of relay FU7(12), conductor 1203, contact 11 of relay CBD(11), conductor 1106, and conductor 1107 through the winding of relay FUT0(24) to battery over conductor 2400 as previously traced for the dial tone connection.

With relays FTT0(23) and FUT0(24) operated, a circuit is closed for seizing the line link frame 00 on which the calling line is located. This circuit as previously traced for the terminating connection to the called line also on line link frame 00, extends from battery through resistance lamp LFS(31), over the contact of relay SP(31), contact 1 of relay LLC1(31), contact of relay TFK2(31), contact 2 of relay SCB1(31), conductor 3111, conductor 1108, contact 8 of relay FUT0(24), conductors 2403 and 2303, contact 1 of relay FTT0(23), conductor 2304, contact 1 of relay MB0(15), winding of the marker preference relay for the frame 00 relay, MP1(15), and over the normally closed contacts of the marker preference relays associated with other markers to ground, assuming that no other marker is attempting to seize the line link frame 00 at this time. Relay MP1(15) functions as desired during the dial tone connection to operate the multicontact relay MCA'1(2) which in turn operates relays MCA1(2) and MCB1(2) to connect the marker with the line link frame 00. Relay MCA'1(2) operates the checking relay LFK(31) as previously described. With relays CB7(13) and CB1(5) operated, a circuit is closed through the vertical group register which may be traced from ground over contact 6 of relay CB7(13), conductor 1305, contact 1 of relay VG4(12), contact 5 of relay VG7(12), conductor 1205 through cable 5—12, conductor 505, contact 2 of relay CB1(5), conductor 506 and conductor 500 to battery through the winding of relay VGT0(4). Relay VGT0(4) at its contact 5 closes the previously traced circuit for operating relay VTK1(18). Relay VGT0(4) operates relay VGB0(1) on the line link frame as previously described.

With relays CB7(13) and CB3(19) operated, a circuit is closed from ground over contact 2 of relay CB7(13), contact 1 of relay HG4(13), contact 4 of relay HG7(13), conductor 1306 through cable 13—20, conductor 2008, contact 1 of relay CB3(19), conductors 1903 and 2004 to battery through the winding of relay HGT0(7). Relay HGT0(7) operates in this circuit, closing the previously traced circuit for relay HTK1(19). Relay HGT0(7) operates relay HG0(1) on the line link frame as previously described. With relays HG0(1) and VGB0(1) on the line link frame operated, relay LG0(1) is operated as previously described.

With relays CB7(13) and CB4(9) operated, a circuit is closed from ground over contact 4 of relay CB7(13), contact 3 of relay VF0(13), conductor 1307 through cable 22—26, contact 2 of relay CG4(9), conductor 901 to battery through the winding of relay VFT0(9). Relay VFT0(9) operates, closing the previously traced circuit for operating relay FTK1(22).

The circuits for testing the line links and for operating the line frame select magnets and the line hold magnets have now been extended to the marker. A test circuit for line link 00 over which the calling line is now connected with an originating register is opened so that the associated line link test relay (not shown) cannot be operated and the link will appear idle to the marker.

The selection of the junctor subgroup takes place as described for the dial tone connection following the operation of relays FTT0(23) and FUT0(24) to identify the line link frame which is to be connected with the trunk link frame on which the intraoffice trunk appears.

The test for an idle path and the operation of the channel relay takes place as described for the dial tone connection.

After the connecting path to the calling line has been selected, the connecting path of the dial tone connection associated with this intraoffice call will be released in order to make available the line link associated with the dial tone connection.

The release of hold magnet LH00(1) on the line link frame permits line relay L00(1) to operate. If no other subscriber on this line link frame is waiting for a dial tone connection, the reoperation of relay L00(1) would start a false seizure of a marker. To prevent this, a dial tone lockout arrangement is provided. If some other subscriber is awaiting a dial tone connection, relay DT(1) will be operated as previously described. In the absence of such a condition, relay DT(1) will not be operated. When the call back relay CB(31) operated, it operated the lock-out test relay L0T(31) as previously described. With relay L0T(31) operated and relay TK(31) operated after the marker is ready to test for an idle channel, a circuit is closed from ground over the contact of relay TK(31), contact 1 of relay L0T(31), conductor 214, contact 1 of relay MCB1(2), conductor 118, contact 2 of relay DT(1), conductor 121, contact 12 of relay MCB1(2), conductor 221, contact 5 of relay L0T(31) to battery through the winding of relay L0T1(31). Relay L0T1(31) operates in this circuit and locks over its contact 1 to ground over the contact of relay TK(31). At its contact 2 relay L0T1(31) connects battery through resistance lamp L0B(31), contact 3 of relay L0T(31), conductor 3115, contact 10 of relay MCB1(2), conductor 222 through the winding of lock-out relay L0(1) on the line link frame, contact 2 of relay DT(1), conductor 118, contact 1 of relay MCB1(2), conductor 214 and thence over the operating and locking circuits for relay L0T1(31) to ground at the contact of relay TK(31). Relay L0(1), at its contacts 1 and 2, disconnects battery through the start conductors for that line link frame and thus prevents the false initiation of a call in response to the possible reoperation of the line relay L00(1). Relay L0(1) also closes a circuit from ground at its contact 3, conductor 122, contact 11 of relay MCB1(2), conductor 223, contact 7 of relay L0T(31) to battery through the winding of relay DTK(31) operating the latter relay as an indication that relay L0(1) is operated. It may be noted that during the time that relay L0T(31) is not operated, conductors 214, 3115, 221 and 223 are connected in multiple to battery through the winding of relay XL0(31) as a check that none of these conductors has a false ground connected thereto.

If there are other subscribers on line link frame 00 waiting for a dial tone connection, relay DT(1) will be operated, thus extending ground connected to conductor 118 as previously traced over contact 1 of relay DT(1), conductor 123, contact 9 of relay MCB1(2), conductor 224, contact 4 of relay HTK(19) to conductor 1916, conductor 3108 to battery through the winding of relay DTK(31). If in response to such other waiting call, the line link frame 00 has been connected with a marker for example, marker No. 2 through the line link marker connector, relay MA2(16) and MB2(29) will be operated and the ground on contact 1 of relay DT(1) will be extended over conductors 318 and 319 through cable 3—16 and contact 6 of relay MA2(16) to conductor 1605 leading to marker No. 2 where it will be further extended to the winding of a relay similar to relay DTK(31). With this relay operated, the circuit for the horizontal gating relay similar to relay HGG(19) in marker No. 2 is opened and the marker No. 2 cannot proceed with the identification of the calling line until marker No. 1 removes ground from conductor 118 connected to contact 3 of the operated relay DT(1). This relay in the operation of marker No. 2 is necessary since with relay L00(1) operated, in addition to the line relay whose operation called in marker No. 2, a false identification might be caused in marker No. 2 or marker No. 2 might identify the calling line associated with the intraoffice call as a subscriber line awaiting the dial tone connection.

The marker now proceeds to operate the select and hold magnets on the line link frame and on the trunk link frame associated with the originating connection to the intraoffice trunk and to make the false ground continuity and double connection test as described for the dial tone connection.

The marker is now ready to transfer the supervision of the connecting path to the intraoffice trunk.

After the marker has passed supervision of this intraoffice call to the intraoffice trunk, the marker effects the operation of the ringing switches on the trunk line frame to transmit ringing current to the called subscriber's line.

After the completion of a successful double connection test, after the call-back functioning of the marker and after the ringing switch has been properly set to call the called party, the marker effects the release of itself by opening the operating circuit for relay CKG2(31) and CKG3(31) at point 3109 in Fig. 31 and effects the release of the dial tone connection by releasing the originating register on the trunk link frame. The release of relay CKG3(31) releases relay CKG4(31) which in turn releases relays LLC1(31), LLC2(31) and ONW(31) to eventually completely release the marker No. 1 to normal as has been described in connection with the dial tone connection. The release of relay ONW(31) advances the sequence relays in Figs. 8 and 21 as previously described, under the assumption that relay SQ2(8) was operated during the call-back operation. Relay SQ3(8) is now operated and relay SQ2(8) released. Relay SQ2(8) at its contact 4 closes the locking circuit for relay SQT1(21) holding that relay operated over its contact 2 and conductor 2105. The release of the marker also opens the circuit of relay CB(31) and that relay releases in turn releasing relays CB1(5), CB2(5), CB3(19), CB4(9), CB7(13), CBD(11), CBD1(11), and LOT(31). The release of these relays will release and recycle the necessary marker relays for completely releasing the marker.

When the called subscriber responds to ringing current applied to his line as above described, a circuit is closed for tripping the ringing switch by opening the circuit of the hold magnet (not shown) associated with the ringing switch, which releases, opening the operated cross-points.

The calling subscriber and the called subscriber may now hold a conversation over the line links, the line junctor links, the junctors, the trunk-junctor links, the trunk links and the intraoffice trunk, all of the associated cross-points being held under the supervision of the intraoffice trunk.

The release of the marker by means of releasing the MP1(15) relay will release the multicontact line link frame connector relays MCA'1(2), MCA1(2) and MCB1(2) which in turn will release any relays in Fig. 1 of the line link circuit operated through the line link marker connector except the line hold magnet LH00(1) and the junctor hold magnet JH0(1) which are held operated over the trunk circuit.

At the completion of the conversation, either subscriber, by hanging up his receiver, will effect the release of all of the cross bar switches involved in the talking connection and will provide an indication to all markers that the various links, and the intraoffice trunk are again idle and available for seizure by a marker on a subsequent connection.

Since the present invention is not necessarily limited in its scope to the particular embodiment disclosed by way of example, claims are appended which alone define the invention and its scope.

What is claimed is:

1. In a telephone system, subscribers' lines, line switches serving said lines, a control circuit for operating said switches to extend connections to and from said lines, a secondary connector, means under the control of a calling subscriber's line for operating said secondary connector to connect said line switches with said control circuit, a primary connector, means in said control circuit for operating said primary connector to connect said control circuit with said line switches, and means to operate said primary connector in response to the operation of said secondary connector.

2. In a telephone system, subscribers' line equipment frames, subscribers' lines terminating on said frames, line switches on said frames serving said lines, a common control circuit for operating said switches to extend connections to and from said lines, a secondary connector associated with said control circuit, means under the control of a calling subscriber's line for operating said secondary connector to connect line switches on the frame terminating said line with said control circuit, a primary connector associated with the frame terminating said line, means in said control circuit for operating said primary connector to connect said control circuit with said line switches on the frame terminating said line, and means to operate said primary connector in response to the operation of said secondary connector.

3. In a telephone system, subscribers' line equipment frames, subscribers' lines terminating on said frames, line switches on each frame serving the lines terminating thereon, a common control circuit for operating said switches to extend connections to and from said lines, a plurality of secondary connectors associated with said control circuit, means under the control of a calling subscriber's line for operating one of said secondary connectors to connect line switches on the frame terminating said line with said control circuit, a plurality of primary connectors associated with the frame terminating said line, means in said control circuit for operating one of said primary connectors to connect said control circuit with said line switches on the frame terminating said line, and means to operate said one primary connector in response to the operation of said one secondary connector.

4. In a telephone system, subscribers' line equipment frames, subscribers' lines terminating on said frames, line switches on each frame serving the lines terminating thereon, a plurality of common control circuits for operating said switches to extend connections to and from said lines, a plurality of secondary connectors associated with said circuits, means under the control of a calling subscriber's line for operating one of said secondary connectors to connect line switches on the frame terminating said line with one of said control circuits, a plurality of primary connectors associated with the frame terminating said line, means in said control circuits for operating one of said primary connectors to connect one of said control circuits with said line switches on the frame terminating said line, and means to operate said one primary connector in response to the operation of said one secondary connector.

5. In a telephone system, subscribers' line equipment frames, subscribers' lines terminating on said frames, line switches on each frame serving the lines terminating thereon, a plurality of common control circuits for operating said switches to extend connections to and from said lines, a plurality of secondary connectors associated with said circuits, means under the control of a calling subscriber's line for operating one of said secondary connectors to connect line switches on the frame terminating said line with one of said control circuits, a plurality of primary connectors associated with the frames terminating said line, means in said one control circuit for operating one of said primary connectors to connect said one control circuit with said line switches on the frame terminating said lines, and means to operate said one primary connector in response to the operation of said one secondary connector.

6. In a telephone system, subscribers' line equipment frames, subscribers' lines terminating on said frames, line switches on each frame serving the lines terminating thereon, a plurality of marker circuits for operating said switches to extend connections to and from said lines, a plurality of marker connectors, means under the control of a calling subscriber's line for operating one of said marker connectors to connect line switches on the frame terminating said line with one of said markers, a plurality of frame connectors, means in said one marker for operating one of said frame connectors to connect said one marker with said line switches on the frame terminating said line, and means to operate said one frame connector in response to the operation of said one marker connector.

7. In a telephone system, subscribers' line equipment frames, subscribers' lines terminating on said frames, line switches on each frame serving the lines terminating thereon, a plurality of marker circuits for operating said switches to extend connections to and from said lines, a plurality of marker connectors, means under the control of a calling subscriber's line for operating one of said marker connectors to connect line switches on the frame terminating said line with one of said markers, a plurality of frame connectors, means in said one marker circuit for operating one of said frame connectors to connect said one marker with said line switches on the frame terminating said line, and means to operate said one frame connector in response to the operation of said one marker connector to effect connection between said one marker and said line switches at the same time through both of said connectors.

8. In a telephone system, subscribers' lines, line switches serving said lines, a control circuit for operating said switches to extend connections to and from said lines, a secondary connector, means under the control of a calling subscriber's line for operating said secondary connector to connect said line switches with said control circuit, registers in said control circuit, means to set said registers, a primary connector, means under the control of said registers for operating said primary connector to connect said control circuit with said line switches.

9. In a telephone system, subscribers' lines, line switches serving said lines, a control circuit for operating said switches to extend connections to and from said lines, a secondary connector, means under the control of a calling subscriber's line for operating said secondary connector to connect said line switches with said control circuit, registers in said control circuit, means to set said registers over said secondary connector, a primary connector, means under the control of said registers for operating said primary connector to connect said control circuit with said line switches.

10. In a telephone system, subscribers' lines, line switches serving said lines, a control circuit for operating said switches to extend connections to and from said lines, a secondary connector, means under the control of a calling subscriber's line for operating said secondary connector to connect said line switches with said control circuit, first registers in said control circuit, second registers in said control circuit, means to set said second registers from said first registers, a primary connector, means under the control of said second registers for operating said primary connector to connect said control circuit with said line switches.

11. In a telephone system, subscribers' lines, line switches serving said lines, a control circuit for operating said switches to extend connections to and from said lines, a secondary connector, means under the control of a calling subscriber's line for operating said secondary connector to connect said line switches with said control circuit, first registers in said control circuit, second registers in said control circuit, means to set said second registers from said first registers or over said secondary connector, a primary connector, and means under the control of said second registers for operating said primary connector to connect said control circuit with said line switches.

12. In a telephone system, subscribers' lines, line switches serving said lines, a marker circuit for operating said switches to extend connections to and from said lines, a marker connector, means under the control of a calling subscriber's line for operating said marker connector to connect said line switches with said marker, registers in said marker circuit set in response to the connection between said line and said marker circuit over said marker connector, a frame connector, means under the control of said registers for operating said frame connector to connect said marker circuit with said line switches.

13. In a telephone system, subscribers' line equipment frames, subscribers' lines terminating on said frames, line switches on each frame serving the lines terminating thereon, a plurality of marker circuits for operating said switches to extend connections to and from said lines, a plurality of marker connectors, means under the control of a calling subscriber's line for operating one of said marker connectors to connect the line switches on the frame terminating said line with one of said marker circuits, registers in a different one of said marker circuits, means to set said registers, a plurality of frame connectors, means under the control of said registers for operating one of said frame connectors to connect said different marker circuit with the line switches on the frame terminating said line at the same time as the said line is connected to said one marker through said one marker connector circuit.

14. In a telephone system, subscribers' lines, line switches serving said lines, control circuits for operating said switches to extend connections to and from said lines, a secondary connector, means under the control of a calling subscriber's line for operating said secondary connector to connect said line switches with one of said control circuits, a primary connector, means in said control circuits for operating said primary connector to connect one of said control circuits with said line switches, and means to operate said primary connector and said secondary connector to connect the same one of said control circuits with said line switches over both connectors.

15. In a telephone system, subscribers' lines, line switches serving said lines, control circuits for operating said switches to extend connections to and from said lines, a secondary connector, means under the control of a calling subscriber's line for operating said secondary connector to connect said line switches with one of said control circuits, a primary connector, means in said control circuits for operating said primary connector to connect one of said control circuits with said line switches, and means to operate said primary connector and said secondary connector to connect different ones of said control circuits with said line switches simultaneously over said secondary and said primary connectors.

16. In a telephone system, subscribers' line equipment frames, subscribers' lines terminating on said frames, line switches on each frame serving the lines terminating thereon, a plurality of marker circuits for operating said switches to extend connections to and from said lines, a plurality of marker connectors associated with said markers and with said frames, means under the control of a calling subscribers' line for operating one of said marker connectors to connect the line switches on the frame terminating said line with one of said markers, a plurality of frame connectors associated with the frame terminating said line and with said markers, means in said marker circuits for operating one of said frame connectors to connect one of said markers with the line switches on the frame terminating said line, and means to operate said one frame connector and said one marker connector to connect the same marker with said line switches simultaneously over both connectors.

17. In a telephone system, subscribers' line equipment frames, subscribers' lines terminating on said frame, line switches on each frame serving the lines terminating thereon, a plurality of marker circuits for operating said switches to extend connections to and from said lines, a plurality of marker connectors associated with said markers and with said frames, means under the control of a calling subscriber's line for operating one of said marker connectors to connect the line switches on the frame terminating said line with one of said marker circuits, a plurality of frame connectors associated with the frame terminating said line and with said markers, means in said marker circuits for operating one of said frame connectors to connect one of said markers with the line switches on the frame terminating said line, and means to operate one of said frame connectors and one of said marker connectors to connect different marker circuits with the line switches on the frame terminating said line simultaneously over said marker and said frame connectors.

18. In a telephone system, equipment frames, equipments terminating on said frames, switches on each frame serving the equipments terminating thereon, a control circuit for operating said switches to extend connections to and from said equipments, a secondary connector, means under the control of one of said equipments for operating said secondary connector to connect the switches on the frame terminating said one equipment with said control circuit, a primary connector, means in said control circuit for operating said primary connector to connect said control circuit with the switches on the frame terminating said one equipment, and means to operate said primary connector in response to the operation of said secondary connector.

19. In a telephone system, an equipment frame, equipment terminating on said frame, switches on said frame and serving said equipment, a control circuit for operating said switches to extend connections to and from said equipment, a secondary connector, means under the control of said equipment for operating said secondary connector to connect said switches with said control circuit, a primary connector, means in said control circuit for operating said primary connector to connect said control circuit with said switches, and means to operate said primary connector in response to the operation of said secondary connector.

20. In a telephone system, equipment frames, equipments terminating on said frames, switches on each frame serving the equipments terminating on said frame, a plurality of control circuits for operating said switches to extend connections to and from said equipments, a plurality of secondary connectors, means under the control of one of said equipments for operating one of said secondary connectors to connect the switches associated with said equipment with one of said control circuits, a plurality of primary connectors, and means in said control circuits for operating one of said primary connectors to connect the said one or a different one of said control circuits with the same one or a different one of said equipments.

21. In a telephone system, equipment frames, different types of equipments terminated on some of said frames, switches on each frame serving the equipments terminating thereon, a plurality of common control marker circuits for operating said switches to extend connections to and from said equipments, a plurality of marker connectors, means under the control of any one of said equipments for operating one of said marker connectors to connect the switches on the frame terminating said one equipment with one of said marker circuits, a plurality of frame connectors, means in any one of said marker circuits for operating one of said frame connectors to connect any one marker circuit with the switches on any one of said frames, the marker connector being operated solely from an equipment frame and the frame connector being operated solely from a marker circuit.

EDSON L. ERWIN.

No references cited.